United States Patent [19]

Itoh et al.

[11] Patent Number: 5,438,526
[45] Date of Patent: Aug. 1, 1995

[54] PROGRAM GENERATION METHOD FOR PARTICLES SIMULATION

[75] Inventors: Satoshi Itoh, Kodaira; Sigeo Ihara, Hachioji, both of Japan

[73] Assignee: Hitachi, Ltd., Tokyo, Japan

[21] Appl. No.: 914,747

[22] Filed: Jul. 7, 1992

[30] Foreign Application Priority Data

Jul. 12, 1991 [JP] Japan .................. 3-172175

[51] Int. Cl.[6] ........................... G06F 15/328
[52] U.S. Cl. .................... 364/578; 395/500; 395/922
[58] Field of Search ............ 395/700, 922, 500; 364/578, 191

[56] References Cited

U.S. PATENT DOCUMENTS

| | | | |
|---|---|---|---|
| 4,742,473 | 5/1988 | Shugar et al. | 364/578 |
| 4,797,842 | 1/1989 | Nackman et al. | 364/578 |
| 4,841,479 | 6/1989 | Tsuji et al. | 364/578 |
| 4,972,334 | 11/1990 | Yamabe et al. | 395/500 |
| 5,029,119 | 7/1991 | Konno | 364/578 |
| 5,129,035 | 7/1992 | Saji et al. | 395/700 |
| 5,130,932 | 7/1992 | Kaihara et al. | 364/578 |
| 5,148,379 | 9/1992 | Konno et al. | 364/578 |

FOREIGN PATENT DOCUMENTS

60-140433 7/1985 Japan .
2-148165 6/1990 Japan .
2-249083 10/1990 Japan .

OTHER PUBLICATIONS

Konno et al., "Advanced Implicit Solution Function of DEQSOL and Its Evaluation," *IEEE,* 1986, pp. 1026–1033.

Spratt et al., "Two Interacting Cubic Particles: Effect of Placement on Switching Field and Magnetisation Reversal Mechanism," *IEEE Transaction on Magnetics,* vol. 27, No. 6, Nov. 1991, pp. 4790–4792.

Murthy et al., "Computer Simulation Studies of Ion Implantation in Crystalline Silicon," IEEE Transaction on Electronic Devices, vol. 39, No. 2, Feb. 1992, pp. 264–274.

Lean, "Simulation and Visualization of 3D Particle Cloud Electrodynamics," IEEE Transaction on Magnetics, vol. 28, No. 2, Mar. 1992, pp. 1271–1274.

Watanabe, "Calculation of Flyash Particle Motion and its Migration Velocity in an Electrostatic Precipitator," IEEE, 1989, pp. 2126–2136.

*Primary Examiner*—Ellis B. Ramirez
*Assistant Examiner*—Eric W. Stamber
*Attorney, Agent, or Firm*—Fay, Sharpe, Beall, Fagan, Minnich & McKee

[57] ABSTRACT

A generation method of particle simulation programs includes a translation and discretization process of equation of motion of particles for recognizing attributes of a space and particles based on information of the particle simulation to generate expressions of calculations, tables, and internal data and a generation process of programs for creating calculation programs and simulation input data from the generated expressions of calculations, tables, and internal data. According to information inputted from a screen of a graphic terminal, various control conditions are produced to control processes of the simulation.

21 Claims, 49 Drawing Sheets

FIG. 16

SHAPE OF SPATIAL REGION — 1601

THREE-DIMENSIONAL SPACE
PSEUDO INFINITE REGION ACCORDING TO PERIODIC BOUNDARY CONDITIONS OF BASIC UNIT
BASIC UNIT INCLUDES THREE BASIC CELLS OF CRYSTAL IN EACH AXIS OF SPACE
BASIC CELL HAS NaCl-TYPE CRYSTAL STRUCTURE
LATTICE CONSTANT : 5.628 Å

PARTICLE ATTRIBUTES — 1602

ARTICLE SPECIES : TWO (Na, Cl)
NUMBER OF PARTICLES : 108 EACH IN BASIC UNIT (TOTAL NUMBER N=216)
INITIAL LOCATION : EACH LATTICE POINT OF CRYSTAL STRUCTURE
INITIAL VELOCITY : GAUSSIAN DISTRIBUTION ASSOCIATED WITH INITIAL TEMPERATURE T=1296 K $$T = \frac{1}{3Nk} \sum_{i=1}^{N} m_i \vec{v}_i^2 \qquad \sum_{i=1}^{N} m_i \vec{v}_i = 0$$

MASS OF PARTICEL $m$ : 23.0 (Na), 35.45 (Cl)
CHARGE OF PARTICLE $z$ : +1 (Na), -1 (Cl)
COEFFICIENT OF INTERACTION B :
1.13 (Na-Na), 0.95 (Na-Cl), ⋯

CONTROL CONDITIONS — 1603

$\Delta t = 2.5$ fsec
$t_0=0$, $t_1=5$, $t_2=10$, $t_3=15$, $t_4=20$ psec
$T_1=1296$, $T_2=1310$, $\Delta T=20$
$ST=T_1$ at $t=t_0$
$ST=T_2$ at $t=t_2$
TempRescale to ST
    if $T-ST > \Delta T$ or $ST-T > \Delta T$
Calc. Phys. at $t_1 < t \leq t_2$ by 0.5 psec
Calc. Phys. at $t_3 < t \leq t_4$ by 0.5 psec

EQUATIONS — 1604

$$\frac{d\vec{r}_i}{dt} = \vec{v}_i \qquad \vec{F}_i = -\vec{\nabla}_i \sum_{j \neq 1}^{N} \phi_{ij}(r_{ij})$$

$$\frac{d\vec{v}_i}{dt} = \vec{F}_i / m_i$$

$$\phi_{ij}(r_{ij}) = \frac{Z_i Z_j e^2}{r_{ij}} + B_{ij} e^{-r_{ij}/\rho_{ij}} - \frac{C_{ij}}{r_{ij}^6} - \frac{D_{ij}}{r_{ij}^8}$$

```
SPACE {
UNIT        Å     for Length,
            f sec for Time,
            eV    for Energy,           ⌒1801
            K     for Temperature ;
                                        ⌒1802
DIMENSION   3=(X,Y,Z) ;
                                        ⌒1803
REGION      CELL=Crystal (NaCl, 5.628) ;
DOMAIN      Cube ([0:3],[0:3],[0:3])
                                        ⌒1804
            OF CELL ;
BCOND       Periodic X OF Whole,
            Periodic Y OF Whole,        ⌒1805
            Periodic Z OF Whole ;
}
```

```
PARTICLE {
    SPECIES    2=(Na,Cl);                           /*1901*/
    NUMBER     Na=108,                              }/*1902*/
               Cl=108;                              }
    VAR        Mass, Chrg OF Species,               /*1903*/
               B, C, D OF Species & Species,        /*1904*/
               r, v, F OF Space & Particle;         /*1905*/
    CONST      Mass=23.0 FOR Na,                    }/*1906*/
               Mass=35.45 FOR Cl,                   }
               Chrg=+1 FOR Na,                      }/*1907*/
               Chrg=-1 FOR Cl,                      }
               B=1.05 FOR Na & Na,                  }
               B=1.34 FOR Na & Cl,                  }
               B=1.22 FOR Cl & Cl,                  }/*1908*/
               C=0.54 FOR Na & Na,                  }
                 :  ;
    INITIAL    r=LatticePointinWhole,               /*1909*/
               v=GaussDist (Temp,Particle,Mass);
}                                                   /*1910*/
```

FIG. 20

```
CONTROL {
VAR       Energy Temp, Press, t, DT,
          Eps, Elechrg, Boltz, Pi,
          STemp, T1, T2, t0, t1, t2, t3, t4 ;
CONST     Eps=1.43,
          Elechrg=2.9979E-10,
          Boltz=1.380622E-16,
          Pi=3.1415926,
          T1=1296, T2=1310,
          t0=0, t1=5000, t2=10000,
          t3=15000, t4=20000 ;
INITIAL   DT=2.5,
          STemp=T1 ;
MIDDLE    STemp=T2 at t=t1,
          TempRescale
              if (Temp-STemp>20 |
                  STemp-Temp>20),
          Calculate (Energy, Pressure)
              at t1 <= t <= t2 by step 500 ;
          Calculate (Energy, Pressure)
              at t3 <= t <= t4 by step 500 ;
FINAL     Stop at t=t4,
          Save (r,v) ;
}
```

```
SUPPLY {
          TempRescale :
          v=SQRT (Temp/STemp)*v,
          Temp=STemp ;
                :
}
```

```
SCHEME {
EQUATION    D[r,t]=v,              ⎫ 2101
            D[v,t]=F/Mass ;        ⎭
METHOD      LeapFrog ;    ~2102        ~2103
FUNCTION    F=FORCE2 (IONMODEL, B, C, D) ;
}
```

FIG. 28
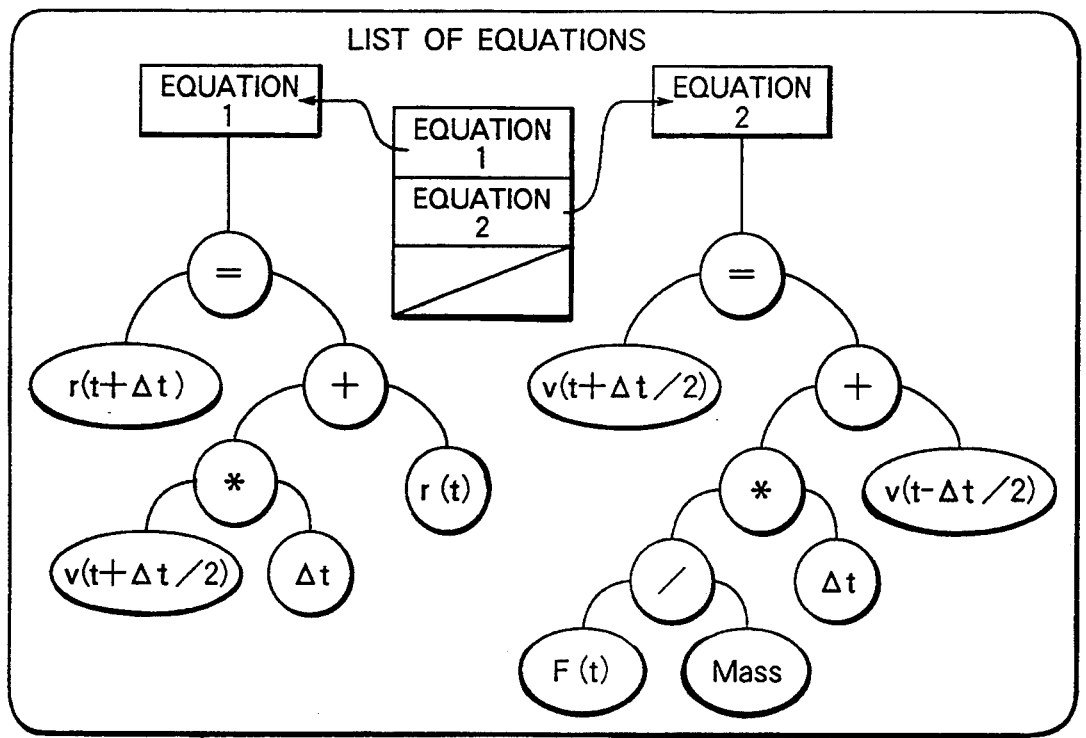
SORT IN TIME SEQUENCE AND GENERATE RECURSIVE FORMULA
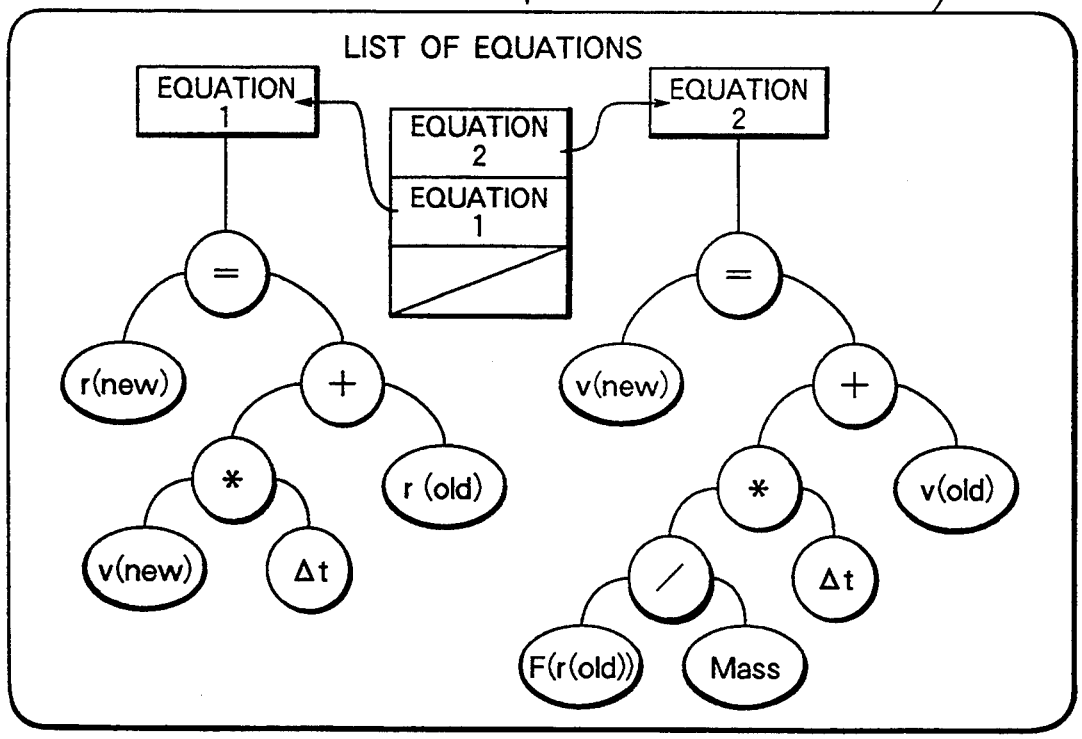

FIG. 29
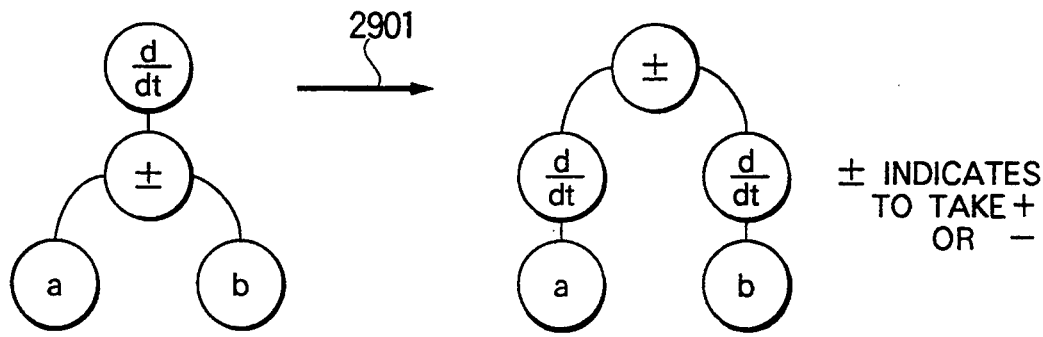
$$[\tfrac{d}{dt}(a\pm b) = (\tfrac{d}{dt}a \pm \tfrac{d}{dt}b)] \sim 2904$$
± INDICATES TO TAKE + OR −
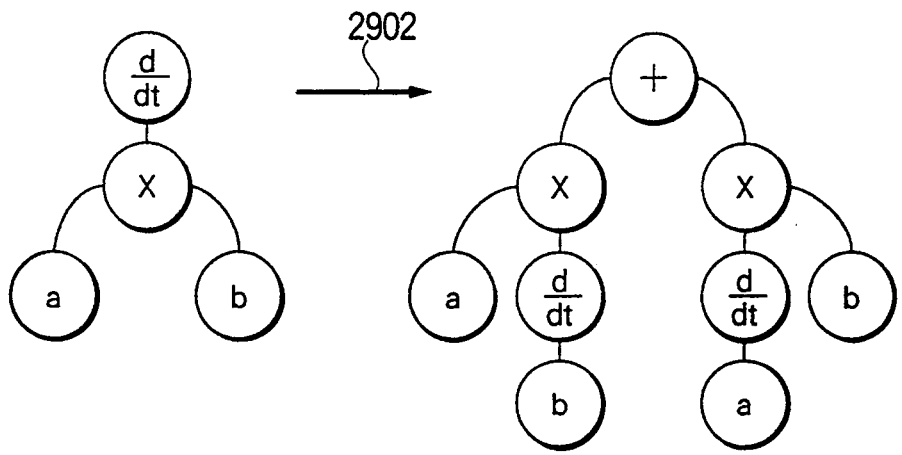
$$[\tfrac{d}{dt}(a \times b) = (a \times \tfrac{d}{dt}b) + (\tfrac{d}{dt}a \times b)] \sim 2905$$
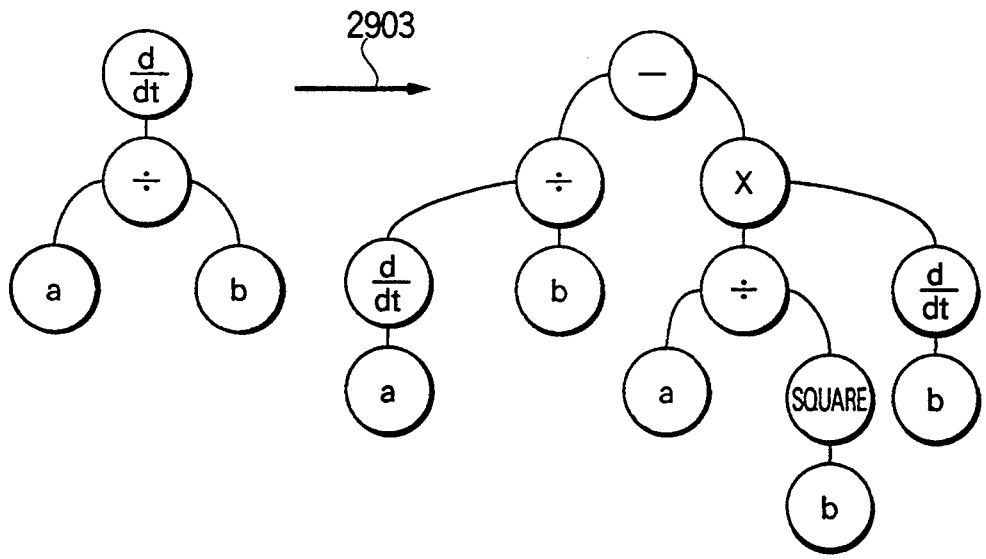
$$[\tfrac{d}{dt}(a \div b) = (\tfrac{d}{dt}a \div b) - (a \div b^2 \times \tfrac{d}{dt}b)] \sim 2906$$

FIG. 30
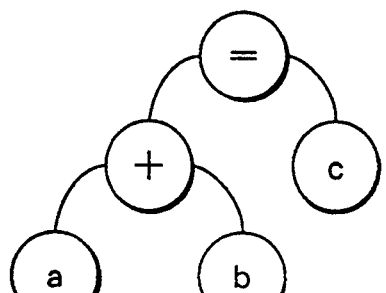 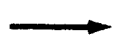 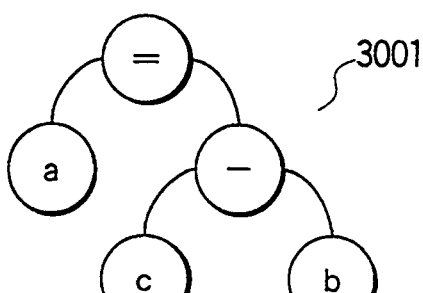
[a+b=c] → [a=c-b]    3001
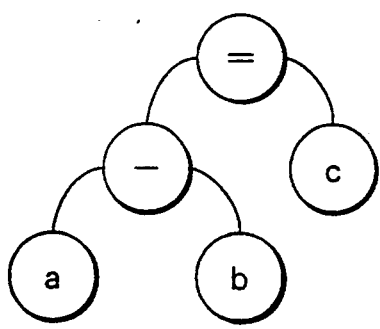  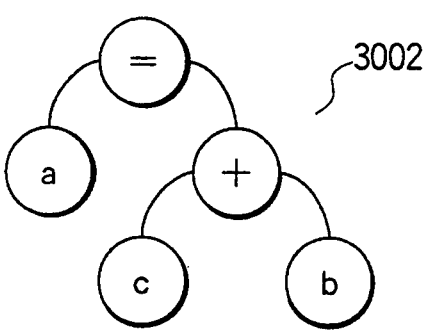
[a-b=c] → [a=c+b]    3002
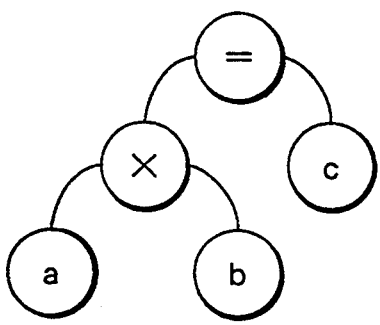  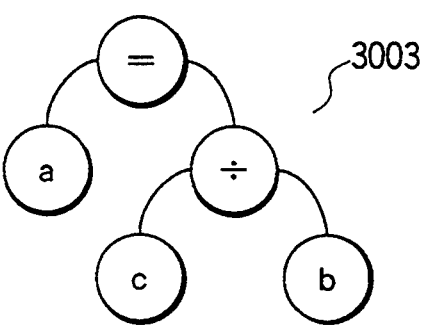
[a×b=c] → [a=c÷b]    3003
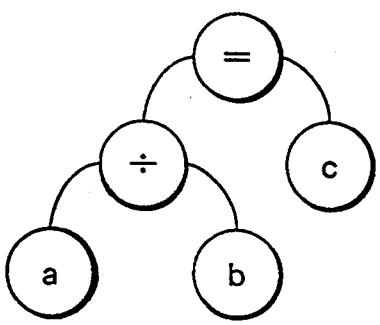  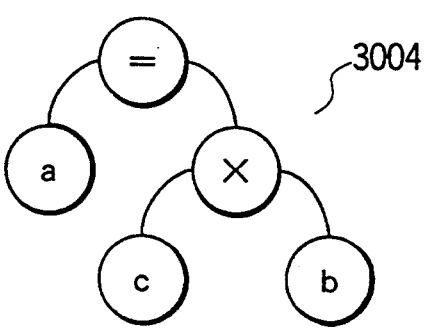
[a÷b=c] → [a=c×b]    3004

```
C    PARAMETER ( NP0001=3 )                  ,,   Space    =3
     CHARACTER CN0001 (NP0001)*1              ,,   Space         3102
     PARAMETER ( CN0001 (1)="X" )             ,,   X            3103
     PARAMETER ( CN0001 (2)="Y" )             ,,   Y
     PARAMETER ( CN0001 (3)="Z" )             ,,   Z
C    PARAMETER ( NP0002=2 )                   ,,   Species  =2
     CHARACTER CN0002 (NP0002)*2              ,,   Species
     PARAMETER ( CN0002 (1)="Na" )            ,,   Na
     PARAMETER ( CN0002 (2)="Cl" )            ,,   Cl
C    PARAMETER ( NP0003=108 )                 ,,   NaNum    =108
C    PARAMETER ( NP0004=108 )                 ,,   ClNum    =108
C
C    PARAMETER ( NP0005=216 )                 ,,   Particle =216
```

```
REAL MASS (NP0002)              ;; MASS (SPECIES)     /—3201
REAL CHRG (NP0002)              ;; CHRG (SPECIES)
REAL B (NP0002, NP0002)         ;; B (SPECIES, SPECIES)
REAL C (NP0002, NP0002)         ;; C (SPECIES, SPECIES)
REAL D (NP0002, NP0002)         ;; D (SPECIES, SPECIES)
REAL R (NP0001, NP0005)         ;; R (SPACE, PARTICLE)
REAL V (NP0001, NP0005)         ;; V (SPACE, PARTICLE)
REAL F (NP0001, NP0005)         ;; F (SPACE, PARTICLE)
REAL ENERGY
REAL TEMP
REAL PRESS
REAL EPS
REAL ELECHG
REAL BOLTZ
REAL PI
  ..
COMMON /COMHD/MASS, CHRG, B, C, D, R, V, F,     /—3202
1             ENERGY, TEMP, PRESS,
2             EPS, ELECHG, BOLTZ, PI,
3             ..........
```

```
      SUBROUTINE RDINTV          3401

INCLUDE ( DIMHD )          ;; DECLARATION OF NUMBER OF DIMENSIONS  ⎫
      INCLUDE ( COMHD )          ;; DECLARATION OF COMMON VARIABLE       ⎬ 3402

C     WRITE (*,*)    'START OF INITIAL VALUE READING OPERATION'   3403

READ                       ;; SKIP NAME                    ⎫
      READ                       ;; SKIP NUMBER OF ELEMENTS      ⎬ 3404
      READ    R    3405

READ                       ;; SKIP NAME                    ⎫
      READ                       ;; SKIP NUMBER OF ELEMENTS      ⎬ 3406
      READ    V

C     WRITE (*,*)    'END OF INITIAL VALUE READING OPERATION'

C     RETURN
      END
```

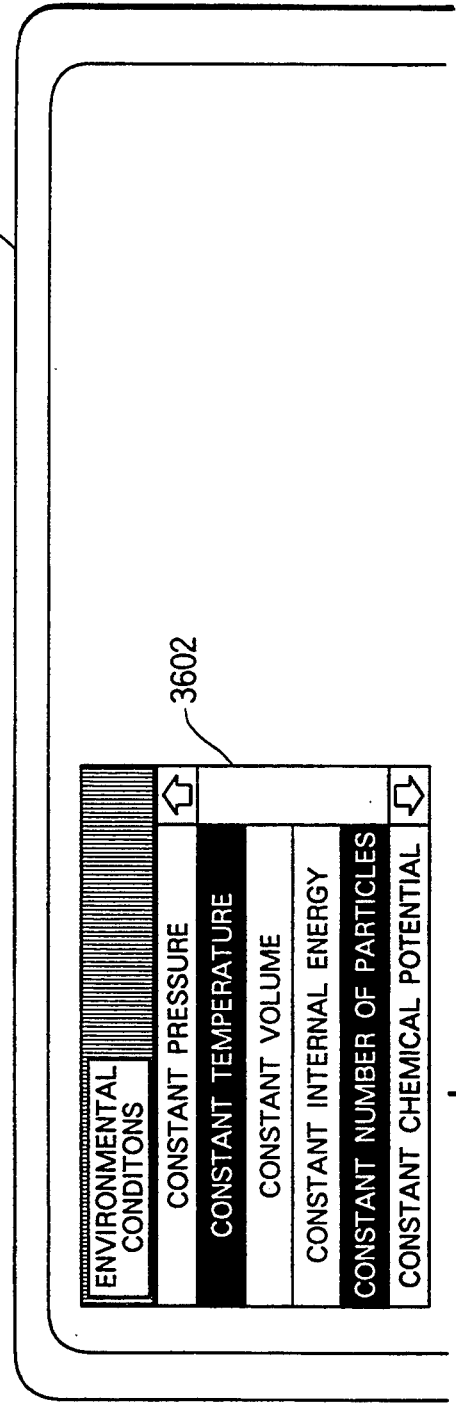
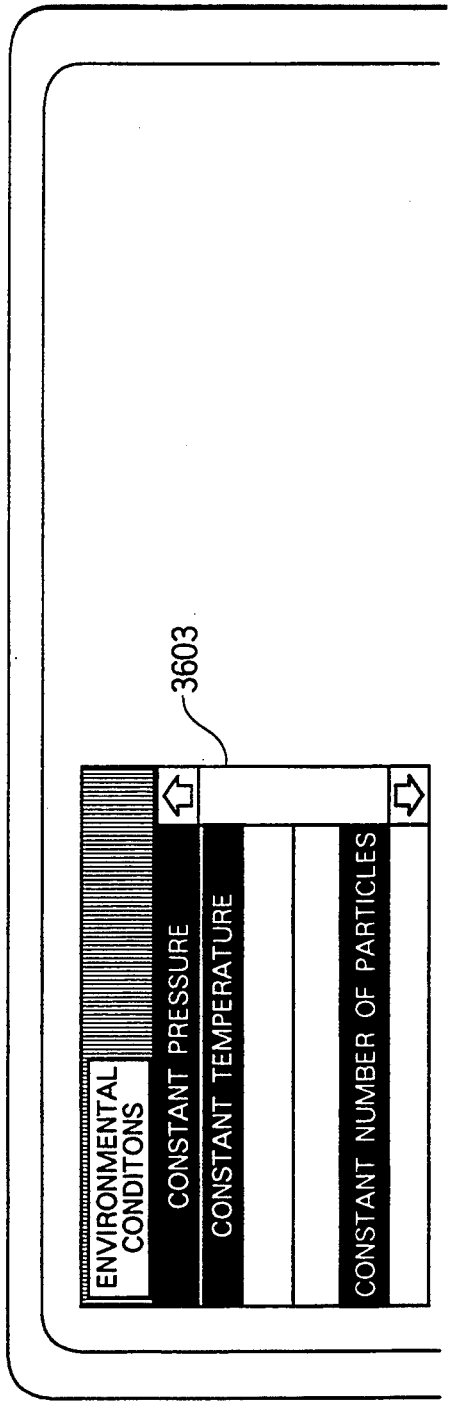
FIG. 36

FIG. 37

```
CONTROL {
    :              :
    INITIAL    DT=2.5,
               STemp=0,
               ITemp=0.5,                      }~3702
               SPress=1 ;

MIDLE      TempRescale
                   if (Temp-STemp>20 |
                       STemp-Temp>20),
               PressRescale                    }~3703
                   if (Press-SPress>0.1 |
                       SPress-Press>0.1),
               STemp=STemp+ITemp
                   at each steps,
               SPress=SPress+IPress            }~3704
                   at each steps,
               Calculate (Energy, Pressure)
                   at 0 <= t <= 30000 by step 100,
               Calculate (Energy, Pressure)    }~3705
                   at 30000 <= t <= 150000 by step 500,
               ITemp=0 at t=6000,
               STemp=1800 at t=10000,
               ITemp=-0.03 at t=10000,
               ITemp=-0.015 at t=30000,
               IPress=0.00002 at t=50000,      }~3706
               ITemp=-0.01 at t=70000,
               ITemp=0 at t=100000,
               IPress=0 at t=100000 ;

FINAL      Stop at t=150000,               }~3707
               Save (r, v) ;
}
```

FIG. 39

| STAGE (3901) | TIME (K STEPS) (3902) | TEMPERATURE (K) (3903) | TEMPERATURE GRADIENT (K/STEP) (3904) | PRESSURE (ATMOSPHERIC PRESSURE) (3905) | PRESSURE GRADIENT (ATMOSPHERE/STEP) (3906) |
|---|---|---|---|---|---|
| 1 | 0-6 | 0-3000 | 0.5 | 1 | 0 |
| 2 | 6-10 | 3000 | 0 | 1 | 0 |
| 3 | 10-30 | 1800-1200 | -0.03 | 1 | 0 |
| 4 | 30-50 | 1200-900 | -0.015 | 1 | 0 |
| 5 | 50-70 | 900-600 | -0.015 | 1-1.4 | 0.00002 |
| 6 | 70-100 | 600-300 | -0.01 | 1.4-2 | 0.00002 |
| 7 | 100-150 | 300 | 0 | 2 | 0 |

| TABLE OF INTERVAL FUNCTIONS 4901 | START POINTER 4902 | END POINTER 4903 | INITIAL VALUE 4904 | GRADIENT 4905 |
|---|---|---|---|---|
| INTERVAL 1 | START POINTER 1 | END POINTER 1 | INITIAL VALUE 1 | GRADIENT 1 |
| INTERVAL 1 | START POINTER 2 | END POINTER 2 | INITIAL VALUE 2 | GRADIENT 2 |
| ⋮ | ⋮ | ⋮ | ⋮ | ⋮ |
| INTERVAL n | START POINTER n | END POINTER n | INITIAL VALUE n | GRADIENT n |

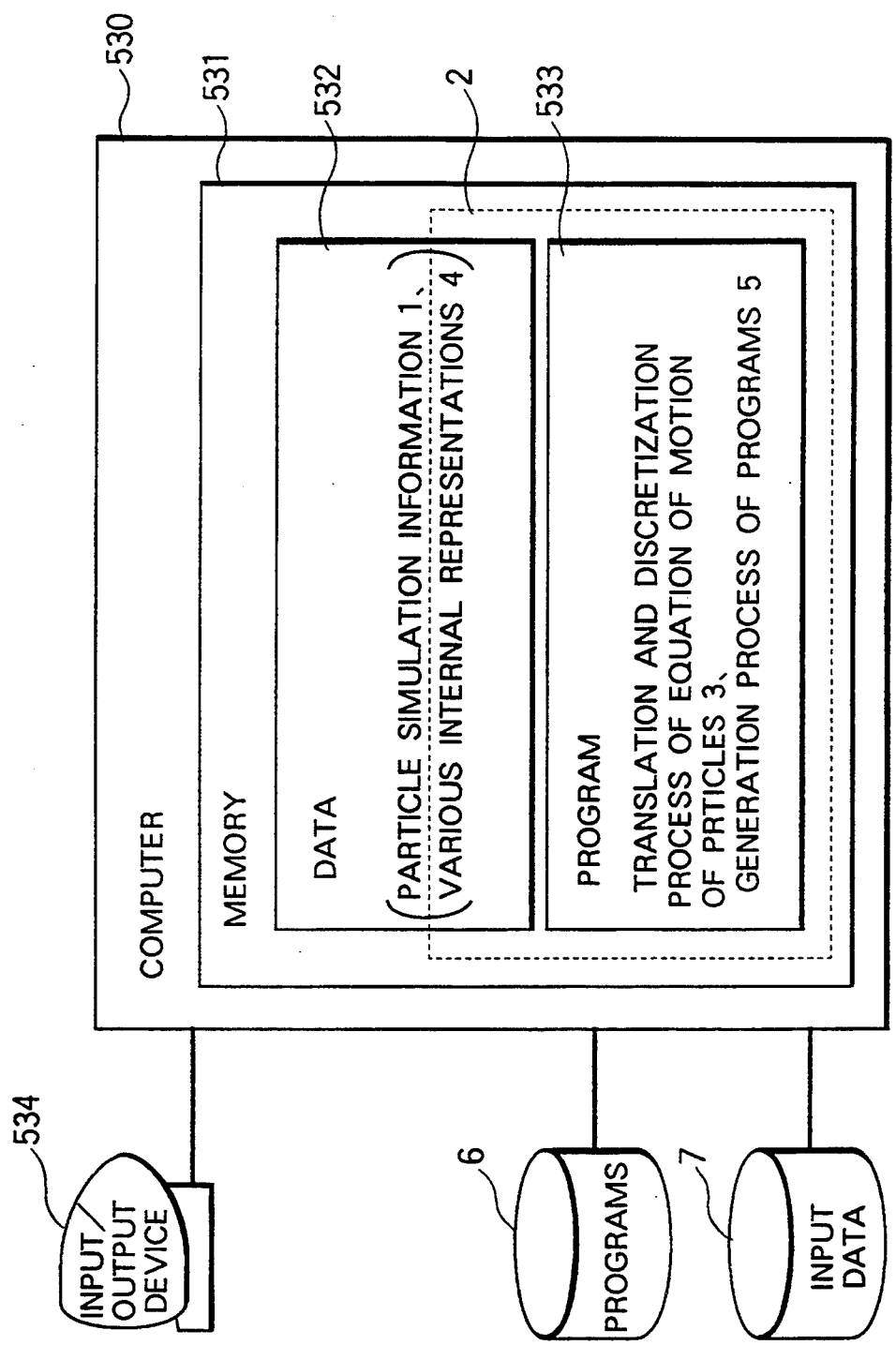

PROGRAM GENERATION METHOD FOR PARTICLES SIMULATION

BACKGROUND OF THE INVENTION

The present invention relates to a simulation apparatus for numerically simulating physical phenomena, and in particular, to a program generation method suitable for numerically reproducing physical phenomena such as behaviors of atoms, molecules, and ions in a crystal growth and behavior of plasma in a nuclear fusion reactor and to a method of generating input values necessary for execution of programs thus generated.

When describing a physical phenomenon of a many particles system as behaviors of a plurality of particles in a spatial region in a manner similar to that adopted in an analysis at an atom level of a crystal growth, there is used a set of ordinary differential equations representing spatial positions of the plural particles with respect to time. In the equations, according to changes in attributes and environments of particles, the numerical values as well as forms or configurations of the expressions are varied.

Usually, a numerical simulation apparatus for simulating these physical phenomena is implemented by specifying programs to be executed in a general-purpose computer.

Conventionally, the concrete implementing methods of the simulation apparatus include a method in which the programs are described in general-purpose computer language, for example, FORTRAN, a method employing programs available in the software market, and a method as described in JP-A-60-140433 in which according to partial differential equations representing physical phenomena and description of a spatial region for numerical calculations, there are automatically generated in accordance with finite element methods programs to execute numerical calculations for the partial differential equations.

Moreover, when executing a simulation, it is required in some cases to specify parameters of which values are altered during the execution of the simulation. Ordinarily, when specifying parameters having values thus altered, there is adopted a method in which a program is executed each time the value of parameter is changed or a method in which points of time and methods of changing parameter values are specified.

Heretofore, in a case where a numerical simulation apparatus of physical phenomena is materialized such that programs described in the general-purpose computer language, FORTRAN are executed in a general-purpose computer, due to usage of the general-purpose language, there is required for the control of simulation a program containing a large number of statement lines.

To avoid this difficulty, there has been adopted measures in which a software system of a particle simulation package available in the market is executed in a general-purpose computer. However, when using such a software package, equations themselves cannot be inputted in this software and the range of simulation is disadvantageously limited. For example, depending on environmental conditions of simulation such as a constant temperature or pressure, the form of equation varies. The differences in the form of the equations in this case include numerical differences in coefficients, differences in forms of terms appearing in the equations, and differences in the numbers of variables in the differential equations. Consequently, when a new equation is to be introduced to reproduce behaviors of particles under new environmental conditions, the conventional software package cannot appropriately achieve the simulation in some case.

Furthermore, there may possibly be employed a method in which according to partial differential equations representing physical phenomena and description of a spatial region for numerical computations, there are automatically generated in accordance with finite element methods programs to execute numerical computations for the partial differential equations. However, this method is unsuitable for processing behavior of particles. When a finite element method is utilized in a particle simulation, a large amount of areas of main memory and quite a long period of computation time are required. For example, in a numerical simulation of a process of crystal growth for each atom, assume as an example a problem in which behaviors of 1000 atoms are traced for ten pico-seconds at an interval of one femtosecond. Namely, a simultaneous system of second-order differential equations with 3000 unknowns in a field having three-dimensional positions for each atom at each point in a one-dimensional region of time is required to be solved for 10,000 partitioned elements. When using the conventional method in which the differential equations are converted into a simultaneous system of equations of first degree, there is obtained a matrix having 30 million rows. Namely, only the elements of the matrix occupy 4000 tera-bytes of the main memory in the general-purpose computer system. This means that a feasible numerical simulation program cannot be produced. Moreover, in the conventional method, about 3000 equations are required to be described; furthermore, it is impossible to utilize such advantages that each equation is represented in a spatial position characterizing each particle and the equations of the respective particles can be described in the same format. Consequently, more than necessary information items are duplicatedly described and the program description becomes to be considerably complicated.

SUMMARY OF THE INVENTION

It is therefore an object of the present invention to provide a program generation method in which programs for numerically simulating a broad range of behaviors to be represented as behaviors of time and space of a plurality of particles in a space can be generated only by specifying minimum information necessary for the program generation.

Moreover, to specify control conditions of which parameters are changed during an execution of simulation, there can be used two specifying methods as described in conjunction with the prior art. In a case where a program is executed each time the value of a parameter is changed, there arises a problem that the operation to control the state of execution is complicated. On the other hand, when using the method in which the points of time of the change in parameters and the methods of changes are specified, there arises a problem of requirement of a great amount of description for the specifications of the points and methods.

Another object of the invention is to provide a control condition generation method capable of generating complex control conditions while visually checking the conditions.

In order to achieve the objects above, there is provided a program generation method including a translation and discretization process of equation of motion of particles in which based on definition related to a particle simulation, namely, behaviors in time and space of a plurality of particles in a space, there are produced calculation formulae or expressions, tables, and internal data as specifications necessary for generating programs and a generation process of programs in which based on the generated calculation formulae, tables, and internal data, there are generated calculation programs and simulation input data.

Moreover, the translation and discretization process of equation of motion of particles includes a translation process of shape of spatial region for extracting, from definitions of a shape of a spatial region in which phenomena occur, information such as dimensions of the space, a shape of the region, and boundary conditions and for keeping the extracted information in a form facilitating reference thereto; a translation process of particle attributes for extracting particle species, the numbers of respective particles, and various initializing information from definition of particle attributes and for keeping the extracted items in a form to be easily referenced in subsequent processes; a translation process of control conditions for extracting, from description of control conditions including changes of environments, boundary conditions and a process associated therewith and a change in a simulation condition for each point of time and a process associated therewith, for generating a correspondence table containing relationships between conditions of performing procedures and processes of creating procedures, and for generating an internal representation of auxiliary processes in which contents of processes are described; and a translation process of equation of motion for discretizing equations based on a description of motion of particles and for generating internal representation of asymptotic equations in the tree graph format.

The generation process of programs includes a generation process of program for time evolution for generating from the obtained asymptotic equations a program for time evolution according to a numerical integration method, a generation process of a program for auxiliary calculations for generating from the obtained internal representation of auxiliary processes a program for auxiliary calculations, a generation process of a program for process control for generating from the extracted condition of performing procedures a program for process control., and a generation process of data input output program for outputting data of each initial value of particle attributes to a file, thereby generating a data input output program.

In addition, the generation methods of control conditions as further another object of the present invention includes a process for generating a graph of changes in control variables while visually checking the graph, a process for reading a function from the generated graph, a process for generating a control condition from the attained function, and a process for sorting again control conditions for a plurality of control variables according to a control time sequence.

In the translation and discretization process of equation of motion of particles, various variables are defined according to kinds and quantities of particles designated in the input description. Consequently, it is unnecessary to described an equation for each particle, which hence reduces the number of statement lines to be described.

Furthermore, in the translation process of attribute definitions of particles and environments and the translation process of the description of equation of motion, the input description is assumed to be related to physical attributes of particles; consequently, the number of description lines is minimized.

In addition, in the numerical integration method using asymptotic equations, information of a spatial position of each particle is traced for each point of time. Consequently, the amount of information to be simultaneously kept in a storage of the general-purpose computer is reduced as compared with the conventional system. For example, assume as an example a case where the method of the present invention is applied to a numerical simulation of a crystal growth for each atom. Considering behaviors of 1000 atoms for ten picoseconds, at most about several hundred of kilobytes of main memory area are required in the general-purpose computer regardless of the simulation period of time. It is hence possible to create a program executable in a general-purpose computer commonly used.

Moreover, in the generation methods of control conditions according to the present invention, the state of complex changes of control variables need not be specified with numeric values and it is not necessary to re-execute a program each time the value of a control variable is changed. Since the graph of changes in the control variables thus generated while visually checking the graph can be automatically transformed into control conditions, the user need not carry out complex operations.

BRIEF DESCRIPTION OF THE DRAWINGS

These and other objects and advantages of the present invention will become apparent by reference to the following description and accompanying drawings wherein:

FIG. 16 is a diagram showing an example of input information determining a simulation of NaCl melting behavior;

FIG. 18 is a diagram showing an example of data of shape of spatial region where the NaCl melting behavior is simulated;

FIG. 19 is a diagram showing an example of data of particle attributes in the simulation of NaCl melting behavior;

FIG. 20 is a diagram showing an example of data of control conditions in the simulation of NaCl melting behavior;

FIG. 21 is a diagram showing an example of data of equations of motion in the simulation of NaCl melting behavior;

FIG. 28 is a diagram showing an example of internal representation of asymptotic equations in the tree graph format;

FIG. 29 is a diagram showing a method of an analysis process of differential according to the internal representation of numeric expressions in the tree graph format;

FIG. 30 is a diagram showing a method of a transform process according to the internal representation of numeric expressions in the tree graph format;

FIG. 31 is a diagram showing an example of a specification of dimensions in a header program;

FIG. 32 is a diagram showing an example of a specification of common variables in a header program;

FIG. 33 is a diagram showing an example of a data file of initial values;

FIG. 34 is a diagram showing an example of a program for reading initial values;

FIG. 36 is a diagram showing an example of a selection for exclusive selection items in an interactive input method;

FIG. 37 is a diagram showing an example of data of control conditions for which environmental variables are complicatedly altered;

FIG. 39 is a table showing subdivision of a period of time into a plurality of stages for the respective points of variations of the environmental variables;

FIG. 53 is a diagram showing the configuration of a computer system to which the present invention is applied.

DESCRIPTION OF THE PREFERRED EMBODIMENTS

Figure 1:
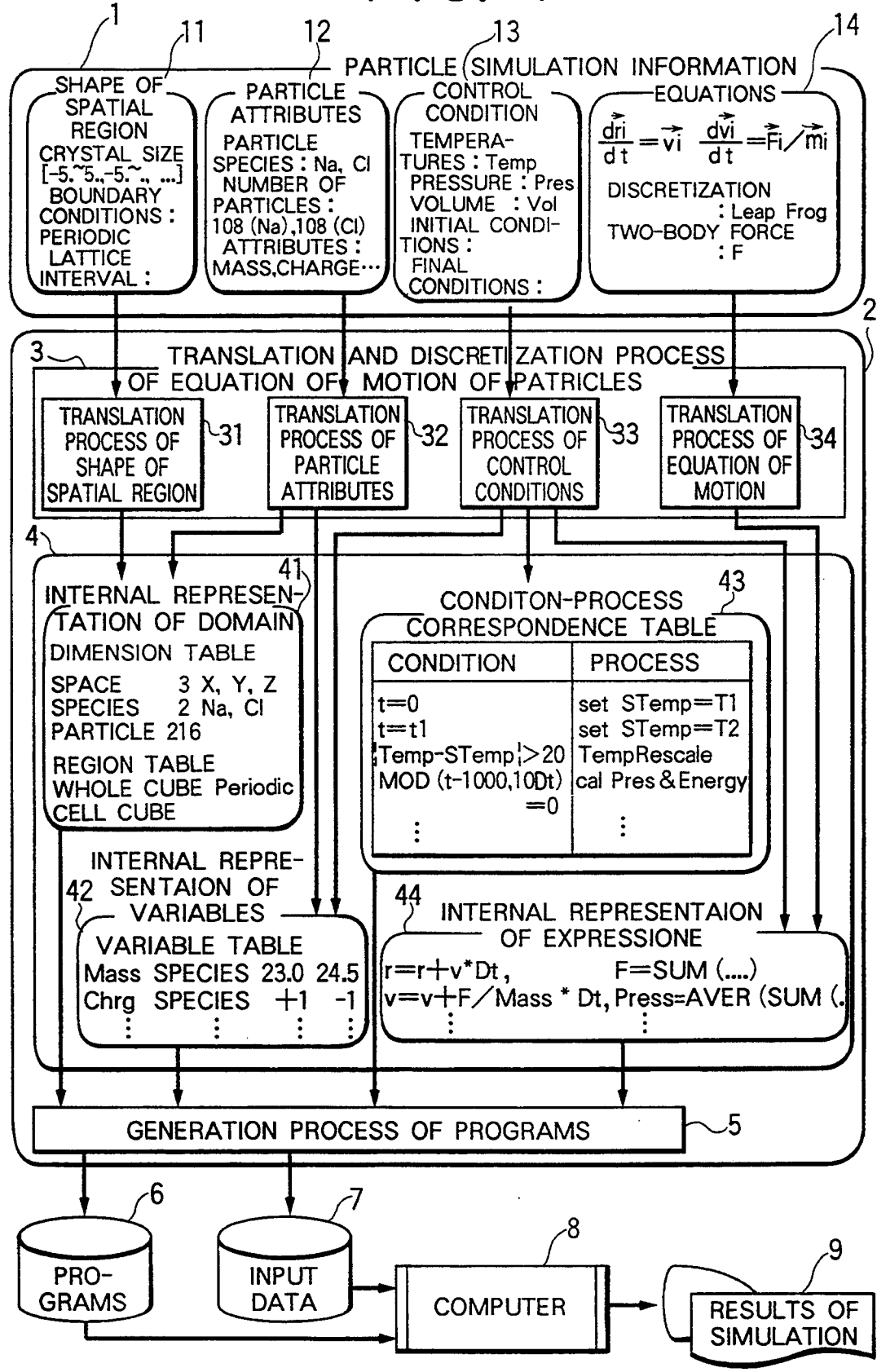
FIG. 1 is a diagram showing the constitution of a simulation apparatus in an embodiment according to the present invention.

FIG. 1 shows the structure of a simulation apparatus employing a program generation method in accordance with the present invention. In the simulation apparatus, based on simulation information 1 including description of information such as equations of motion of particles dominating physical phenomena, a shape of a spatial region in which the phenomena appear, definition of particle attributes, methods of discretization, and control conditions of simulation environments, an automatic generation process 2 of programs generates calculation programs 6 in the FORTRAN and simulation input data 7. A computer 8 reads simulation input data 7 according to the generated programs 6 to achieve a simulation and produces results of simulation 9.

FIG. 53 shows an embodiment in which the simulation apparatus of FIG. 1 is implemented on a computer. In this diagram, a computer 530 has a memory 31 in which data 532 necessary for generating calculation programs and programs 533 for implementing the present invention are stored. Moreover, the computer 530 is connected to an external storage for storing therein the calculation programs 6 and the simulation input data 7, which are generated as above, and an input/output devices 534 for displaying information such as an intermediate result during a program generation. With a portion of the data 532 and the programs 533 shown in FIG. 53, the automatic program generation process 2 of FIG. 1 is executed. Furthermore, in the computer 53 of FIG. 53, there is disposed a data base (not particularly shown in FIG. 53) loaded with various kinds of libraries to be utilized in the embodiment of the present invention. These libraries are referenced when necessary during the generation process of programs.

Description will be given of an outline of the operation of the generation process of programs 2 according to the present invention.

The program generation process 2 includes a translation and discretization process of equation of motion of particles 3 and a generation process 5 of programs. The process 3 receives as an input thereto the particle simulation information 1 to produce various internal representations 4 kept in a form facilitating references thereto in subsequent processes. The representations 4 include specifications stipulating in detail information necessary for generating programs. Namely, programs are generated according to the internal representations. The program generation process 5 receives as inputs thereto the various internal representations to create the calculation programs 6 and the simulation input data 7.

(1) Particle simulation information 1

First, description will be given of the input to the translation and discretization process of equation of motion of particles 3, namely, the contents of the particle simulation information 1 as the input to the program generation process 2.

The particle simulation information 1 includes a definition of shape of spatial region 11, a definition of particle attributes 12, a definition of control conditions 13, and a definition of equations 14. The definition of particle attributes 12 stipulates an object of the simulation, the definition of shape of spatial region 11 and the definition of control conditions 13 determine an environment of the simulation, and the definition of equations 14 designates motion of particles.

(1-1) Definition of shape of spatial region 11

The definition of shape of spatial region 11 includes such information items as dimensions of space, a definition of a particular range of the space, a range of the overall spatial region, and boundary conditions.

a) The dimensions of space indicate dimensions of the space where particles exist. Ordinarily, one-, two-, or three-dimensional space is specified. However, depending on the contents of the simulation, there may be introduced a degree of freedom of, for example, a spin. Namely, four or more dimensions may be specified. In the program generation method of the present invention, the simulation is achieved independently of the number of dimensions. Namely, it is not required to combine the contents of various processes with each other depending on the dimensions. In short, the number of dimensions is regarded as data so as to execute an identical process independently thereof. Consequently, an arbitrary number of dimensions of space can be specified.

b) The definition of a particular range of space is used to assign a particular name to a portion of the overall spatial region. This facilitates describing various kinds of definitions. For example, in a case where the value of temperature varies between portions of the spatial region, if names of the respective portions of the space are specified in the definition of spatial region, it is possible in the definition of environmental controls to designate an objective partial region only by specifying the name thereof. There are supported two methods of designating information items determining a range of the spatial region. In the first method, a name of a shape of region and a size thereof are specified. In the second method, there are specified a plurality of inequalities representing boundaries such that a space region satisfying these inequalities is determined as the range of spatial region.

c) The range of overall spatial region specifies the range of spatial region where particles exist or are movable.

d) The boundary conditions denote a process method of particles on boundaries of the range of spatial region. For boundary conditions used in many simulations, the process contents on boundaries can be beforehand registered so that the boundary conditions are defined only by designating names assigned thereto. The contents of boundary conditions to be beforehand registered include periodic boundary conditions used when the range of spatial region is connected in an infinite sequence and fixed boundary conditions utilized when reflection occurs on boundaries in a classical manner. The other general boundary conditions are defined by specifying the contents of processes on each boundary.

(1-2) Definition of particle attributes 12

The definition of particle attributes 12 includes information items such as the number of kinds of particles, the number of particles of each kind, specification of particular particles, definition of particle attributes, definition of constants in particle attributes, and initial values of variables in particle attributes.

a) The number of kinds of particles designates the number of groups of particles respectively having different attribute values. Process contents to be executed are not varied depending on the number of kinds of particles. Namely, the number of kinds of particles is regarded as data so as to conduct an identical process independently thereof. Consequently, like the number of dimensions, the number of particle kinds is not limited.

b) The number of particles of each kind denotes, for each defined kind of particle, the number of particles of the kind.

c) Specification of particular particles includes a definition of name for each kind of particle and definition of name for specifying particles for which a different process is to be carried out in the simulation. This facilitates description of various kinds of definitions.

d) The definition of variables of particle attributes denotes names of attributes of particles and indices necessary to specify the values of attributes. For example, the attribute "mass of particle" varies between the kinds of particles and hence has an index "kind of particle"; moreover, the attribute "position of particle" has a value varying between the particles and hence has an index "particle number".

e) The definition of constants in particle attributes designates, for the defined variables of particle attributes, variables having fixed values in the simulation and the values thereof. For this purpose, names of constants appearing in the definition of constants are beforehand described in the definition of variables in particle attributes, and the number of elements are also required to be specified. The constants in particle attributes include the mass and charge of particle of each kind, parameters of interparticles potential, and the like.

f) The definition of initial values of variables in particle attributes establishes, for the defined variables in particle attributes, variables having particular values at the start point of the simulation and the values thereof. Names of constants appearing in the definition of initial values are also beforehand described in the definition of variables in particle attributes, and the number of elements are also required to be designated. The initial values of variables in particle attributes include, for example, a position and a velocity of particle of each kind.

(1-3) Definition of control conditions 13

The definition of control conditions 13 includes information specifying the definition of environmental attributes, definition of environmental control conditions, and definition of auxiliary processes.

a) The definition of environmental attributes designates attributes other than the particle attributes, namely, attributes broadly determining environments where the simulation is to be executed. For example, there exist such specifications of environments adopted in a limited range as temperature, pressure, volume, and time and such designations of environments utilized in a broad range as the Boltzmann constant, dielectric constant, circle ratio, and time steps. In the definition, there are designated names of attributes stipulating these environments and indices necessary to specify values of the attributes. For example, in a case where a spatial region is complicatedly subdivided into partitions and states of temperature, pressure, and the like vary between the partitions, each of the temperature and the pressure is assigned with an index called a spatial region number. Among the defined variables of environmental attributes, those having fixed values during an execution of simulation are defined as constants.

b) The definition of environmental control conditions specify contents of processes to be executed when a pertinent variable of environmental attribute satisfies a particular condition during an execution of simulation. In the definition, a correspondence relationship is required to be established between an execution condition and the contents of process.

c) According to the present invention, when describing the contents of process in the environmental control conditions, a particular name can be specified for a procedure of a sequence of processes, thereby minimizing the amount of description and facilitating description. The name and the sequence of process procedures are described as a definition of auxiliary processes.

(1-4) Definition of equations of motion 14

The definition of equations of motion 14 includes definition of equations, definition of discretizations, and definition of auxiliary functions.

a) In the definition of equations, equations dominating a system where a simulation is achieved are described with the defined variables of particle attributes and environmental attributes. When describing equations, the names of the defined variables of particle attributes are employed. Consequently, it is unnecessary to describe an equation for each particle because variables of the respective particles are automatically developed when the equation is translated.

b) The definition of discretizations designates specific methods of discretizing equations. The basic discretization to be usually employed is beforehand defined in the process system for easy specification thereof. When using other discretization methods, the user is required to define the methods according to the predetermined procedure. The specific procedure for specifying the methods will be described later in detail in conjunction with embodiments in this specification.

c) According to the present invention, when describing the contents of process in the definition of equations, a particular name may be specified for a procedure of a sequence of processes so as to minimize the amount of description and to facilitate the description. The name and the contents of a sequence of processes are described as the definition of auxiliary functions.

(2) Translation and discretization process of equation of motion of particles 3

Next, description will be given of the contents of the translation and discretization process of equation of motion of particles 3.

This process 3 includes a translation process of shape of spatial region 31, a translation process of particle attributes 32, and a translation process of control conditions 33, and a translation process of equation of motion 34.

(2-1) Translation process of shape of spatial region 31

Figure 2:
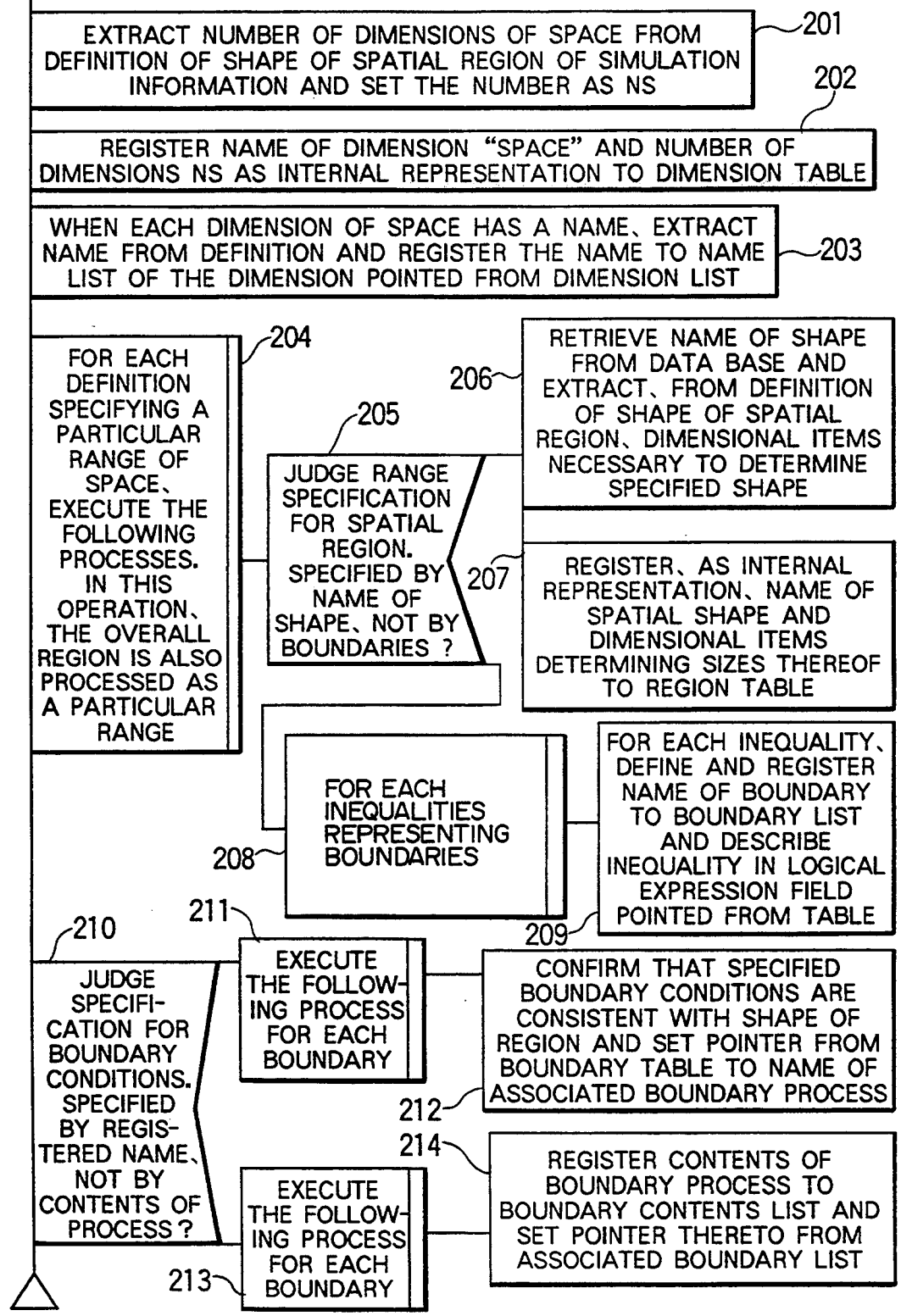
FIG. 2 is a process flowchart of a translation process of shape of spatial region.

This process 31 interprets the definition of shape of spatial region 11 to acquire therein a shape of region of a system where a simulation is to be executed, thereby creating an internal representation of domain 41 in the format to be easily referenced in the subsequent translation process. FIG. 2 shows a process flow of the translation process 31.

First, a process 201 extracts the number of dimensions from the definition of shape of spatial region 11 of the particle simulation information 1, and then a process 202 registers the value as the number of dimensions for a dimension name "SPACE" to the internal representation of dimension list. A process 203 extracts, when each dimension is assigned with a name, each name from the definition to register the name to a name list of the associated dimension pointed from the dimension list. A process 204 interprets a spatial region of each of the described particular region including the overall region to register a result of interpretation as the shape of region. The range of spatial region can be specified by a name of shape or boundaries. Consequently, a process 205 judges to decide whether the spatial region is designated by a name of shape or boundaries to select an appropriate process. For the specification by a name of shape, a process 206 confirms that the designated name of shape has already been registered and then extracts, from the definition of shape of spatial region, dimensions or sizes necessary for deciding the shape. A process 207 registers the name of shape and the sizes to the region list. For the specification of a region by a plurality of boundaries, a process 208 repeatedly executes the following process 209 until all inequalities representing boundaries are completely processed. Namely, the process 209 defines a name boundary for each inequality to register the name to a boundary list and then describes the inequality in a logical expression field pointed therefrom.

Finally, a boundary condition is extracted to be registered to the internal representation 41. The boundary condition can be specified by names beforehand registered or by the contents of processes on the respective boundaries. Consequently, a process 210 judges to determine whether the boundary condition is specified by a registered name or the contents of processes to select an appropriate process. When the registered names are used, a process 211 achieves a process 212 for each specification of boundary. The process 212 confirms that the denoted boundary condition is consistent with the shape of region and then sets a pointer from the boundary list to a name of an associated boundary process, thereby registering the boundary condition name. On the other hand, when the contents of processes are used for the specification, a process 213 achieves a process 214 for each specification of boundary. The process 214 registers the contents of boundary processes to the list of boundary contents and then sets a pointer from an associated boundary list thereto.

The translation process of shape of spatial region 31 produces as a result of processing above an internal representation of domain 41 including a dimension list, a region list, a boundary list, and a boundary condition list.

(2-2) Translation process of particle attributes 32

Figure 3:
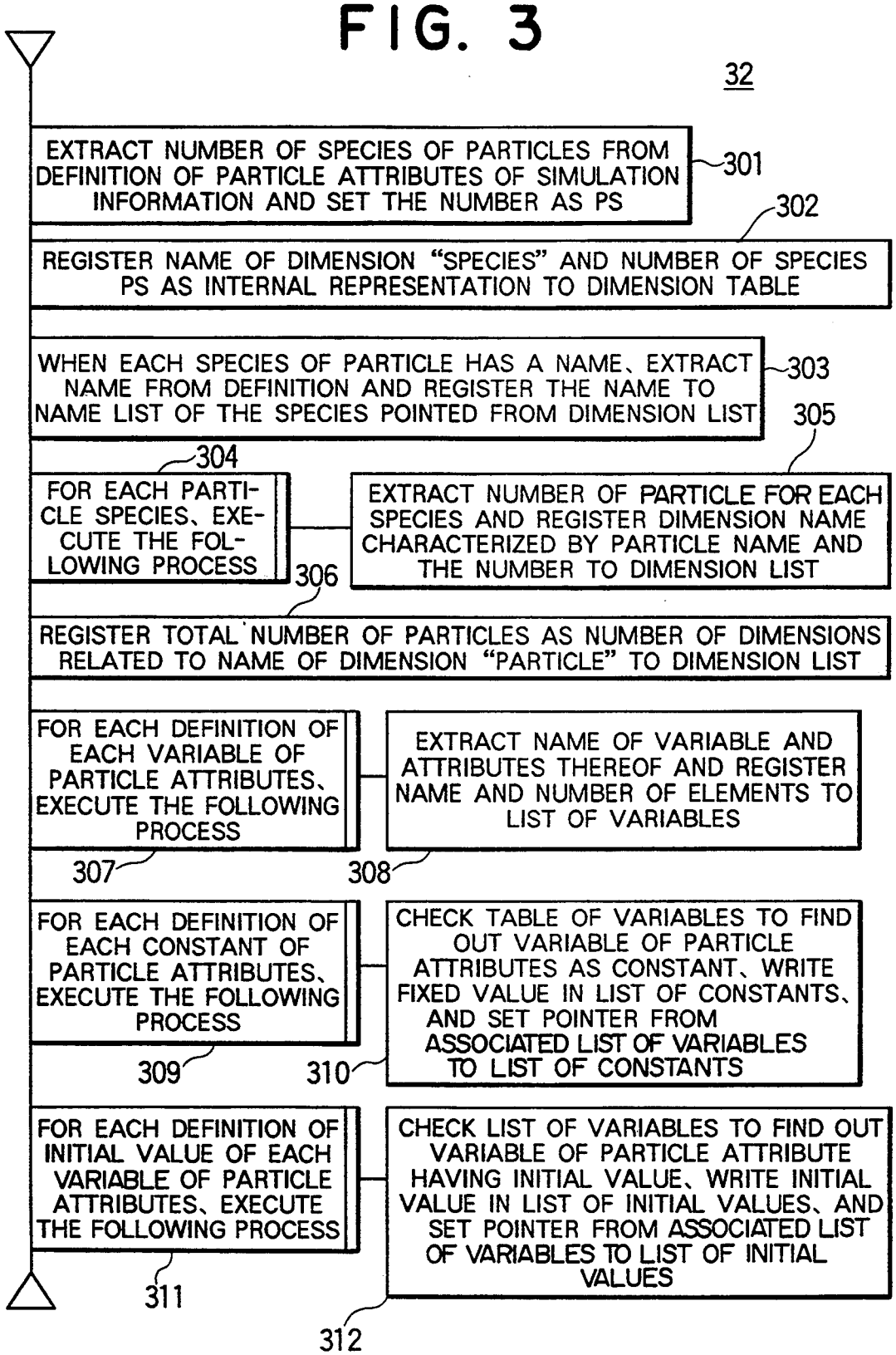
FIG. 3 is a process flowchart of a translation process of particle attributes.

The translation process of particle attributes 32 interprets the definition of particle attributes 12 to acquire therein information of particles for the simulation and then update the internal representation of domain 41 in the format facilitating reference thereto in the subsequent translation process, thereby generating an internal presentation of variables 42. FIG. 3 shows the process flow of the translation process of particle attributes 32.

First, a process 301 extracts the number of particle species from the definition of particle attributes 12 of the particle simulation information 1 to store the number in a field assigned to the variable PS. A process 302 registers the value as the number of dimensions for the dimension name "SPECIES" to the internal representation of dimension list. A process 303 extracts, when a name is specified for each particle species", the name from the definition and sets a pointer from the dimension list to a name list of each particle species.

Next, the number of particles of each species is acquired. A process 304 conducts the following process 305 for each species of particles. The process 305 extracts the number of particles of each species and then registers to the dimension list a dimension name characterized by the particle name and the number of the particles. The dimension name in this case is represented by the particle name to which Num denoting the number is added. A process 306 calculates the total of the numbers of the particles of the respective species to set the result as the number of dimensions for the dimension name "PARTICLE" to the dimension list.

Subsequently, based on beforehand inputted dimensional information of space and particles, there are defined variables of particle attributes. A process 307 executes the following process 308 for each of the contents defined for each variable of particle attributes. The process 308 extracts, from the definition of variables of particle attributes, a name of variable and attributes thereof to register the name and the number of elements to the list of variables. In this case, the number of elements is denoted by a dimension name recorded in the dimension list of the internal representation of domain 41. For example, when the number is identical to the number of dimensions of space or the total number of particles, the user specifies SPACE or PARTICLE, respectively. Thereafter, among the variables of particle attributes, those having fixed values during an execution of the simulation are defined.

A process 309 conducts the following process 310 for each of the contents defined for the constants in particle attributes. The process 310 extracts, from the contents defined for the constants in particle attributes, a name of each constant and then checks the list of variables to detect a variable of particle attributes corresponding to the name. Moreover, the constant value is written in a list of constants and a pointer is established from the list of variables to the list of constants.

Furthermore, the variables of particle attributes are checked to detect those having initial values at the start point of the simulation to define the detected variables. A process 311 achieves the following process 312 for each of the contents defined for each initial value of particle attributes. The process 312 extracts from the defined contents a name of each variable having an initial value to detect an associated variable of particle attributes. In addition, the initial value is written in the list of initial values so as to establish a pointer from the list of variables to the list of initial values.

Through the processes above, the translation process of particle attributes 32 additionally registers information items to the dimension list in the internal representation of domain 41, generates the list of variables, the list of constants, and the list of initial values in the internal representation of variables 42, and sets pointers to establish linkages therebetween. With the provisions above, the number of elements of an objective variable can be easily decided by sequentially referencing the lists beginning from the list of variables. Moreover, whether the variable has a constant value or an initial value can be readily recognized.

(2-3) Translation process of control conditions 33

Figure 4:
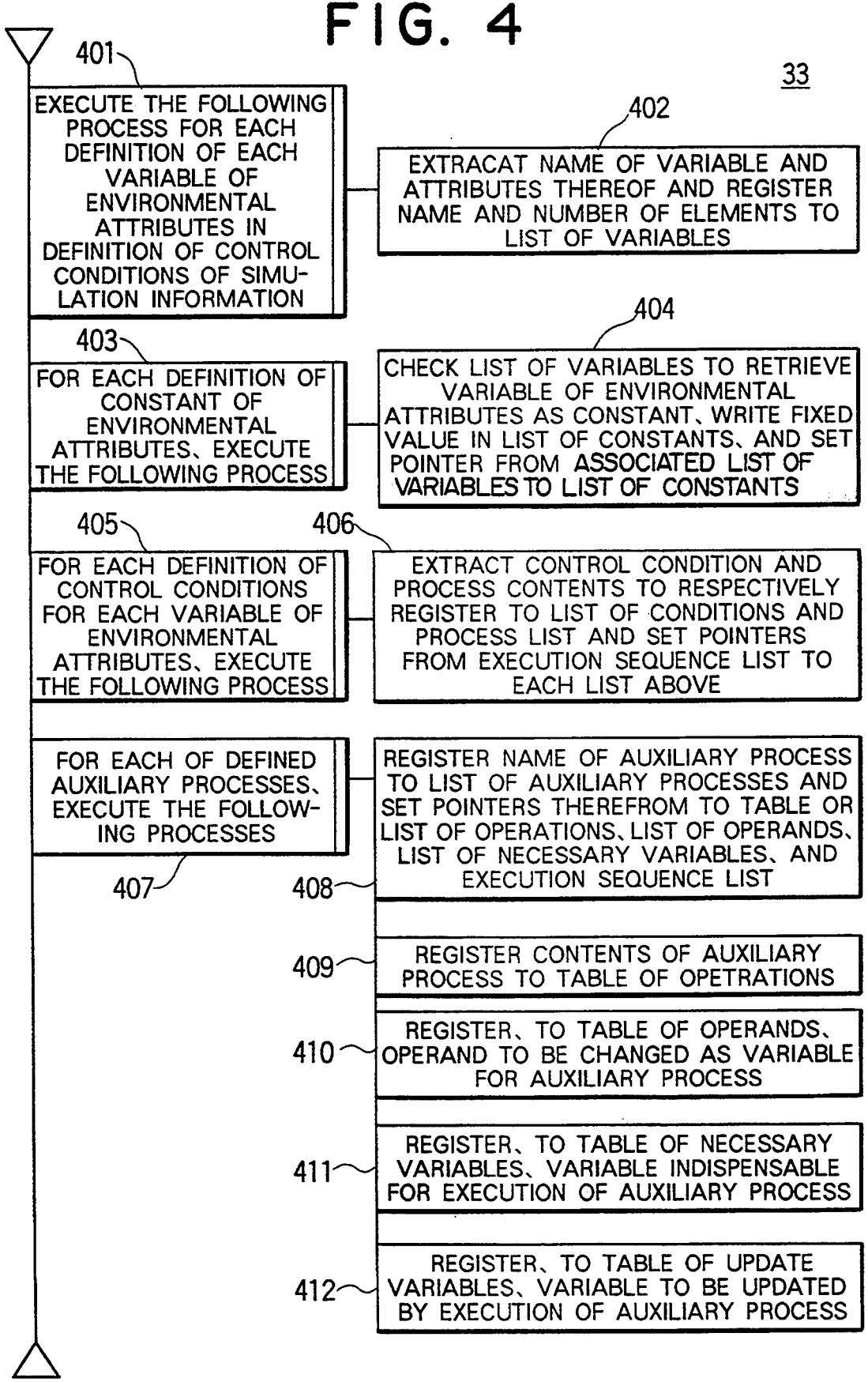
FIG. 4 is a process flowchart of a translation process of control conditions.

The translation process of control conditions 33 interprets the definition of control conditions 13 to acquire therein the contents for controlling an execution of the simulation, thereby creating an internal representation of variables 42, a condition-process correspondence table 43, and an internal representation of expressions 44 in the format to be easily reference in the subsequent translation process and generation process of programs. FIG. 4 shows the process flow of the contents of translation process of control conditions 33.

First, a process 401 executes, based on the definition of control conditions 13 of the particle simulation information 1, the following process 402 for each of the contents defined for each variable of particle attributes. The process 402 extracts, from the definition of the variables of environmental attributes, a name of each variable and attributes of the variable to register the name and the number of elements to the list of variables in the internal representation of variables 42.

Next, among the variables of environmental attributes, those having fixed values during an execution of the simulation are defined. A process 403 conducts the following process 404 for each of the contents defined for the constants in the environmental attributes. The process 404 extracts a name of each constant from the definition of constants in environmental attributes and then checks the list of variables to detect a variable of environmental attributes corresponding to the name. In addition, the fixed value is written in the list of fixed values and then a pointer is set from the list of variables to the associated list of fixed values. The operation above is identical to that employed for the variables of particle attributes.

Subsequently, the control contents of the variables of environmental attributes are recognized to be stored in the system in the format to be easily referenced, namely, with correspondences established between the control conditions and process contents. A process 405 carries out the following process 406 for each definition of control conditions for the environmental variables. That is, the process 406 respectively extracts control conditions and process contents from the definition to register the obtained items respectively to the condition list and the process list and then sets pointers thereto from the execution sequence table. In the condition list, the registered items are represented by logical expressions with the list of various variables. The conditions include, in addition to the initial and final conditions, a condition of time when the temperature reaches a preset value and a condition of time when a predetermined simulation time is detected. In the process list, the items are stored in an order related to process names and operands. The process list includes, in addition to the initial and final conditions, such information as control information for changing simulation environments when necessary and information of physical quantities and timing for calculating the quantities. The process list facilitates referencing an execution timing of a process and the execution contents thereof.

Among the process names in the process list, those other than the names already registered, for example, by assignment in the process mechanism are required to be separately specified as definition of auxiliary processes. A process 407 carries out the following processes 408 to 412 for each definition of auxiliary processes. The process 408 extracts the process name of each auxiliary process to register the name to the auxiliary process list and then sets pointers therefrom to the list of operations, the list of operands, the list of necessary variables, and the list of update variables. The process 409 describes the contents of auxiliary processes in the list of operations and the process 410 registers to the operand list operands which can be varied as variables of auxiliary processes. Moreover, the process 411 collects variables necessary to analyze the execution contents of auxiliary processes to register the variables to the list of necessary variables. In addition, the process 412 extracts variables to be updated when the pertinent auxiliary processes are executed and then registers the variables to the list of update variables. Thanks to the definition of auxiliary processes, for example, variables to be calculated for an execution of each auxiliary processes can be readily known and variables to be altered after the execution can be easily recognized.

(2-4) Translation process of equation of motion 34

Figure 5:
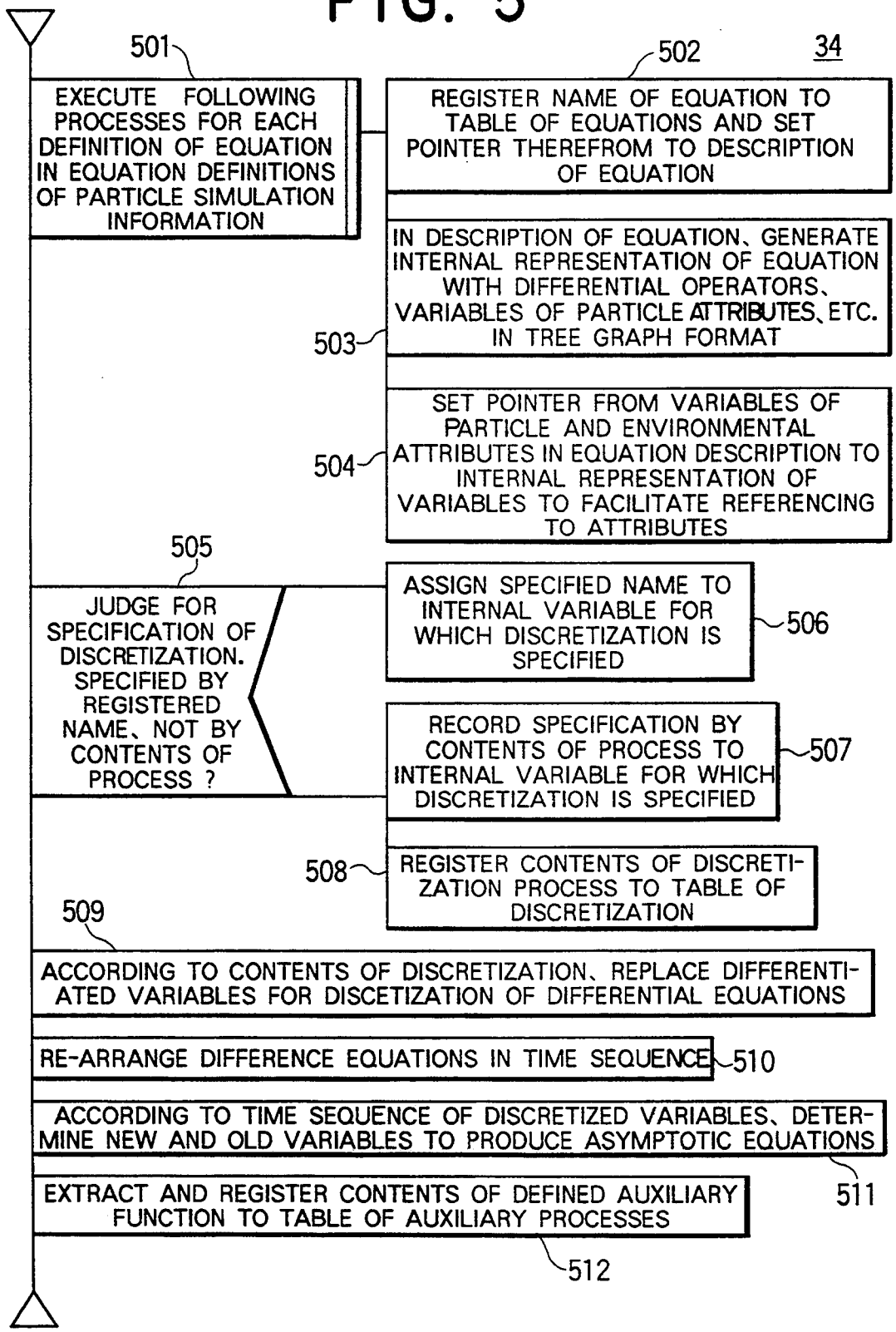
FIG. 5 is a process flowchart of a translation process of equations of motion.

The translation process of equation of motion 34 interprets the definition of equations 14 to acquire therein the contents of equations dominating the motion of particles so as to generate internal representation of expressions 44 in the format to be easily referenced in the subsequent translation process and generation process of programs. FIG. 5 shows the process flow of the contents of the translation process of equation of motion 34.

First, a process 501 conducts the following processes 502 to 504 for each definition of equation of motion according to the definition of equation of motion 14 of the particle simulation information 1. The process 502 registers the name of each equation to the list of equations and sets a pointer therefrom to a description of equation of motion. When particular names are not specified as equation names, there are assigned sequential numbers as equation 1, equation 2, etc. for the names. The process 503 generates an internal representation of expressions in the tree graph format based on the description of equation thus indicated.

Figure 6A:
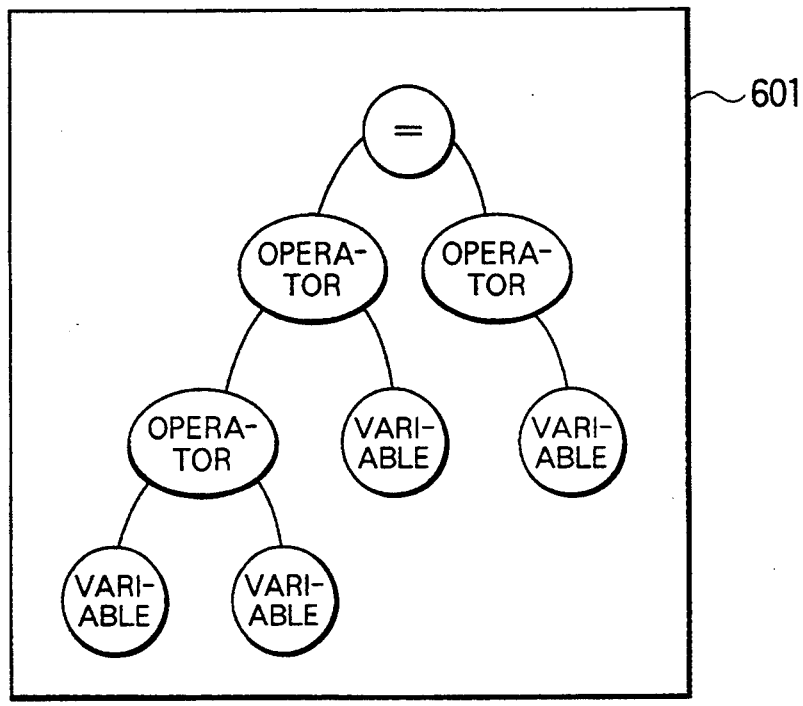
FIG. 6A is a diagram showing an internal representation of equations in the tree graph format.
Figure 6B:
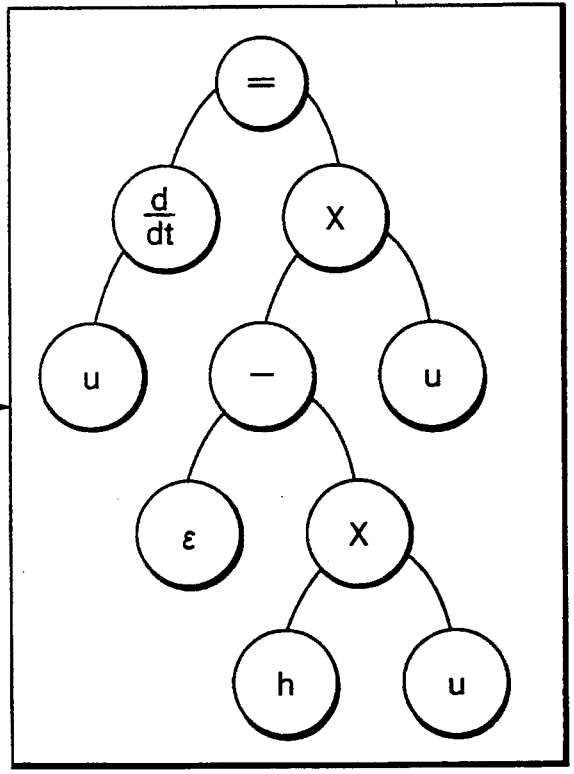
FIG. 6B is a diagram of a specific implementation of an equation as provided in a tree graph format provided in FIG. 6A.

FIG. 6A shows an example of a tree graph. An equal symbol satisfying the equation is located at a vertex and operators and variables are arranged in branches extending therefrom (601). An operator may have two branches or one branch. For example, an operator of addition, subtraction, multiplication, or division associated with two operands has two branches, whereas an operator of a differentiation with respect to time has only one branch. Only the equal symbol at the vertex and operators have branches, and only variables can terminate branches. A variable at a terminal has a pointer field pointing a list of variables, namely, pointers are set therefrom to the associated list of variables. For example, an equation 602 of FIG. 6B is recorded in a tree graph 603.

A process 505 of FIG. 5 extracts a description of discretization methods from the definition of equations 14 to determine a method of specifying the discretization method and then acquires therein the discretization method according to the specification. The discretization method may be specified by a registered name or by the contents of discretization process. When a registered name is specified, a process 506 keeps, as an internal variable, a numeric value representing the specified name itself. On the other hand, when the contents of discretization process are specified, a process 507 records, in the internal variable specifying the discretization method, the condition that the contents of process are to be specified in the internal variable specifying the discretization method. A process 508 registers the process contents of actual discretization in the list of discretization of the internal representation of expressions 44. In the subsequent discretization process, equations are discretized in accordance with the discretization method thus registered.

A process 509 executes discretization of differential equations. The discretization is accomplished in conformity with the discretization method beforehand obtained. According to the method, when time-dependent variables is subjected to a differential operator, the variables are replaced with predetermined combinations of variables dependent on time. In a simple discretization method, a differentiation of f(t) is replaced with $(f(t+\Delta t)-f(t))/\Delta t$. The contents of replacement vary between the respective discretization methods. Execution of the replacement of discretization for each differential automatically leads to a difference equation. Next, a process 510 re-arranges, when there exist a plurality of equations, the equations in accordance with time of variables contained therein. Moreover, for each variable of equations, a process 511 sets the variable of a new time as a new variable and the variable of old time as an old variable to generate asymptotic equations.

Through the processes above, the equations dominating the motions of particles are discretized by the specified discretization method and there are resultantly obtained asymptotic equations. According to the internal representation of expressions 44, by sequentially referencing pointers beginning from the list of equations, there can be easily acquired asymptotic equations in a time sequence. Furthermore, in the translation process of equation of motion 34, auxiliary functions can be defined for simple description of definition of equations. Namely, a process 512 in the definition of control conditions extracts the contents of auxiliary functions to register the contents to the auxiliary process list in the internal representation of expressions 44.

As a result of executions of the translation process of shape of spatial region 31, the translation process of particle attributes 32, the translation process of control conditions 33, and the translation process of equation of motion 34, there are produced, as data in lists and tables and tree graphs, the internal representation of domain 41, the internal representation of variables 42, the condition-process correspondence table 43, and internal representation of expressions 44. Specific formats of the respective internal representations will be described later in detail in conjunction with embodiments of the present invention.

(3) Generation process of programs 5

Figure 7:
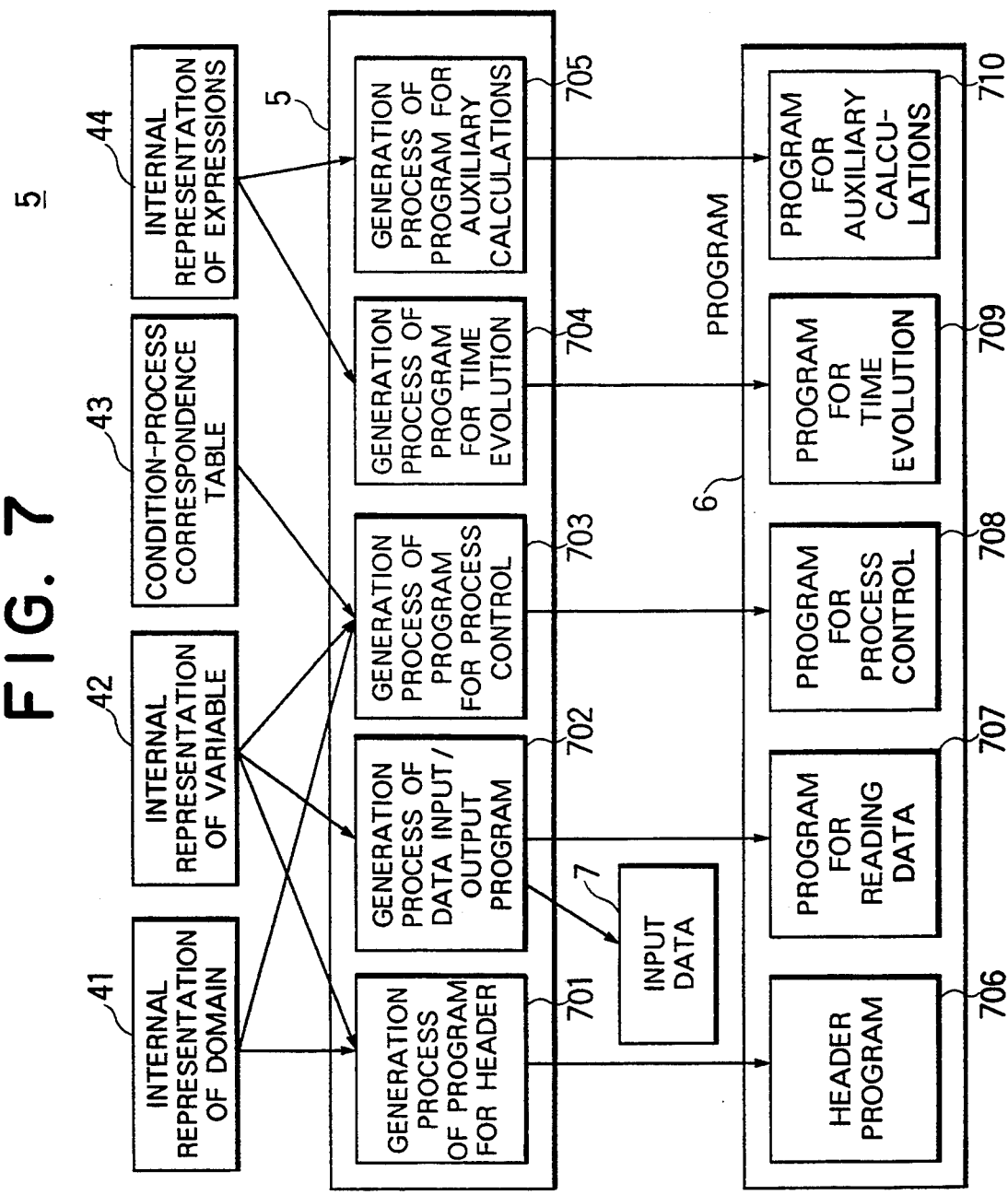
FIG. 7 is a block diagram showing the configuration of a process for generating input data and programs from various internal representations.

Next, description will be given of the contents of constituent sections of the generation process of programs 5. FIG. 7 shows the configuration of the generation process of programs 5 and input/output sections.

The generation process 5 receives as inputs thereto the internal representation of domain 41, the internal representation of region 42, the condition-process correspondence table 43, and the internal representation of expressions 44 to execute a generation process of header program 701, a generation process of data and input output program 702, a generation process of process control program 703, a generation process of program for time evolution 704, and a generation process of auxiliary calculations 705 so as to generate simulation input data 6 and a calculation program 7 including a header program 706, a program for reading data 707, a process control program 709, and a program for auxiliary processes 710.

(3-1) Generation process of header program 701

The generation process of header program 701 creates, based on the internal representation of domain 41 and the internal representation of region 42, a header program 706 containing specifications of dimensions and common variables for use in a simulation program to be generated. The internal representation of domain 41 as an input to this process has been produced by the translation process of shape of spatial region 31 and the translation process of particle attributes 32.

The internal representation of domain 41 includes a list of dimensions and a list of regions. The dimension list contains for each space the number of dimensions, a name of each dimension, the number of particle species, a name of each species, the total number of particles, and the like in the form to be readily referenced. Recorded in the region list are boundaries and boundary conditions for each of particular regions including the overall region. When a name of shape is specified as the boundary, sizes stipulating the shape are stored in the shape stipulating information; whereas, when a plurality of boundaries are designated by inequalities for the boundary specification, logical expressions are recorded as the shape stipulating information.

Moreover, for a boundary name having boundary conditions, there exists a pointer to the list of boundary conditions. For boundary conditions already registered, only names of the boundary conditions are recorded in the boundary condition list. For boundary conditions specified by boundary processes, there are recorded in the list process methods of variables for each boundary.

Figure 8:
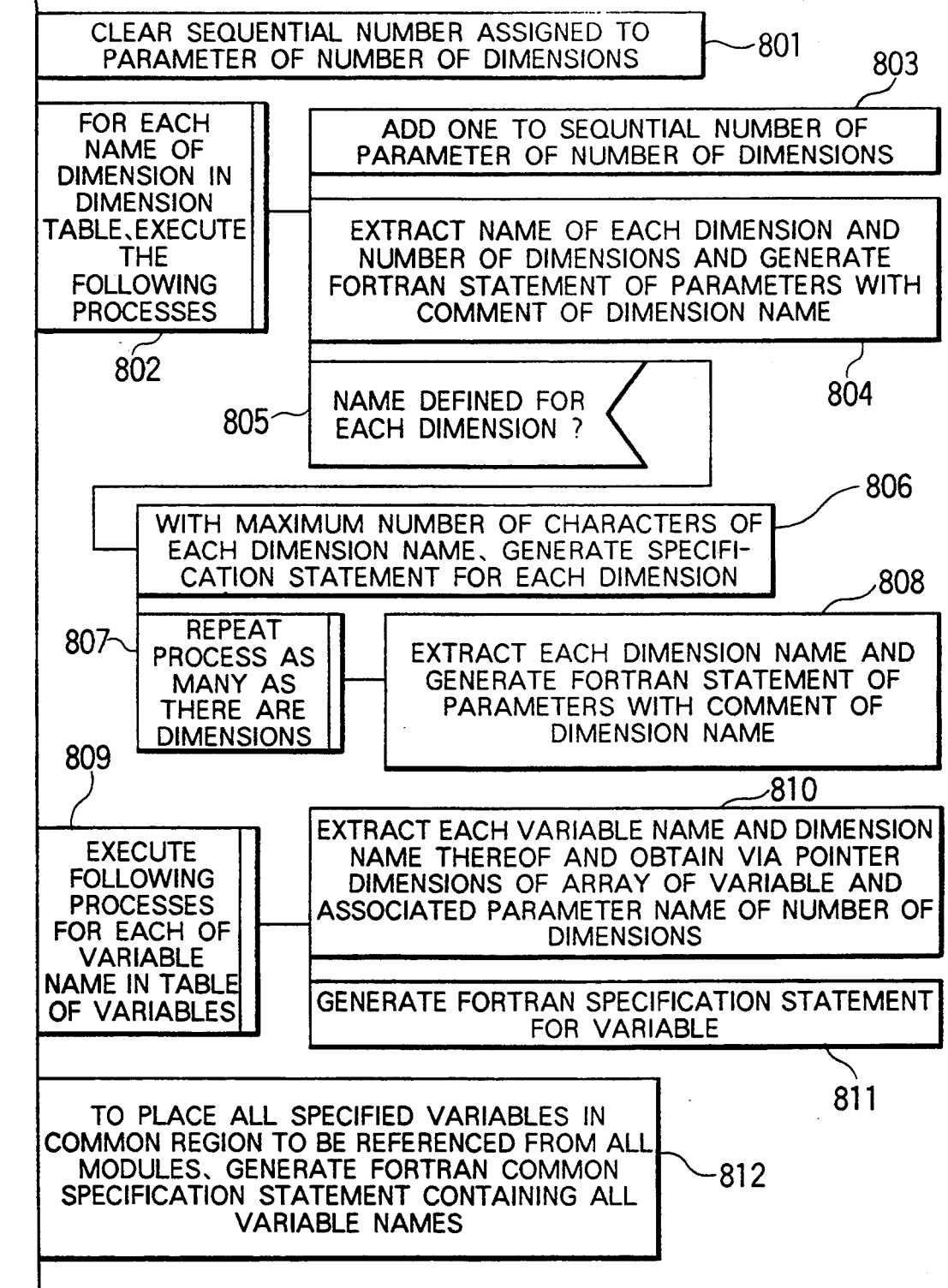
FIG. 8 is a flowchart showing a method of generating a header program.

The internal representation of variables as another input to the generation process of header program 701 has been produced by the translation process of particle attributes 32 and the translation process of control conditions 33. The internal representation of variables 42 includes a list of variables and a list of constants and a list of initial values which are pointed from the list of variables. In the list of variables, there are recorded variables of particle attributes, names of variables of environmental attributes, and the dimension name determining the number of elements. The list of constants and the list of initial values only contain a sequence of numeric values pointed from associated lists of variables. Meanings of the values are recognized according to the relationships therebetween. In the generation process of header program 701, a portion of specification of dimensions is first created. This portion is referenced, to determine the number of arrays, by a simulation program to be generated. Each of the number of dimensions of space, the number of particles, and the like is generally called a dimension and is specified by a parameter statement in the FORTRAN. FIG. 8 shows the process flow of the generation process of header program 701

First, a process 801 clears the sequence number of the parameter for the number of dimensions. A process 2 conducts the following processes for each dimension name in the dimension list of the internal representation of domain 41. A process 803 increments by one the sequence number of the parameter for the number of dimensions. A process 804 extracts the name of each dimension and the number of dimensions to generate a parameter statement in FORTRAN containing these items. In this operation, the dimension name is added thereto a comment for enhancing visibility of the program source. In addition, a process 805 judges to determine whether or not a name has been defined for each dimension, for example, "X", "Y", and "Z" of the dimensions of space. If this is not the case, the following processes 806 to 808 are executed. First, the process 806 generates, for each dimension, a statement specifying a character string with the maximum number of characters for each dimension name. Subsequently, for each dimension, a parameter statement defining the dimension name is created (process 808). By executing a process 807 achieving the process 808 for each dimension name contained in the internal representation of the dimension list, there is generated a portion of parameter specification in the header program 706 to be used in the simulation program.

Next, description will be given of the process for creating a specification of common variables based on the internal representation of variables 42. First, a process 809 executes the following processes 810 and 811 for each variable name in the list of variables of the internal representation of variables 42. The process 810 extracts each variable name and a dimension name thereof to trace related pointers for dimensions of an array of the variable and a parameter name of number of dimensions associated therewith. Based on the obtained variable name and dimension parameter name, the process 811 generates a statement of variable specification in the FORTRAN. Finally, a process 812 creates a statement of variable specification for each variable name and then a COMMON statement containing all variables. Resultantly, the specified variables are located in a common area to be referenced from all modules. As a result of execution of processes above, there is produced a header program 706 containing a portion specifying the number of dimensions and a portion specifying the common variables.

(3-2) Generation process of input output program 702

Figure 9:
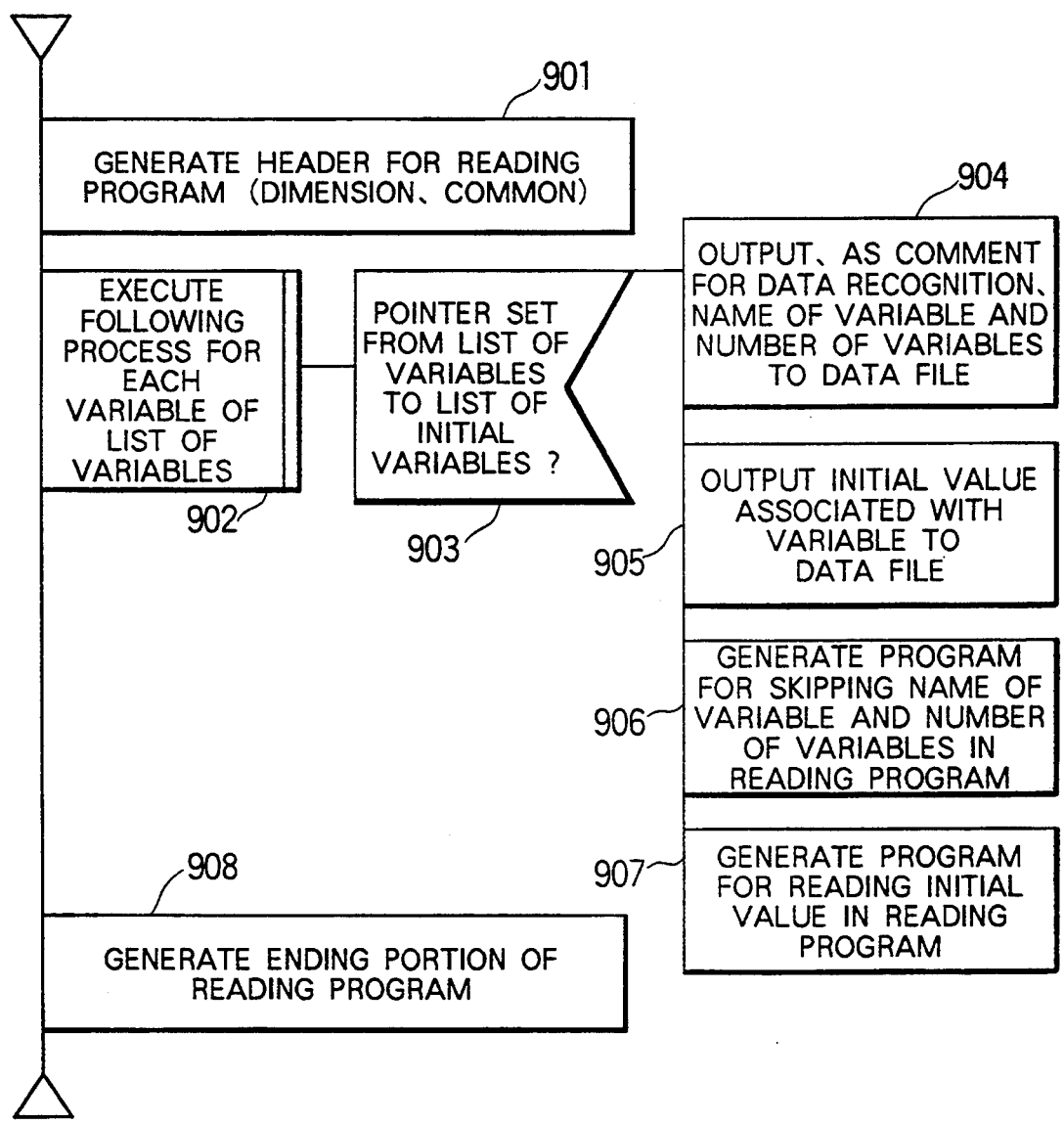
FIG. 9 is a flowchart showing a method of generating a data file and a program for reading data.

The generation process of input output program 702 extracts, from the internal representation of variables 42, variables having initial values to generate a file of data 6 and a program for reading data 707. FIG. 9 shows the process flow of the generation process of input output program 702.

First, a process 901 generates a header portion with an INCLUDE statement in the FORTRAN so that the dimension specification and the common variables can be referenced by the input output programs. The INCLUDE statement is used to acquire the header program 706 generated by the generation program of header program 701. Subsequently, a process 902 selects, from the variables included in the list of variables of the internal representation of variables 42, those having pointers to the list of initial values and then achieves the following processes 903 to 907 for each of the selected variables. For each variable, the process 903 judges to decide whether or not there exists a pointer from the pointer field to the initial value list. If the variable has an initial value, the processes 903 to 907 are sequentially executed. The process 904 adds the variable name and the number of elements as a comment for enhancing visibility of the contents of data. Next, the process 905 outputs to a data file an initial value corresponding to each variable. A process 906 generates a portion of program for skipping the variable name and the number of elements as the comment written in the data file. The process 907 creates a portion of program for reading an actual initial value. After the processes above are completely accomplished for all variables in the list of variables, a process 908 produces a footer or end portion of the reading program. As a result of execution of the processes above, there are created data of initial values for simulation 6 and the program for reading data 707.

(3-3) Generation process of process control program 703

The generation process of process control program 703 generates, based on the internal representation of domain 41 and the condition-process correspondence table 43, a program for achieving condition control, namely, a process control program 708 represented in the FORTRAN. This program is the main program controlling the overall simulation and calls a program for auxiliary calculations 710 and a program for time evolution 709, for example. The generation process of process control program 703 generates, according to the process flow shown in FIG. 10, the program for process control 708 having a process control flow of FIG. 11. There has already been known a method of creating, from the process control flow of FIG. 11, a main program of a simulation program described in the FORTRAN. The program for process control 708 is generated in conformity with the following procedure.

Figure 12:
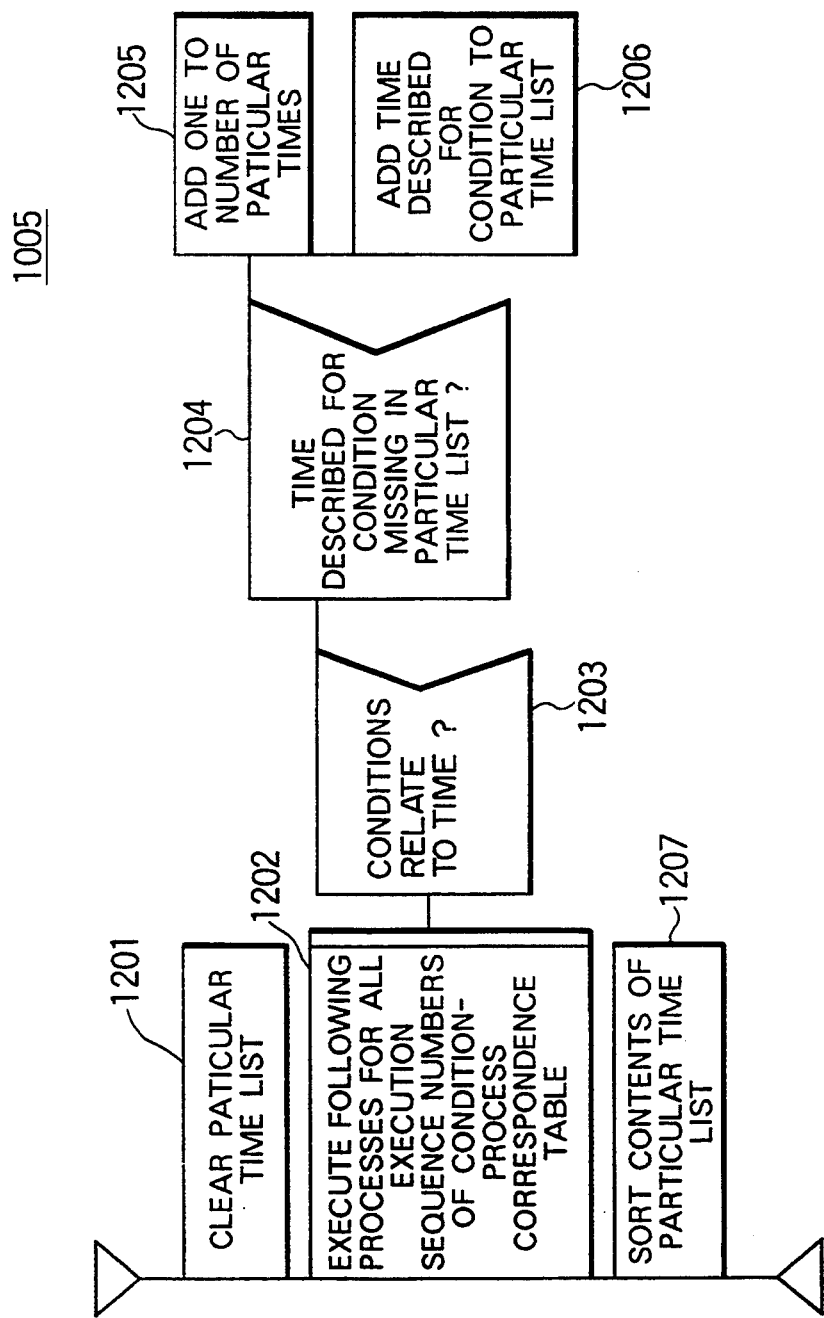
FIG. 12 is a flowchart showing a method of extracting a condition separation time.

A process 1001 creates a header portion of the process control program 708. Namely, an INCLUDE statement containing the specification of the number of dimensions and the specification of common variables beforehand generated as a header program is specified in the FORTRAN. A process 1002 produces a program portion 1110 for setting fixed values to be used in an execution of the simulation. Values associated with variables having pointers from the list of variables of the internal representation of variables 42 to the list of constants are defined by a DATA statement in the FORTRAN. A process 1003 generates a program portion 1102 for calling the program for reading initial values. The program for reading initial values 707 created by the generation process of data input output program 702 is called by a CALL statement of the FORTRAN to achieve the process for reading initial values. Subsequently, a process 1004 creates an iteration portion for update of time 1103, namely, an iteration loop in which the simulation time t is incremented by a time increment Δt for each operation from the start time to the end time. A process 1005 extracts a condition separation time. At the condition separation time, a branch takes place in the process control program. FIG. 12 shows details of the extraction process method.

A process 1201 clears the list of particular times containing the condition separation times thus extracted. A process 1202 achieves the following processes 1203 to 1206 for each execution sequence number in the condition-process correspondence table 43. The process 1203 judges to determine whether or not each condition includes a time condition. If this is the case, the process 1204 judges to decides whether or not the time of condition description already exist in the particular time list. If there exists a time of condition description missing in the list, the process 1205 adds one to the number of particular times and then the process 1206 adds the time condition description to the particular time list. When all times of condition description are completely registered, a process 1207 sorts the particular times in a time sequence, thereby completing the extraction of condition separation times. Moreover, according to the separation times thus extracted, a branch portion of time condition 1104 is generated. The program portion 1104 conducts a branch, when the time t is equal to the separation time, to pass control to a process associated therewith.

Figure 13:
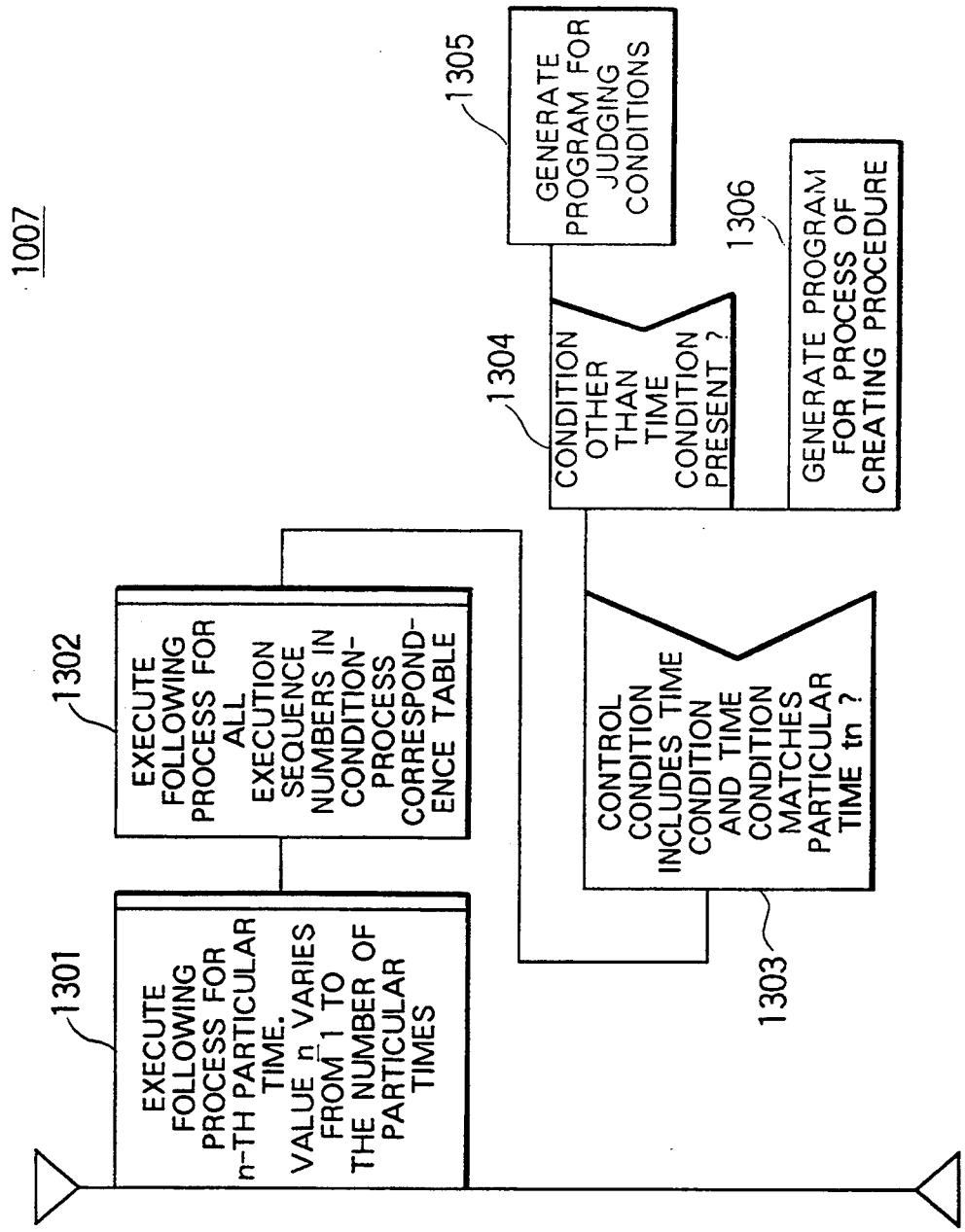
FIG. 13 is a flowchart showing conditional branches for conditions other than time conditions and a method of generating a program for process.

Subsequently, through processes 1006 and 1007 of FIG. 10, there are generated a portion of condition branch under each branch condition other than a time condition and a process portion related thereto, thereby creating programs associated with processes 1105 to 1107, respectively. FIG. 13 shows details of the process method.

A process 1301 achieves the following processes for the extracted condition separation time tn, where n ranges from one to n. A process 1302 conducts the following processes for each execution sequence item in the condition-process correspondence table. A process 1303 executes the following process only when the control conditions related to each execution sequence item include a time condition and match the particular time tn. When there are included conditions other than the time condition (process 1304), a process 1305 generates a condition judge program for checking the conditions. Thereafter, irrespective of presence or absence of the conditions other than the time condition, a process 1306 creates a program for a process of creating procedure associated with each execution sequence item. As a result of the operations above, there are produced the processes 1105 to 1107 related to time conditions.

Figure 14:
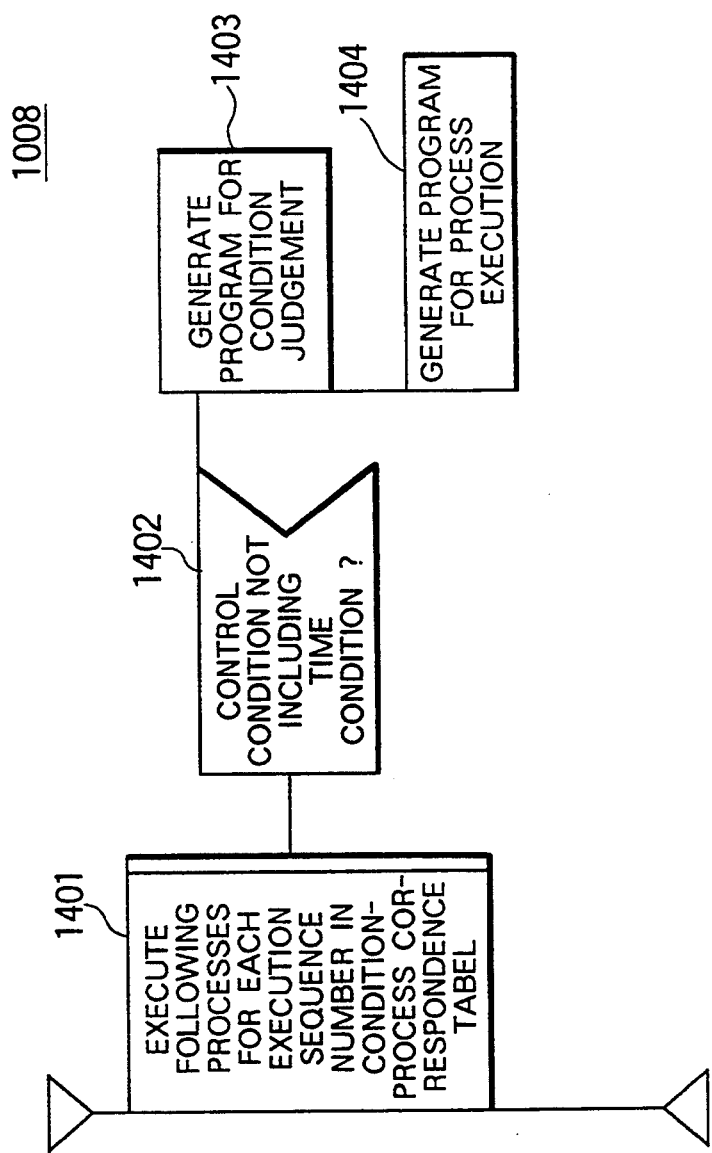
FIG. 14 is a flowchart showing a method of generating a program for process related to conditional branches for conditions other than time conditions.

A process 1008 generates program portions of branch and process for control conditions not including time conditions. FIG. 14 shows details of the generation method. A process 1401 achieves the following process for each execution sequence item in the condition-process correspondence table. A process 1402 extracts only control conditions not including time conditions to execute the following processes. A process 1403 creates a condition judge program 1108 for judging the control conditions and a process 1404 generates a program 1109 having the contents of execution to be conducted when the conditions are satisfied.

After all control conditions not including time conditions are completely processed, a process 1009 creates a call program 1110 for calling a program for time evolution 709 which is executed within the iteration loop of the simulation time. The program for time evolution 709 as an object of a CALL statement of the FORTRAN is described in the format of subroutine. The program 709 is created after the program for process control is generated. Finally, a process 1010 produces a program corresponding to the end or termination process 1111. Namely, there is created a program for executing a process specified to be effected when the end condition is satisfied; moreover, the STOP and END statements of the FORTRAN are outputted as the end program of the main program.

(3-4) Generation process of program for time evolution 704

The generation process of program for time evolution 704 generates, based on the internal representation of asymptotic equations in the internal representation of expression 44, a program for time evolution 709 in the FORTRAN. In the program 709, there is recorded a program for moving particles in accordance with the equations specified by the particle simulation information 1.

(3-5) Generation process of program for auxiliary processes 705

Figure 15:
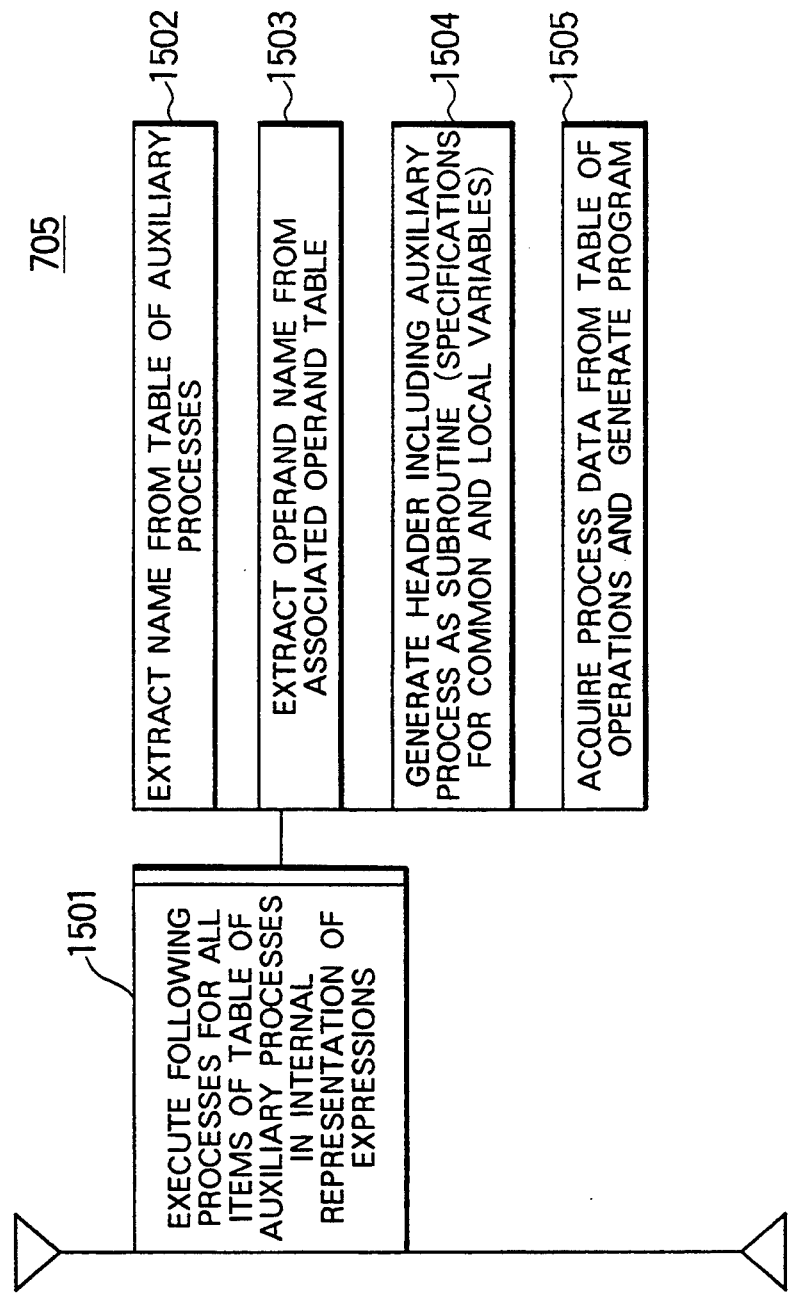
FIG. 15 is a flowchart showing a method of generating a program for auxiliary calculations.

The generation process of program for auxiliary processes 705 creates, based on the internal representation of expression 44 for the auxiliary processes, a program for auxiliary calculations 710 in the FORTRAN. In the program 710, there are recorded subroutines for calculating physical quantities such as a force resultant from internal interactions between particles, correction quantity of the center of momentum, energy, temperature, and pressure. This program 710 is accordingly produced as a set of plural subroutines. FIG. 15 shows the method of generating the program for auxiliary calculations 710.

First, a process 1501 conducts the following processes for each item in the list of auxiliary processes of the internal representation of expressions 44. A process 1502 extracts a name of each auxiliary process from the list and a process 1503 extracts an operand name from an operand list associated with the auxiliary process. A process 1504 generates a header to form the auxiliary process as a subroutine. That is, a header program 701 beforehand generated is incorporated therein by an INCLUDE statement of the FORTRAN and then there is created a specification statement for local variables to be used only within the subroutine. A process 1505 acquires process data from each operation list to generate a program associated with the contents of operation. Resultantly, the program for auxiliary processes 710 is produced.

A general description has been given of the operation of the automatic generation process of programs 2.

2. Specific examples

Next, for concrete explanation of embodiments, description will be given of the melting behavior of NaCl as an example of a particle simulation. An object of the simulation is to investigate physical properties of NaCl in the proximity of a melting temperature of NaCl and changes in a structure thereof.

(1) Specific example of simulation information 1

FIG. 16 shows an example of simulation information 1 determining the NaCl simulation.

(1-1) Information of shape of spatial region

Figure 17:
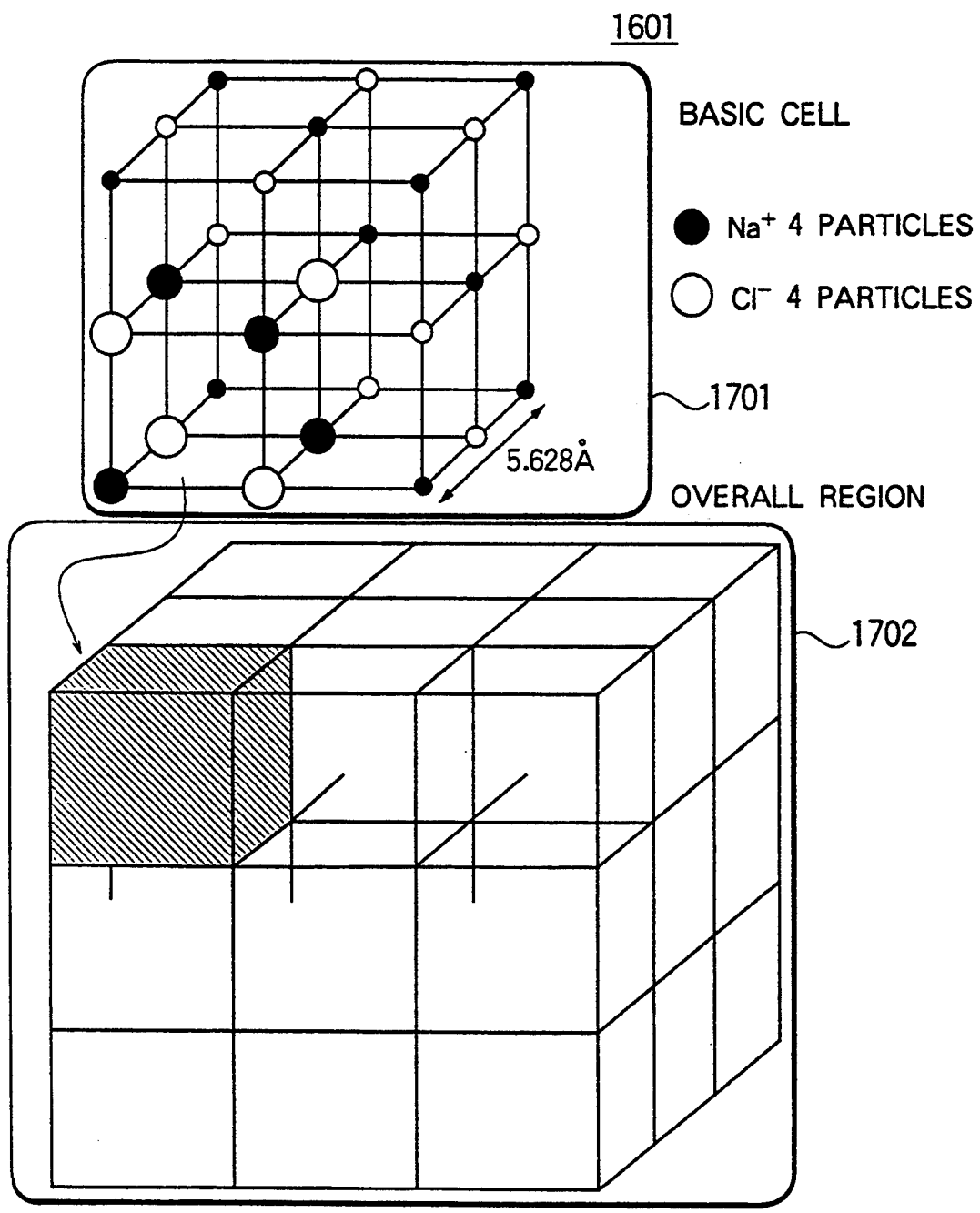
FIG. 17 is a conceptual diagram showing a spatial region where the NaCl melting behavior is simulated.

In FIG. 16, information of shape of spatial region 160 is a concrete example of the definition of shape of spatial region 11 of FIG. 1. The information 1601 indicates that a basic cell has an NaCl-type crystal structure and a lattice constant of 5.628 Å such that particles exist in a space in which three basic cells are sequentially arranged in the direction of each spatial axis. It is assumed that the region thus defined is sequentially arranged in an infinite series. FIG. 17 shows a conceptual diagram of the infinite series of the region. A basic cell 1701 is a cell of the NaCl crystal with the lattice constant of 5.628 Å. In the basic cell, four Na ions and four Cl ions are arranged. Large empty (white) and solid (black) circles stand for particles associated with the basic cell, whereas small empty and solid circles designate particles associated with the adjacent basic cell. An overall region 1702 is configured by arranging three basic cells 1701 in the direction of each spatial axis.

(1-2) Information of particle attributes

Returning now to FIG. 16, an example of input information will be described. Information of particle attributes 1602 is a specific example of the definition of particle attributes 12 of FIG. 1. The information of particle attributes indicates that the entire region 702 contains 108 particles of each species, namely, Na and Cl, the particles are arranged according to the NaCl-type crystal structure, and initial velocity thereof develops a Gaussian distribution at an initial temperature of 1296 K. In addition, there are indicated attributes of each species, namely, mass (Na=23.0, Cl=35.45) and charge (Na=+1, Cl=−1).

(1-3) Information of control conditions

Information of control conditions 1603 is a concrete example of the definition of control conditions 13 of FIG. 1. The information 1603 indicates that the time step for discretization is 2.5 femtoseconds, a setting temperature is 1296 K at a point of time 0, the temperature is 1310 K when ten picoseconds are elapsed thereafter, the temperature is to be re-scaled when the temperature of the system is different from the setting temperature by at least 20K, and physical quantities are calculated at an interval of 0.5 picoseconds in a range from t picoseconds to ten picoseconds and in a range from 15 picoseconds to 20 picoseconds.

(1-4) Information of equations

Information of equations 1604 is a specific example of definition of equations 14 of FIG. 1. The information 1604 defines equations of motions of particles and functions of undefined quantities adopted in the equations. In this example, a solid sphere ionic potential model is employed to represent potential of inter-particles interaction. Coefficients B, C, and D of the model are beforehand defined as particle attributes. Particularly, the interaction coefficient of the information of particle attributes 1602 is used as the coefficient B.

(2) Example of description of simulation information 1

(2-1) Information of shape of spatial region

FIG. 18 shows an example of description specifying information of shape of spatial region in the NaCl melting behavior simulation shown in FIG. 16. The contents of FIG. 18 specifically designate the definition of shape of spatial region 11 of FIG. 1 and include information defining dimensions of space 1802, information defining a particular range of space 1803, information defining overall range of spatial region 1804, and boundary conditions 1805. The information 1802 denotes that the space has three dimensions, namely, X, Y, and Z. The information 1803 designates that the basic region CELL has the NaCl-type crystal structure and the lattice constant of 5.628 Å. The information 1804 indicates that the range where phenomena take place has a shape developed by arranging three basic CELL regions in each axis direction. The boundary conditions 1905 denote that the overall region Whole is configured in a periodic arranged in an infinite sequence along the direction of each of X, Y, and Z axes.

(2-2) Definition of particle attributes

FIG. 19 shows an example of description of definition of particle attributes 1602 in the NaCl melting behavior simulation shown in FIG. 16. The contents of FIG. 19 specifically show an example of the definition of particle attributes 12 of FIG. 1 and include definition of particle species 1901, definition of number of particles 1902, information specifying particular species when necessary, definitions of variables of particle attributes 1903, 1904, and 1905, definitions of constants in particle attributes 1906, 1907, and 1908, and information for setting initial values of variables in particle attributes 1909 and 1910. The definition 1901 denotes that there exist two particle species and 108 Na particles and 108 Cl particles exist in the overall region Whole. The definition of variables of particle attributes 1903 designates that there exist variables Mass and Chrg each varying between species. The definition 1904 indicates that variables B, C, and D exist for combinations of species. The definition 1905 denotes that each particle has variables r, v, and F as vector quantities in the space. In the definitions, Mass represents the mass of particle, Chrg stands for electric charge of particle, B to D are quantities determining interactions between particles, r denotes a spatial position of particle, v designates the velocity of particle, and F indicates force acting upon particles. The definition of constants of particle attributes 1906 denotes that the variable of particle attribute Mass takes fixed values 23.0 and 35.45 respectively for Na and Cl. The other definitions 1907 and 1908 similarly denote associated conditions. The definition of initial values 1909 designates that each particle is initially arranged at a crystal lattice point in the entire region Whole. The definition 1910 designates that the velocity of each particle is determined according to a Gaussian distribution depending on the specified temperature, number of particles, and mass of particle.

(2-3) Information of control conditions

FIG. 20 shows an example of description of information of control conditions 1603 in the NaCl melting behavior simulation shown in FIG. 16. The contents of FIG. 20 specifically show an example of the definition of control conditions 13 of FIG. 1 and include definition of environmental attributes and control conditions 2001 and definition of auxiliary processes 2002 defining the contents of auxiliary processes used in the definition 2001. The definition 2001 includes definition of variables 2003, definitions of constants 2004 and 2005, definition of control conditions on initial stage 2006, definitions of control conditions on intermediate stage 2007, 2008, and 2009, and definitions of control conditions on final stage 2010 and 2011.

The definition of variables 2003 denotes that there exist environmental variables Energy, Temp, Press, t, DT, Eps, Elechrg, Boltz, Pi, STemp, T1, t0, etc. Energy stands for the total energy in the system, Temp represents a temperature of the system, Press indicates a pressure acting upon the system, t denotes time, DT designates a time step, Eps stands for a dielectric constant, Elechrg represents electron charge, Boltz, denotes the Boltzmann constant, Pi designates the circle ratio, and STemp indicates a setting temperature of the system. Moreover, T1 and T2 denote quantities defined for temperature, whereas t0 and the like designate quantities related to time.

The definition of constants 2004 indicates that the environmental variables Eps, Elechrg, Boltz, and Pi respectively have specified values. This also applies to the environmental variables T1, t0, etc. in the definition of constants. The definition 2006 designates that DT is set to 2.5 and the setting temperature STemp is set to T1, namely, 1296 K at the initial point of simulation.

The definition 2007 designates that the setting temperature STemp is set again to T2, namely, 1310 K when the time t is t1, namely, 5000 psec. The definition 2008 indicates that the temperature Temp is set again to the setting temperature STemp (TempRescale) when the temperature Temp is different from the setting temperature STemp by 20 K or more. The contents of TempRescale are specifically described in the definition of auxiliary processes. The definition 2009 denotes that physical quantities are calculated at an interval of 500 psec for the ranges of time t, namely, during t1 and t2 and during t3 and t4.

The definition 2010 denotes that the simulation is finished when the time t is equal to t4. The definition 2011 designates that in the operation above, the position r and velocity v of each particle are to be stored in a file. When the definition of environmental attributes and control conditions 2001 include the contents associated with auxiliary processes, it is necessary to describe the contents as definition of auxiliary processes 2002. The definition 2002 includes a plurality of definitions of auxiliary processes 2012. The definition 2012 describes the contents of process having an auxiliary process name TempRescale. TempRescale represents a process for setting again the temperature to Tt. That is, the velocity of each particle is adjusted so that the kinetic energy becomes to match the setting temperature. Specifically, the root of a ratio between the temperature of system T and the setting temperature Tt is multiplied by the velocity of each particle. Definitions are similarly specified for the other auxiliary processes.

(2-4) Information of equations

FIG. 21 shows an example of description of information of equations 1604 in the NaCl melting behavior simulation shown in FIG. 16. The contents of FIG. 21 specifically show an example of the definition of equations 14 of FIG. 1 and include definition of equations 2101, the definition of discretizations 2102, and the definition of auxiliary functions 2103. The definition of equations 2101 includes information defining equations representing behavior of particles. The behavior is represented in a simultaneous system including two equations, where a symbol D[r,t] denotes that the position of particle r is differentiated with respect to time t. Since the variables r, v, and F have already been defined as spatial vectors assigned to each particle, it is indicated that the simultaneous system of differential equations of three-dimensional vectors 2101 holds for all particles specified as Na and Cl.

The definition of discretizations 2102 defines methods of discretizing equations of motion. The definition 2102 designates that the LeapFrog method is adopted as the discretization method. Commonly known discretization methods have beforehand registered to the library of the computer system and hence can be used only by specifying names thereof. In a case where a discretization method other than those registered to the library is to be used, the contents of replacement of differential operators are to be specified. Concretely, the user specifies, for example, "D[f,t]→(f(t+Δ)− f(t))/Δ".

The definition of auxiliary functions 2103 defines undefined quantities utilized in the definition of equations 2101. The definition 2103 defines the undefined quantity F contained in the definition of equations 2101 and indicates that the force acting upon particles is represented by a two-body force employing an ionic model. In FIG. 21, the ionic model is determined by the parameters B, C, and D, which have already been defined as constants in the particle attributes by the definition of particle attributes 12. "FORCE2" in the definition of auxiliary functions 2103 denotes that a model function already registered to the system is adopted as the two-body force. The first operand is a name determining the model function and the second and subsequent operands designate coefficients of the model function.

(3) Specific example of translation and discretization process of equation of motion of particles 3

Next, description will be given in detail of the contents of the translation and discretization process of equation of motion of particles 3 by referencing to a specific example of the embodiment.

(3-1) Translation process of shape of spatial region 31

Figure 22:
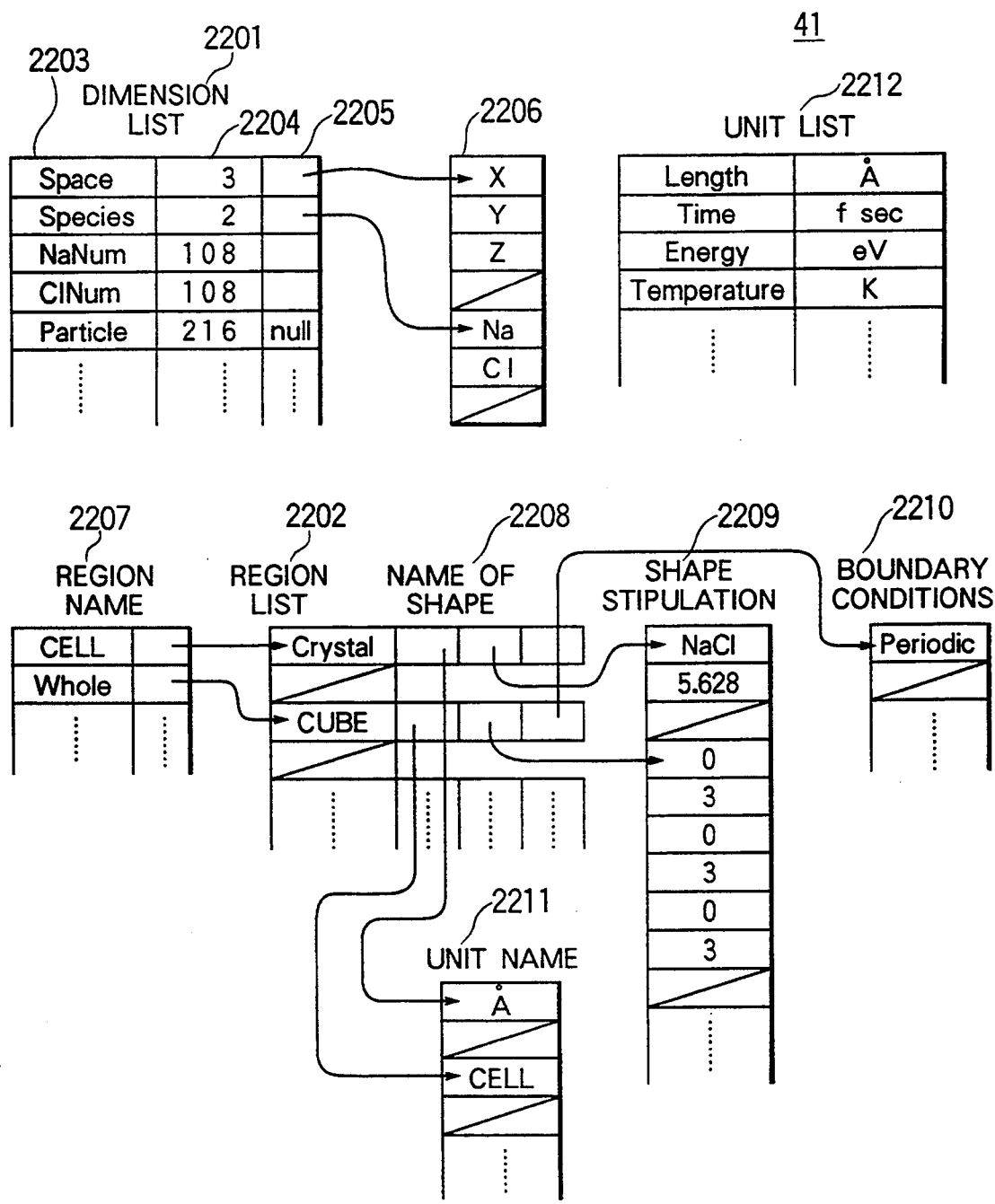
FIG. 22 is a diagram showing an example of internal representation of domain.

The translation process of shape of spatial region 31 receives as an input thereto the definition of shape of spatial region 11 shown in FIG. 18 to create an internal representation of domain 41 of FIG. 22 according to the procedure of FIG. 2. First, there is acquired information (designated by a reference numeral 1801 in FIG. 18) specifying each system of units of the particle simulation information 1 so as to register the information to the unit table or list 2212. According to the definition of system of units 1801, it is known that the unit of length is Å, that of time is femtoseconds (fsec), that of energy is eV, and that of temperature is K. The information items are used as default values specifying units of various physical quantities appearing in the subsequent processes.

Next, the definition of dimensions of space 802 of FIG. 18 is accessed to extract the number of dimensions of space and the dimension name (process 201), thereby registering these items to the dimension list 2201 (process 202). For the definition of dimension space 1802, the dimension name is Space, the number of dimensions is three, and the dimension names are X, Y, and Z. In consequence, the name Space is stored in a name field 2203 of the dimension list 2201 and "3" is registered to the field of the number of dimensions 2204. Moreover, the name of each dimension of space is stored in the respective dimension name fields 2206, which is pointed from a pointer field 2205 (process 203). The dimension list 2201 is updated when data of particle attributes is translated; moreover, the list 2201 is referenced when dimensions of various quantities are translated.

Next, the definition of range of particular spatial region 1803 is acquired to register information designating a particular region to a list of regions 2202 (processes 204 to 207). For the definition 1803, the region is called a CELL having the basic structure of NaCl-type crystal and the lattice constant of 5.628 Å. The data base of shape of region is accessed to retrieve therefrom the crystal structure of the NaCl type to confirm presence thereof in the data base such that Crystal is registered as the name of shape of the region CELL, the structure classification name NaCl and lattice constant 5.628 are registered in information designating shape, and Angstrom (Å) is registered for the length in the information specifying the shape. The unit of length in the shape designation is determined, if not otherwise specified, by retrieving the system of units for length from the unit table 2212. Namely, in the unit table 2212, the items CELL, Crystal, and NaCl and 5.628 are registered to a region name field 2207, a shape name field 2208, and a shape denoting field 2209, respectively. Moreover, there is stored Å in a field of name of unit 2211. Pointers are respectively established from the region name field 2207 to the shape name field 2208, from the shape name field 2208 to the shape denoting field 2209, and from the shape name field 2208 to the unit name field 2211.

Subsequently, the definition of range of whole spatial region 1804 is acquired to be registered to the region list in a manner similar to that used for the definition of particular region (processes 208 and 209). In this case, the region is designated as Whole and the shape of region is specified as CUBE. Dimensions in the directions of respective axes are represented by three numeric values indicating the size of CELL. Consequently, in the region list 2202, Whole, CUBE, and the dimensions stipulating CUBE are registered to a region name field 2207, a shape name field 2208, and a shape stipulating field 2209, respectively. The specification in this case is different from that of the particular spatial region CELL in that the shape is designated as CUBE, the size thereof is determined by three items in the respective directions of dimensions, and the shape is stipulated by the unit of CELL. In consequence, three pairs of 0 and 3 are successively registered in the shape stipulating list 2209 and the region name CELL is stored in the unit name field 2211. Pointers are respectively established between related fields as described above.

Finally, the boundary conditions 1805 are acquired such that boundaries associated with boundary conditions and processes to be executed on the boundaries are registered to the list of regions 2202 (processes 210 to 214). The boundary conditions 2805 denote that periodic boundary conditions are set in each direction of spatial dimensions in the whole spatial region. Accordingly, for the boundaries stipulating the overall spatial region Whole, there is registered a boundary condition name Periodic. From a condition pointer field of the shape name 208 pointed from the region name Whole, a pointer is established to the boundary condition field 2210 and then the name Periodic is registered therein.

As a result of execution of the processes above, there is created the internal representation of domain 41 of FIG. 22 from the data of shape of spatial region 11 of FIG. 18.

(3-2) Translation process of particle attributes 32

The translation process of particle attributes 32 receives as an input thereto the definition of particle attributes 12 shown in FIG. 19 to update the internal representation of domain 41 of FIG. 22 according to the procedure of FIG. 3 so as to generate the internal representation of variables 42.

First, the definition of particle species 1901 of FIG. 19 is acquired through a reading operation to determine that the number of species is two and names thereof are Na and Cl (process 301). Next, the following items are additionally registered in the dimension list 2201 of FIG. 22. That is, "Species" and the value "2" are registered to the dimension name field and the field of number of dimensions, respectively (process 302) and then Na and Cl are registered to the field of names of respective dimensions (process 303). The procedure of registration is similar to that employed for the dimensions of space. Next, the definition of number of particles 1902 is accessed to detect that the number of each of species Na and Cl is 108 (process 304). Dimension names NaNUm and ClNum respectively representing the numbers of Na and Cl are registered to the dimension list; moreover, the number of dimensions of each dimension name, namely the number of particles, is set to 108 in the dimension list (process 305).

Subsequently, the definitions of variables of particle attributes 1903 to 1905 are accessed to extract therefrom the name and the number of dimensions of each variable of particle attributes, thereby registering the extracted items to the list of variables 2301 in the internal representation of variables 42 of FIG. 23 (process 306). The definition 1903 is checked to determine that there exist two names of variable Mass and Chrg and there exist elements for each thereof as many as there are particle species (process 307). The name of variable Mass and the number of dimensions Species are registered to the list of variables 2301 and the list of number of dimensions 2302, respectively (process 308). The variable Chrg is also processed in the similar manner. Thereafter, the definition 1904 is examined to detect that there exist variables B, C, and D and the number of elements is identical to that of combinations of species. In consequence, the value of Species*Species is registered as the number of dimensions in the list of number of dimensions 2302. For the definition 1905, there exist variables r, v, and F and the number of elements is identical to that of combinations of the number of dimensions of space and the the number of total particles.

Next, an access is made to the definitions of constants of particle attributes 1906 to 1908 to detect that the specified variables are constants and then pointers are established from the associated list of variables to the list of constants, thereby registering the fixed values (processes 309 and 310). For the definition of constants in particle attributes 1906, the name of variable Mass is retrieved from the list of variables 2301 to extract the name of dimension Species from the associated dimension list 2302. According to the dimension list 2201, it is detected that the number of dimensions is two for the dimension name Species and the related names are Na and Cl. From the definition 1906, fixed values 23.0 and 35.45 are obtained for Na and Cl, respectively. Since Mass has the fixed value, a pointer is established from a pointer field 2303 of the list of variables 2301 to the list of constants 2304 and then values are registered thereto as many as there are dimensions. This also applies to the definitions of the other particle attributes.

Subsequently, the definitions for setting initial values of variables in particle attributes 1909 and 1910 are accessed to recognize therefrom the initial position and velocity of each particle so as to register these items to the list of initial values 2305 in the information for setting initial values 1909 (processes 311 and 312). According to the information 1909, the initial value at a particle position r is recognized to be a lattice point in the overall region Whole. Based on the region list 2202, it is found that the overall region Whole is constituted with units called CELLs and has length of three units in each direction of dimensions. Similarly, according to the region list 2202, it is recognized that the region CELL has the NaCl-type crystal structure and the lattice constant of 5.628 Å. Consequently, the crystal structure data is read from the crystal structure data base to achieve a proportional calculation according to the lattice constant, thereby deciding the position where each particle is to be initially arranged.

Depending on the contents of the particle simulation information 1, it may also be possible that the particles are initially located in the defined region in a random manner or according to data beforehand stored in a file. For the random arrangement of particles, the information for setting initial values of variables of particle attributes 1909 of FIG. 19 need only be specified as "r=Uniform Random Dist. in Whole". In this case, to prevent an occurrence of divergence in the calculation or to avoid increase in the number of errors which may take place because the distance between particles is too small or the distance between particles and boundaries is too small, the translation process of particle attributes 32 has a function to automatically correct positions of particles. In order to set initial positions of particles according to the contents of the file, the information 1909 need only be specified as 'r=load from file "filename"'.

The definition 1910 is accessed to recognize the initial velocity of each particle in the similar manner as for the initial position, thereby registering the initial velocity to the list of initial values in the internal representation of variables 42. Based on the information 1910, it is recognized that the initial value of velocity v of each particle is established according to a Gaussian distribution depending on the specified temperature, number of particles, and mass. The kinetic energy of particles in the system are calculated according to the specified temperature to obtain a mean value of energy of each particle based on the number of particles. Random numbers are generated in accordance with the Gaussian distribution to resultantly distribute the kinetic energy of each particle around the mean energy so as to convert the value into a velocity of each particle in consideration of the mass. The value is registered to the list of initial values 2305 pointed from the list of variables 2301.

(3-3) Translation process of control conditions 33

Figure 23:
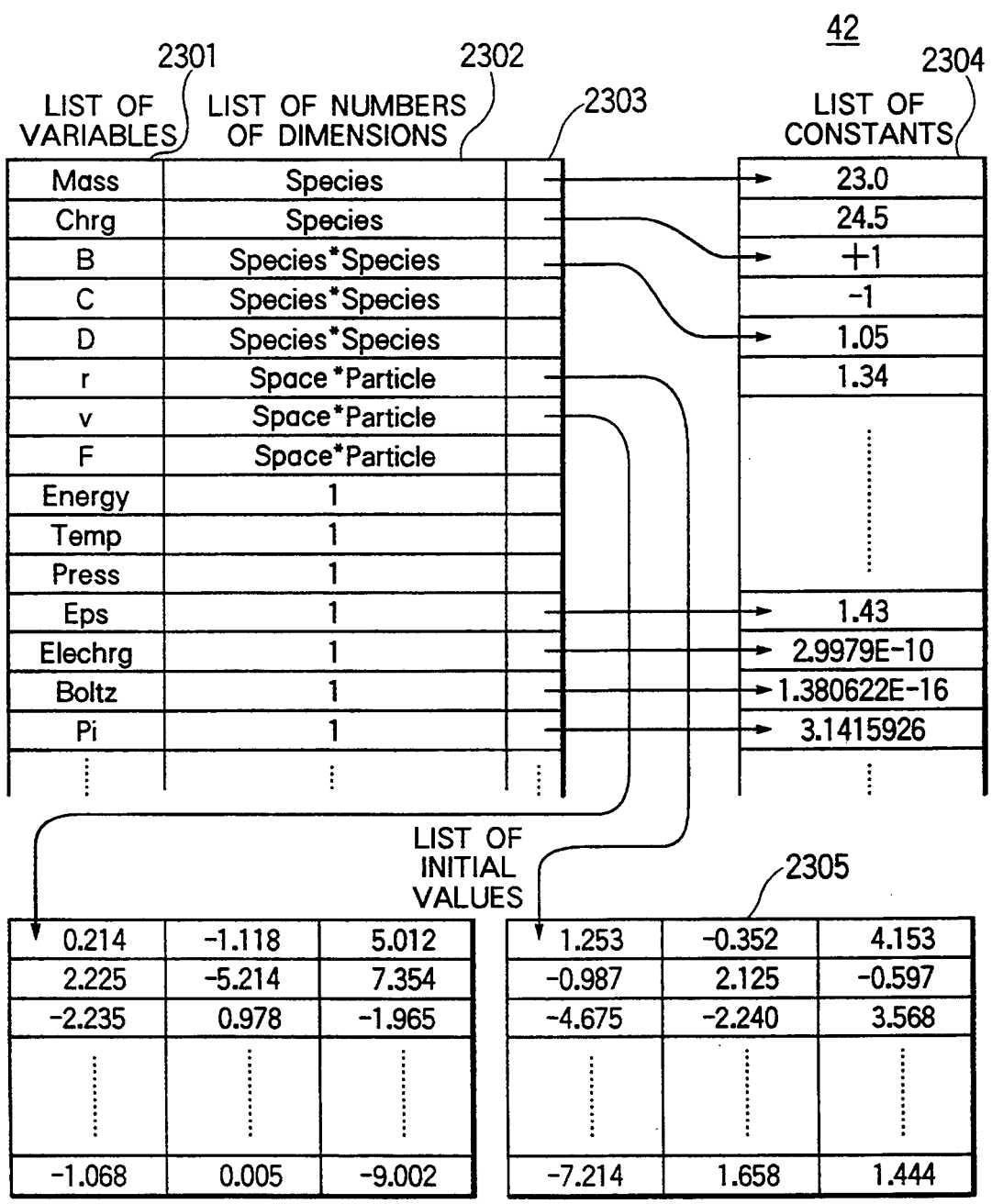
FIG. 23 is a diagram showing another example of internal representation of domain.
Figure 24:
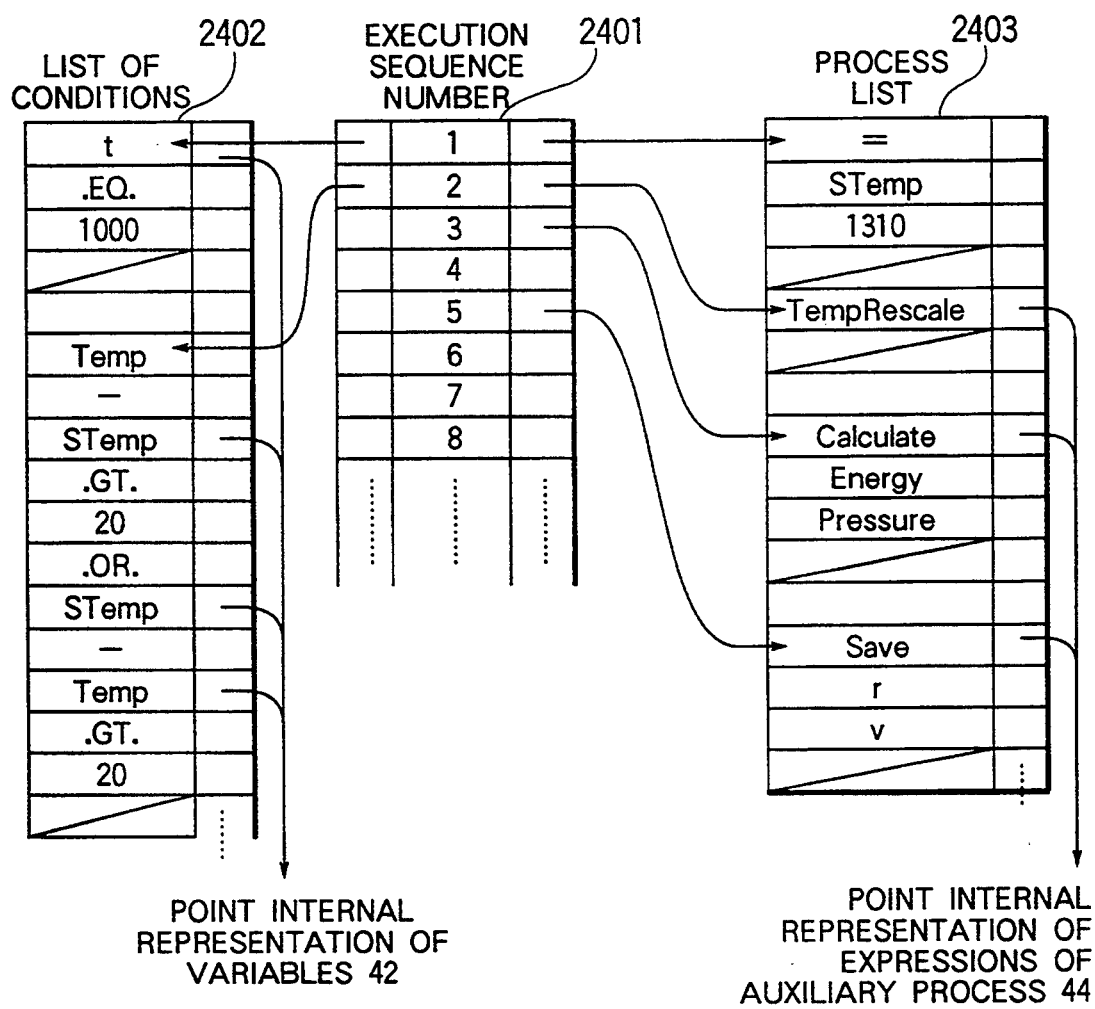
FIG. 24 is a diagram showing an example of a condition-process correspondence table.
Figure 25:
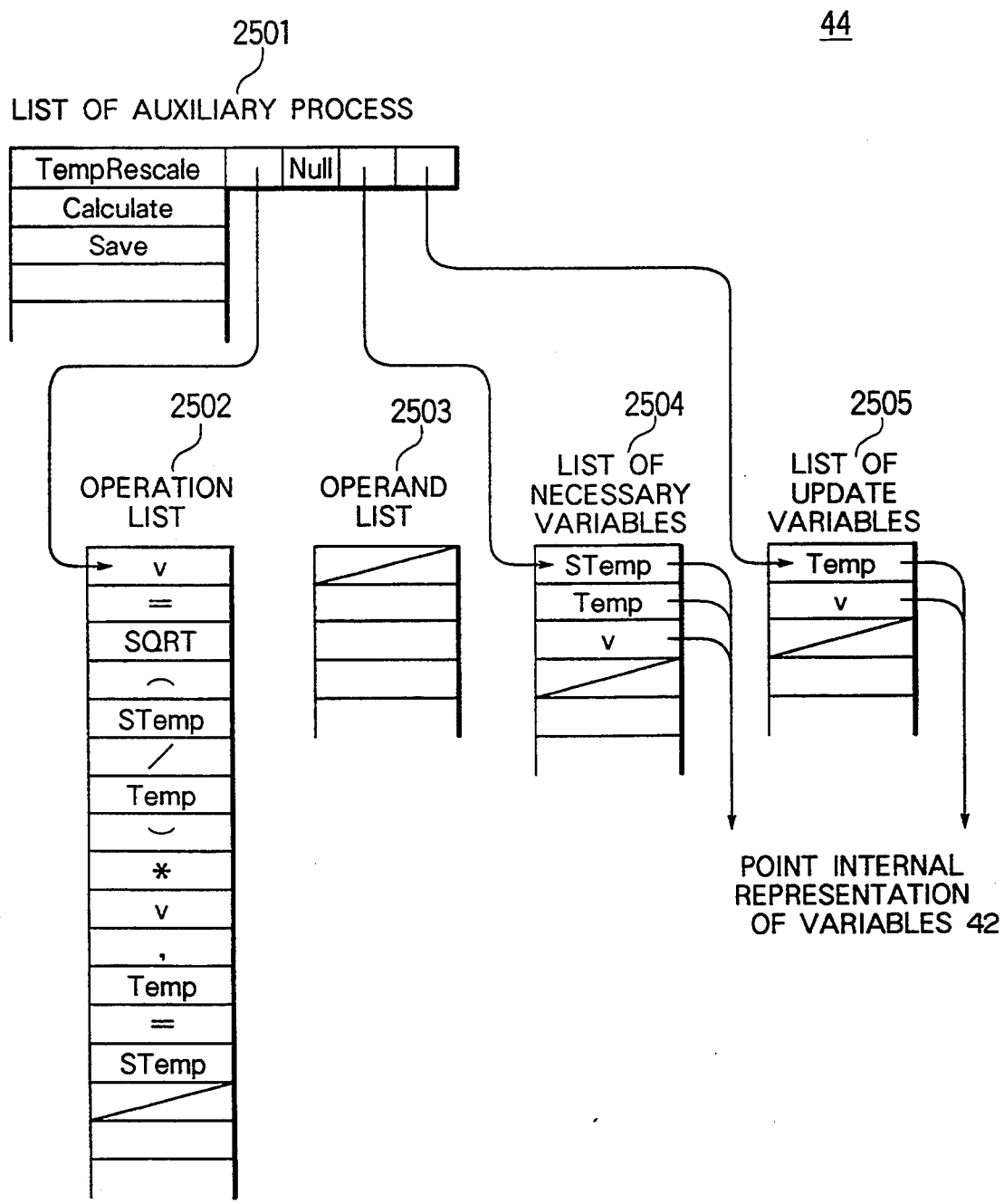
FIG. 25 is a diagram showing an example of internal representation of expression in the contents of auxiliary processes.

The translation process of control conditions 33 receives as an input thereto the definition of control conditions shown in FIG. 20 to update the internal representation of variables 42 of FIG. 23 according to the procedure of FIG. 4, thereby producing the condition-process correspondence table 43 of FIG. 24 and the internal representation of auxiliary processes of FIG. 25.

First, the definition of environmental variables 2003 of FIG. 20 is accessed to recognize the name of each environmental variable and the number of dimensions so as to additionally register these items to the list of variables of FIG. 23 (processes 401 and 402). Although this embodiment applies to a case where the number of dimensions is one., there may also be used a variable having spatial attributes. For example, since the number of dimensions is one for the variable name Energy, the name Energy and the value "1" (as the number of dimensions) are registered to the list of variables 2301 and the list of number of dimensions 2302, respectively. This also applies to the other variables.

Next, the definitions of environmental constants 2004 and 2005 are accessed to recognize that the specified variable is a constant such that a pointer is established from the associated list of variables 2301 to the list of constants 2304, thereby recording the fixed value therein (processes 402 and 403). This procedure is similar to that adopted for the translation process of particle attributes 32. For example, according to the definition 2004, it is detected that the variable Eps is a constant and has a value of 1.43 such that a pointer is established from the name of variable Eps in the list of variables 2301 of FIG. 23 to the list of constants 2304 so as to store the constant value 1.43 therein. This operation is similarly applicable to the other constants in the environmental variables.

Subsequently, the definition of control condition on initial stage 2006 is accessed to recognize the name of variable for which an initial value is to be established and the value to be established at an initiation of simulation for the variable (processes 405 and 406). The specified name of variable is retrieved from the list of variables 2301 of the internal representation of variable 42 shown in FIG. 23 and then a pointer is set therefrom to the list of initial values 2305, thereby storing the initial value in the list of initial values 2305. This procedure is similar to that employed for the translation process of particle attributes 32.

In addition, the definitions of control conditions on intermediate stage 2007, 2008, and 2009 and the definitions of control conditions on final stage 2010 and 2011 are sequentially accessed to separate the contents of the obtained information according to condition description words such as "at" and "if" so as to recognize the contents of process and conditions for execution of process, thereby recording these items in the condition-process correspondence table 43 of FIG. 24. When recording the items in this table 43, there are utilized pointers from the execution sequence table 2401 to the list of conditions 2402 and to the process list 2403. For each variable used in these lists, a pointer is established to the list of variables 2301 in the internal representation of variables 42. Moreover, for each process in the process list 2403, a pointer is established to the list of auxiliary processes 2501 in the internal representation of expressions 44 for auxiliary processes. However, a process such as an assignment does not require any definition of auxiliary process and hence the pointer to the internal representation of expressions 44 is not established.

For the definition of control conditions on intermediate stage 2007, the description "t=t1" after the condition description word "at" denotes a condition for execution of process and the description "STemp=T2" therebefore designates the contents of process. The condition for execution of process is registered to the list of conditions 2402 pointed from the execution sequence list 2401.

In this embodiment, for easy generation of FORTRAN programs, the logical operators are described in an expression similar to that employed in the FORTRAN. The contents of process are stored in the process list 2403 pointed from the execution sequence list 2401. According to this embodiment, following the name of operation or auxiliary process, operands required by the operation or auxiliary process are sequentially described, thereby registering the operands. Since operands are not necessarily names of variable, when an operand is missing in the list of variables, the operand is assumed to be a character string. For example, in the case of the definition of control conditions on intermediate stage 2007, for the condition expression "t=t1", a description of logical expression in the FORTRAN, namely, "t.EQ.1000" is registered to the condition list 2402 pointed from the execution sequence number 1 in the execution sequence list 2401. Since t1 is recognized to be a constant by referencing the list of variables 2301, the fixed value is used for the process. In the associated process list 2403, there is registered the contents of process "STemp=T2". The contents of operation "=" is an assignment and the operands necessary for the assignment are the variable STemp and the value 1310 thereof.

For the definition 2008, in the list of conditions 2402 pointed from the execution sequence number 2 of the execution sequence list 2401, there is registered a description in the FORTRAN of logical expression "Temp - STemp>20 or STemp - Temp>20". Namely, there is registered a description "Temp - STemp.GT.20.OR.STemp - Temp.GT.20". In the related process list 2403, there is recorded the contents of process "TempRescale". The contents of process are interpreted in association with the definition of auxiliary processes 2002 to be registered to the list of auxiliary processes 2501 in the internal representation of expressions 44 for auxiliary processes. In this case, for the contents of process, there does not exist any operand. The similar operation is accomplished also for the definitions of other control conditions.

The definition of control conditions on final stage 2010 defines final or end conditions, whereas the definition 2011 defines the contents of process at the end stage. Although only one item of contents of process is specified for the end operation in the specific example above, there are specified a plurality of items of contents of process in general. In such a case, after the definition of end conditions, it is necessary to sequentially describe only the contents of process in the similar manner as for the description of initial process.

Finally, the contents of auxiliary processes 2002 are recorded in the format of the internal representation 44 for auxiliary processes as shown in FIG. 25. A name of an auxiliary process to be registered is recorded in the list of auxiliary processes 2501 and then pointers are established to the associated fields of the operation list 2502, the operand list 2503, the list of necessary variables 2504, and the list of update variables 2505. The operation list 2502 contains description of the contents of processes to be executed by the auxiliary process. The operand list 2503 contains a sequence of operands required for the auxiliary process. The list of necessary variables 2504 contains a list of variables to be defined for an execution of the auxiliary process. The list of update variables 2505 contains a list of variables of which values are updated when the auxiliary process is executed.

For the definition of auxiliary processes 2012, the name of auxiliary process TempRescale is registered to the list of auxiliary processes 2501. The specific contents of operation are registered to the operation list 2502 according to a description method of the FORTRAN. For the auxiliary process TempRescale, there does not exist any operand and hence "Null" is recorded in the pointer field to the operand list 2503. For TempRescale, three variables STemp, Temp, and v are required to be defined before an execution of the auxiliary process. Consequently, the names of three variables STemp, Temp, and v are registered to the list of necessary variables 2504. For TempRescale, the values of two variables Temp and v are updated at an execution of the auxiliary process; consequently, the names of two variables Temp and v are recorded in the list of update variables 2505.

(3-4) Translation process of equations 34

The translation process of equations 34 receives as an input thereto data of equation of motion shown in FIG. 21 to generate internal representation of expressions 44 according to the following procedure. That is, the internal representation of differential equations of FIG. 26 and the internal representation of difference equation of FIG. 27 are created so as to finally generate the internal representation of asymptotic equations of FIG. 28.

Figure 26:
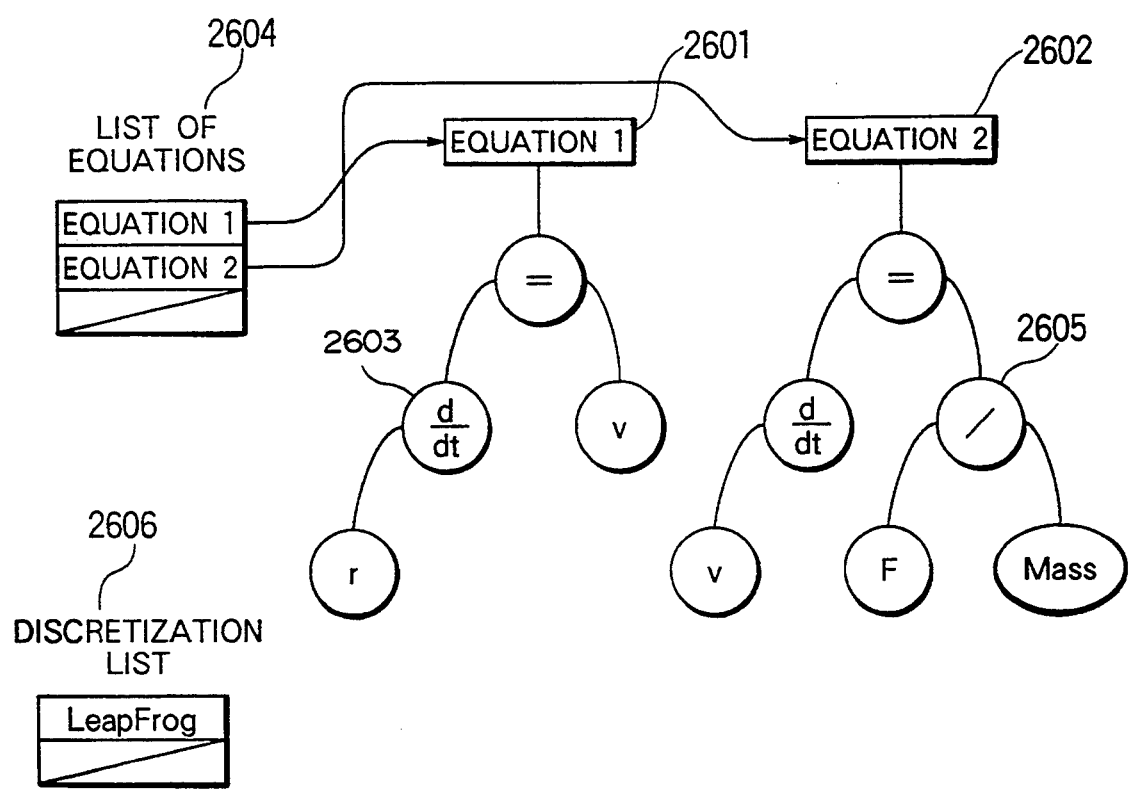
FIG. 26 is a diagram showing an example of internal representation of differential equations in the tree graph format.
Figure 27:
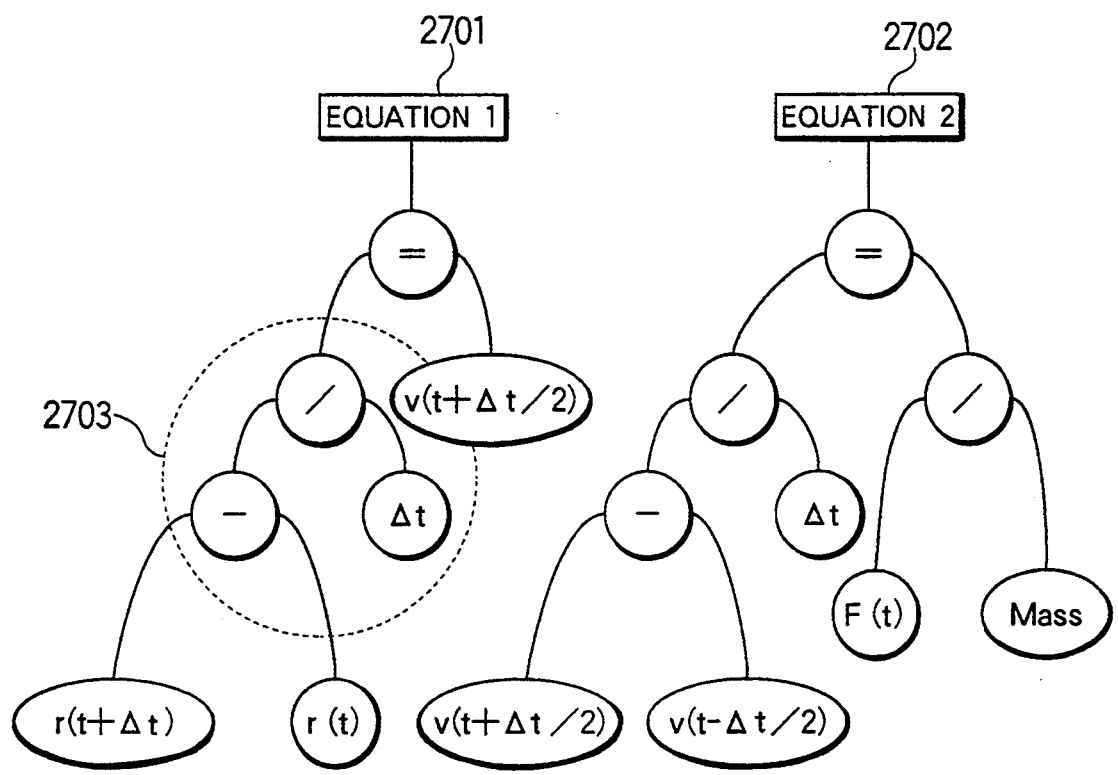
FIG. 27 is a diagram showing an example of internal representation of difference equations in the tree graph format.

First, the definition of equations 2101 of FIG. 21 is accessed to recognize that the differential of r with respect to t is equal to v, thereby obtaining the internal representation of differential equation 2601 of FIG. 26. The representation 2601 indicates that the branches connected to each other by the equal sign have an identical value. The left branch leads to a differential operator with respect to t 2603 and a variable r upon which the operator acts. The right branch includes a variable v. Similarly, there is attained another internal representation of differential equation 2602. A division symbol 2605 appearing in the right branch denotes that F in a branch on the left-hand side with respect to the division symbol is to be divided by Mass in a branch on the right-hand side. In addition, the list of equations 2604 contains a list of pointers to the internal representations of equation of motion 1601 and 2602. In the representation 44, the terminal of each branch is a variable and all intermediate nodes are operators excepting an equal sign. When a destination of a differential operation is not a variable, the operator is analyzed or decomposed according to three analysis processes of differential 2901, 2902, and 2903 shown in FIG. 29 until the obtained differential operator directly acts upon a variable. In the tree structure of the overall differential operation of FIG. 29, differential operations respectively related to the addition, subtraction, multiplication, and division between two functions a and b are decomposed into the addition, subtraction, multiplication, and division between a differential of a function and another function.

Subsequently, the definition of discretizations 2102 is accessed to recognize that a method of discretization is specified by a name so as to retrieve the name from the data base. After confirming that the discretization method has been registered to the system, the name thereof is recorded in the discretization list 2706. In the specific example, it is recognized that the LeapFrog method has been specified.

Next, description will be given of a method of transforming the internal representation of differential equation of 26 into the internal representation of difference equation of FIG. 27. In the differential equation 2601, the differential operator is replaced with a combination of the division symbol, difference time width, and subtraction symbol 2703; moreover, the variable r upon which the differential operator acts is subdivided into two variables represented with different times, namely, $r(t+\Delta t)$ and $r(t)$, and the variable v to be differentiated is replaced with a variable represented with time, namely, $v(t+\Delta t/2)$. In this case, since the LeapFrog method has been specified, the difference of time between r and v is half the difference time width $\Delta t$. The similar process is effected also for the differential equation 2602. As a result, there are attained the internal representations of difference equation 2701 and 2702.

Next, description will be given of a method of transforming the internal representation of difference equation of 27 into the internal representation of asymptotic equations of FIG. 28. In the difference equations 2701 and 2702, among the variables to be differentiated, the variable associated with the most advanced time is kept remained in the left branch, whereas the other variables are moved to the right branch. This operation is accomplished according to the four transforming processes of FIG. 30, namely, a transformation from the addition to the subtraction 3001, a transformation from the subtraction to the addition 3002, a transformation from the multiplication to the division 3003, and a transformation from the division to the multiplication 3004. As a result, there is attained the internal representation 2801.

Subsequently, according to the sequence of time of variables in the left branch, the items are sorted into a list of equations. The time $t+\Delta t$ in the left branch of the equation 1 is advanced when compared with the time $t+\Delta t/2$ in the left branch of the equation 2. Consequently, as a result of the sorting operation, the equation 2 takes precedence over the equation 1. Finally, in accordance with the time of each variable, an indication "old" or "new" is assigned thereto so as to obtain an internal representation of asymptotic equations 2802.

In the final operation, the definition of auxiliary function 2103 is acquired to detect the definition of the force F, which has been left undefined in the definition of equations 2101. According to a character string "FORCE2" it is recognized that the two-body force beforehand registered is to be utilized. The first operand "IONMODEL" is retrieved so as to attain a system of functions of the model and various coefficients required for the functions, thereby reading values of the second and subsequent operands. The name of auxiliary process is "F", the operation list is "F=Form of model function obtained from data base", the operand list contains B, C, D, and r, the list of necessary variables contains r, and the list of update variables contains F.

Through the processes above, the translation process of equation of motion 34 receives as an input thereto the data of motion shown in FIG. 19 to produce the internal representation of equations 44 of FIG. 28.

Description has been given of the translation and discretization process of equation of motion of particles 3.

(4) Specific example of generation process of programs 5

Next, description will be given of the contents of processes constituting the generation process of programs 5 shown in FIG. 7.

(4-1) Generation process of header program 701

The generation process of header program 701 generates according to the procedure of FIG. 8, a specification of dimensions of FIG. 31 (processes 802 to 808) from the dimension list 2201 of the internal representation of domain shown in FIG. 22 and a specification of common variables of FIG. 32 from the internal representation of variables 42 of FIG. 23 (processes 809 to 811). As can be seen from a line 3101 of FIG. 31, the number of dimensions of the first item of the dimension list is denoted by a parameter statement containing a name of constant "NP001". The name of constant of this kind is utilized to avoid duplication with names specified by the user. However, since the contents thereof cannot be associatively recognized from the name, the inherent name of the constant is included as a comment in the header program 706 to be created for an easy understanding of the program (process 804). When an item of the dimension list has a pointer to a dimension name (process 805), character strings are specified as many as there are dimensions and the dimension name is designated by a parameter statement as shown in a line 3102 (process 806). A character string containing the dimension name is assigned with a name CN0001 and the number of characters are equal to the maximum number of characters in the dimension name. Following the specification of character strings, as shown in a line 3103, there is generated a portion of name specification in each direction of dimensions (processes 807 and 808). The definition of character string is accomplished only for an item having a pointer to a dimension name. The processes above are repeatedly carried out for each item of the dimension list (processes 802 and 803) to obtain the header program for the specification of dimensions. This header program is included in the system as a header file for program to be subsequently produced.

Next, the internal representation of variables is accessed to acquire the first item of the list of variables so as to trace a pointer from the associated list of numbers of dimensions to the dimension list, thereby detecting, for the associated number of dimensions, the name of constant represented in the program (process 810). For the first item Mass, the number of dimension and the name of constant are respectively designated by Species and NP0002. Resultantly, a specification of variable is generated for the variable Mass as shown in a line 3201 of FIG. 32 (process 811). For the contents of variables represented by sequence numbers such as NP0001 and CN0001, comments are described in any cases. After the process is repeatedly accomplished for each item of the list of variables (process 809), the name of variable is again acquired to create a COMMON statement as shown in a line 3202 (process 812) so as to obtain the header program for the specification of common variables. The header program is also included in the system as a header file for a program to be subsequently produced.

(4-2) Generation process of data input output program 702

Figure 33:
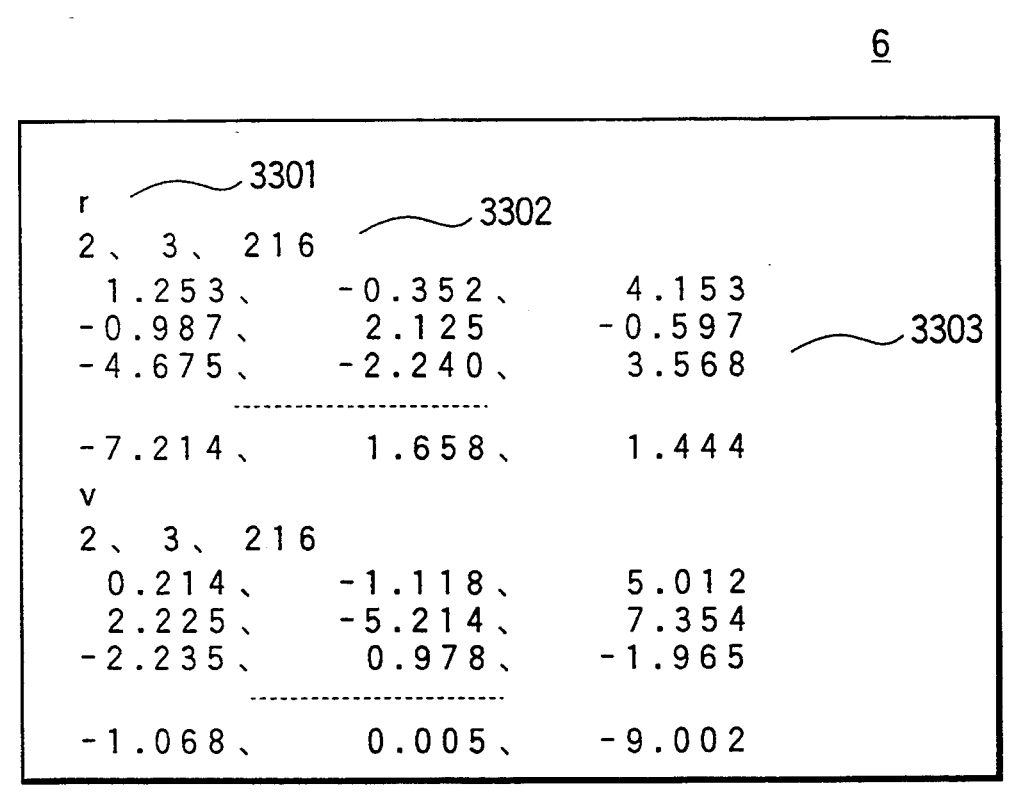

The generation process of data input output program 702 receives as an input thereto the internal representation of variables 42 of FIG. 23 to generate the data file of initial values 6 of FIG. 33 and a program for reading data of initial value 707 shown in FIG. 34. The data file 6 and the program 707 are created according to the procedure of FIG. 9. In the generation process of header for the reading program (process 901), there are produced a specification 3401 of sub-program for a subroutine for reading data of initial values, INCLUDE statements 3402 for including specifications of numbers of dimensions and common variables in the system, and a WRITE statement 3403 for producing a start operation of process for reading initial values. Six first lines of FIG. 34 are results of the generation above.

Subsequently, among the items in the list of variables 2301, any variable having a pointer to the list of initial values 2305 is subjected to the following processes (processes 902 to 907). A process 904 outputs to the data file 6 a name of variable 3301 as a comment for data recognition and the number of elements 3302. A process 905 outputs an initial value 3303 to the data file 6. A process 906 generates a program portion 3404 to skip the name of variable and the number of elements in the program for reading data 707. A process 907 creates a program portion for reading initial values 3405 in the program 707.

Two leading lines of FIG. 33 show an output example of the variable name and the number of elements. The first variable having an initial value in the list of variables is r; consequently, "r" is outputted as information of the name of variable. Subsequently, there are sequentially described three numeric characters as information of the number of elements, namely, the number of dimensions "2", the number of elements of first dimension "3", and the number of elements of second dimension "216". As an output example, the initial values corresponding to the variables are shown in the third and subsequent lines of FIG. 33 in which the initial values are presented for all of 648 elements. An output example of the program portion for skipping the names of variable and the number of elements in the program 707 is a READ statement 3404 without any operand. An output example of the program portion for reading initial values in the program 707 is a READ statement 3405 following the READ statement 3404. After the same process is executed for all items in the list of variables, a footer or terminating portion 3406 is finally generated for the reading program (process 908). This portion is implemented by four last lines in FIG. 34 in which a WRITE statement is generated to output an end operation of the process for reading initial values and a RETURN statement and an END statement are created to describe the termination of the subroutine.

(4-3) Generation process of program for process control 703

Figure 10:
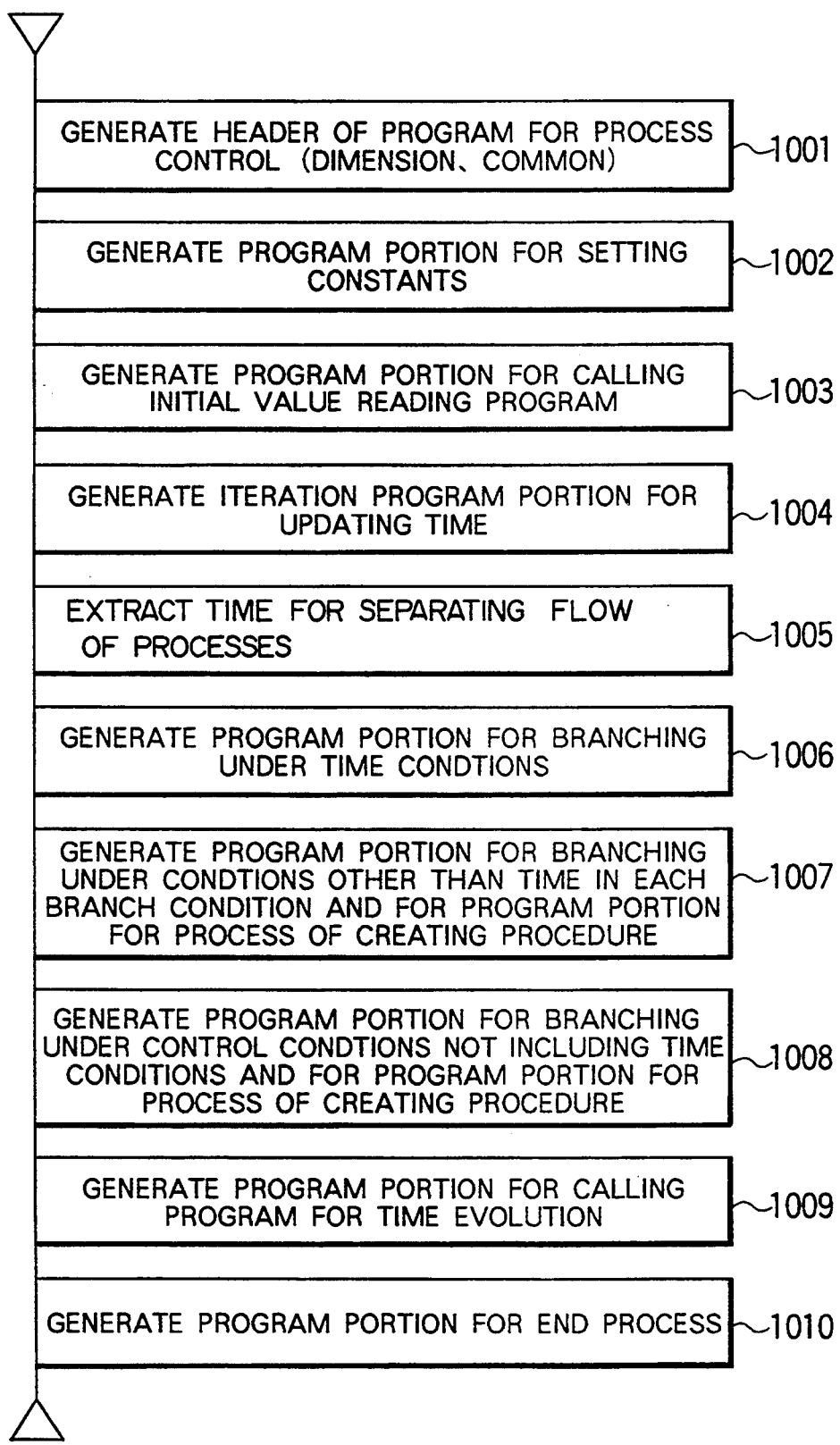
FIG. 10 is a flowchart showing a method of generating a program for process control.
Figure 11:
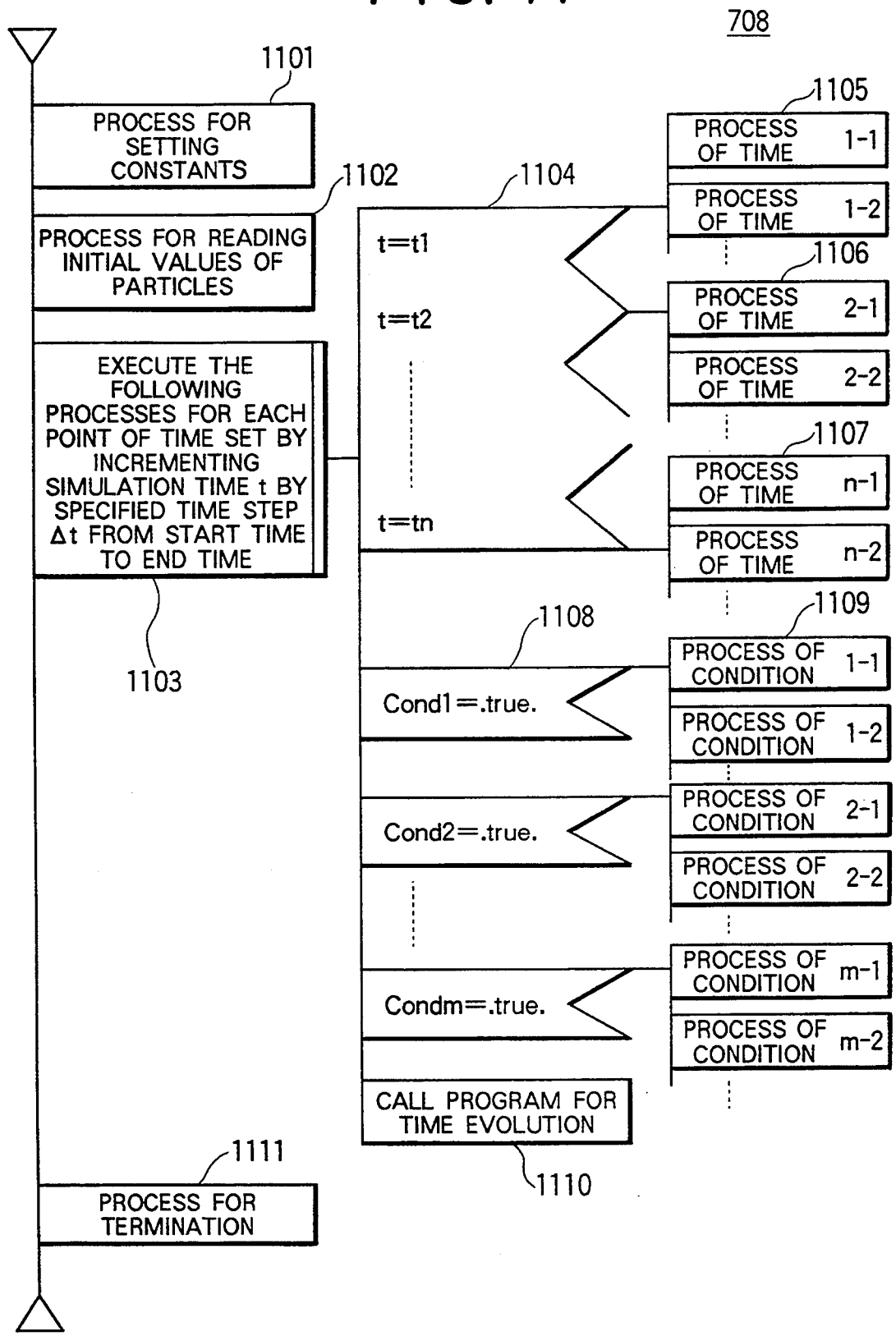
FIG. 11 is a flowchart of a generated program for process.

The generation process of program for process control 703 receives as the main input the condition-process correspondence table 43 of FIG. 24 to produce, according to the program generation method of FIG. 10, a program for process control 708 having a process control flow of FIG. 11. It is easy to produce, based on the process flow of FIG. 11, a main program for the simulation program in the FORTRAN.

(4-4) Generation process of program for time evolution 704

The generation process of program for time evolution 704 generates, primarily according to the internal representation of asymptotic equations, a program for time evolution in the FORTRAN. The program for time evolution can be immediately generated by an assignment statement associated with the internal representation of asymptotic equations of FIG. 28. Since the variables to be updated are quantities having two dimensions of the space and the number of particles, the assignment statement has a structure duplicatedly enclosed by two DO loop statements. Naturally, an INCLUDE statement specifying dimensions and common variables is created as a header of the subroutine.

(4-5) Generation process of auxiliary processes 705

The generation process of auxiliary processes 705 produces, based on the internal representation of expressions for auxiliary processes shown in FIG. 25, a program for auxiliary calculations 710 in the FORTRAN. FIG. 15 shows the generation method. Each auxiliary processes is implemented by a subroutine and includes as a header thereof an INCLUDE statement specifying dimensions and common variables.

Description has been given of the generation process of programs 5.

Subsequently, according to the general execution procedure of the FORTRAN programs, the FORTRAN calculation programs 6 thus generated are transformed by a translation process into calculation programs in the machine language so as to be executed by the computer 8. In the execution, the simulation input data 7 automatically created by the generation process of programs 2 is received as an input so as to conduct calculations for the simulation, thereby outputting the simulation results 9 to a line printer, a graphic terminal, etc.

3. Other embodiments

Description has been given of an embodiment according to the present invention. However, there can be considered several variations thereof. Next, description will be given of other embodiments materialized by partially modifying the embodiment above.

(1) Interactive specification of items of particle simulation information

Figure 35:
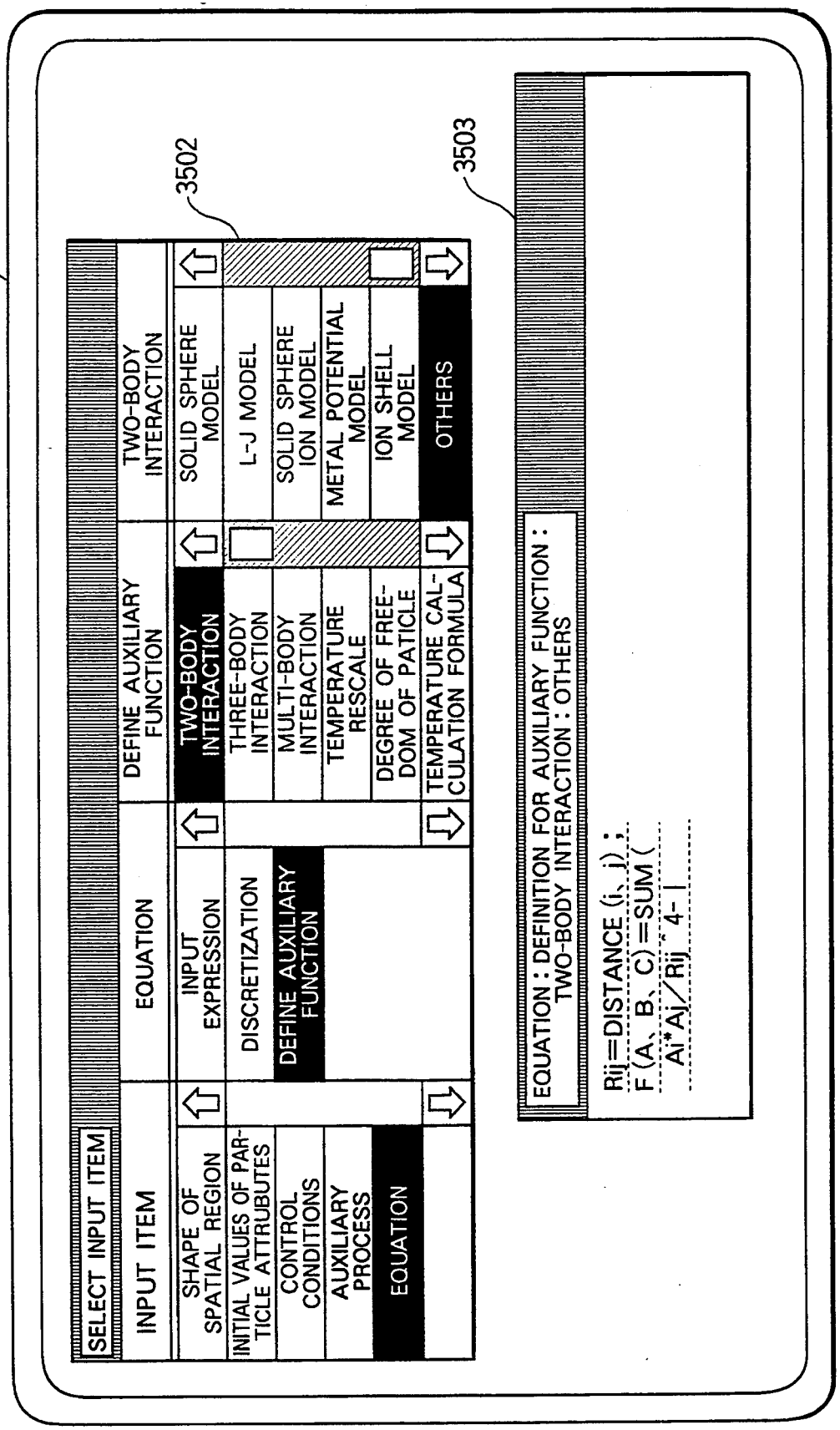
FIG. 35 is a diagram showing an example of a screen for interactively inputting information for simulation.

In the embodiment above, the particle simulation information 1 beforehand prepared in a file is read therefrom to automatically generate programs; however, there may be considered as a favorable embodiment a method of specifying various items of the particle simulation information i through conversational operations from a terminal (an input/output terminal 534). FIG. 35 shows an example of screen image to input various items of the particle simulation information 1 through an interactive process. A screen image 3501 of FIG. 35 is displayed to interactively input therefrom items. An area 3502 is a window for selecting an input item, whereas an area 3503 is a window used when a character input is required. When "Equation" is selected from the input items presented on the left-most side of the window 3502, the representation of the selected item is reversed and then a list of items to be selected is displayed in a menu on the right-hand side thereof. By repeatedly achieving the operations in the similar manner, the particle simulation information 1 to be inputted to the system can be specified. When it is desired to describe an item not existing in the menu, the user select "Others" from the displayed items to describe the contents of .the desired item in the window 3503. According to the method of specifying input information from the menu of FIG. 35, when the names of all input items allowed in the automatic generation process of programs 2 are registered to the menu in advance, the user who inputs information need not memorize the correct names of input items. In addition, it is accordingly possible to minimize input errors caused by wrong characters and missing characters. Moreover, when the user beforehand registers to the menu the definitions of various items such as the system of functions of a potential model of two-body interaction to be frequently and generally utilized in the particle simulation, it is possible to considerably reduce the amount of input operations to be achieved by the user who inputs information.

Furthermore, when inputting such environmental conditions of the simulation system as a constant pressure and a constant temperature, there may appear selection items which are to be mutually exclusively selected. FIG. 36 shows a state of change in the screen image for input item selection in the case above. In the window for setting environmental conditions 3602 presented on the screen 3601 of the terminal, the conditions including the constant temperature and the fixed number of particles have already been selected. The selected conditions are displayed in the reverse mode. When a condition of the constant pressure is additionally selected, as shown in the window 3603, the condition item of the fixed pressure is reversed and the presentation of the other exclusive environmental conditions are simultaneously changed into a white or bright representation, thereby preventing a selection thereof. This notifies the user that these items are not to be selected, thereby decreasing the number of input errors. In the example of FIG. 36, the white or bright presentation is employed to indicate the inhibition of selection; however, there may be adopted a favorable embodiment in which the brightness of displayed characters is lowered so that the user can read the characters. Namely, in this state, although the displayed items cannot be selected, the characters thereof can be recognized.

(2) Visually interactive specification of control conditions

As items of particle simulation information 1, it is necessary to specify the definition of control conditions 13, namely, control conditions and control methods for environments of a space where particles actually exist and where particles may exist.

In the embodiment above, as shown in FIG. 24, there are described the necessary number of pairs, each including a control condition for determining a timing for an execution of a control process and the contents of process to be executed at the timing. When the contents of control conditions and control processes are simple, these items can be easily specified in the method shown in FIG. 24. However, in a case where the temperature is changed to various values during an execution of the simulation, the definition of control conditions will be specified as shown in FIG. 37. Namely, quite a large amount of information is required to be defined. A definition of control conditions 3701 of FIG. 37 additionally includes a control process 3704 for varying the setting temperature for each execution step of the simulation. With the provision of the process 3704, the temperature of the system can be freely changed. Furthermore, a definition of control conditions 3706 defining the contents of changes in the setting temperature and pressure is considerably complicated because of several changes in the setting values. In this case, wrong data may possibly be inputted for the following reasons. Namely, due to the large amount of data, the chance of specification error is increased in the manual operation, for example, to input numeric values. Moreover, even when data to be set for an input is different from the inherent or original value, this condition cannot be easily recognized when the method of defining control conditions of FIG. 37 is used.

Figure 38:
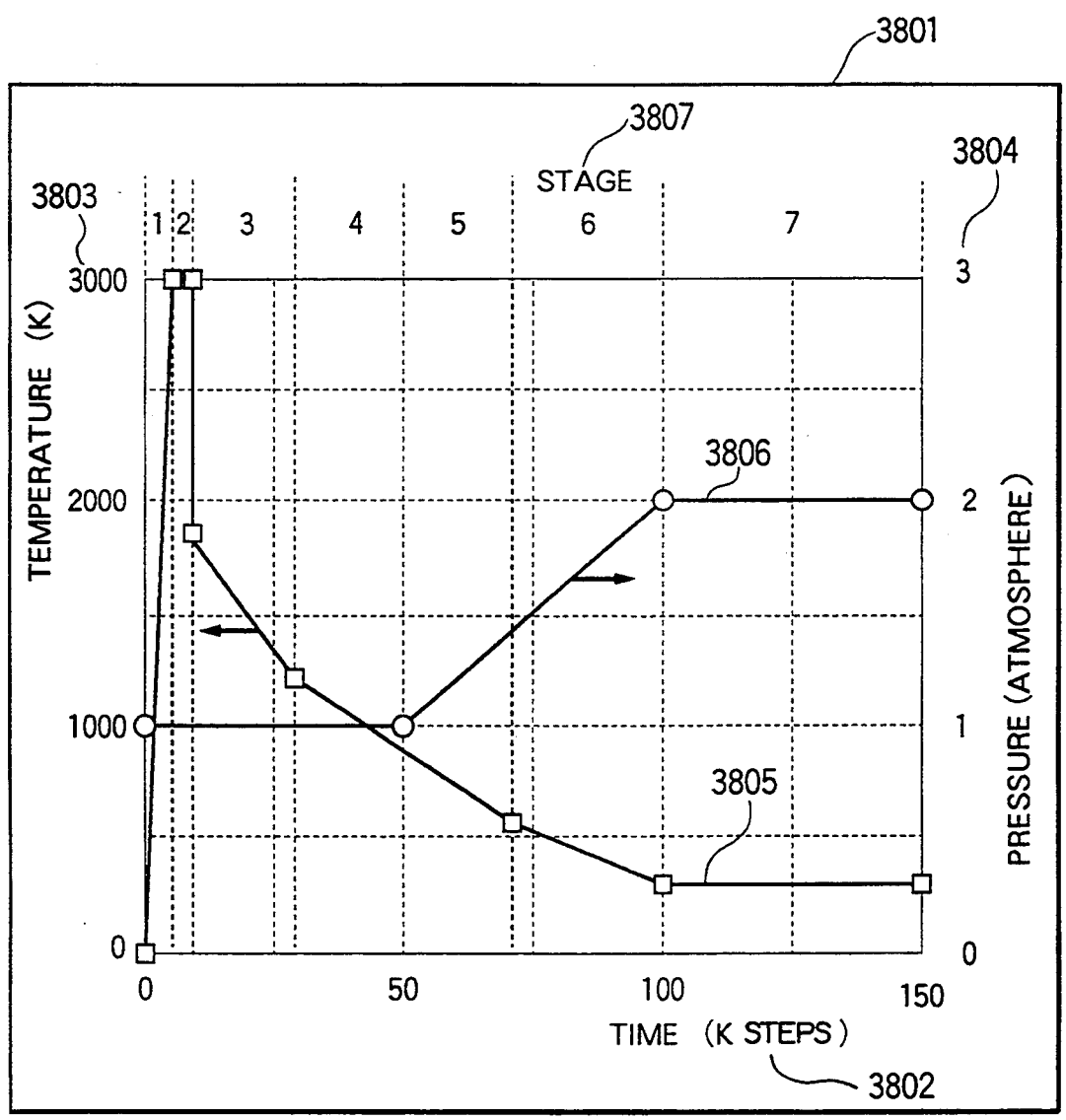
FIG. 38 is a diagram showing an example of a graph of variations with respect to time of environmental variables to be complicatedly altered.

FIG. 38 is a graph showing the results of changes in the setting temperature and pressure in the example of control conditions of FIG. 37. In this graph 3801, an abscissa 3802 stands for an execution step of the simulation, namely, a virtual time in the process of simulation. This graph presents variations in two quantities, namely, temperature and pressure. For the line 3805 of the graph, the value of temperature is represented by the indication 3803 for temperature (K) along the vertical axis on the left side. For the line 3806 of the graph, the value of pressure is represented by the indication 3804 for pressure along the vertical axis on the right side. The setting values are ordinarily visualized for confirmation thereof as shown in FIG. 38. When the objective quantities are visualized, for example, in a graph, the user can input the values while visually checking the input values against the inherent values of data. In a usual case, after the setting values are decided on the graph, the overall period of time of the simulation is subdivided into a plurality of stages of time so as to determine or extract setting values for variables of control conditions on each stage. FIG. 39 shows the results of extraction of setting values. After or during the generation of the graph of FIG. 38, the table of FIG. 39 is created. For each stage 3901, the time 3902, temperature 3903, and pressure 3905 are extracted to calculate gradients thereof in each interval. In this embodiment, as shown in FIG. 37, the setting values and gradients for each time step are specified on the graph to change the values of environmental conditions. In consequence, the gradient of temperature 30 and the gradient of pressure 3906 are calculated also for the table of FIG. 39. If the variables of control conditions are altered in another method, the data extraction will be achieved in a procedure associated therewith. Moreover, the attained data is required to be transformed into the form of FIG. 37, namely, the data format of the definition of control conditions. When inputting the data, there may possibly occur data errors due to an erroneous operation, or the like.

In the following embodiment, namely, the visually interactive specification of control conditions, it is possible to reduce the data errors and the number of data input steps when the user specifies the definition of control conditions.

(2-1) Outline of visually interactive specification of control conditions

Figure 40:
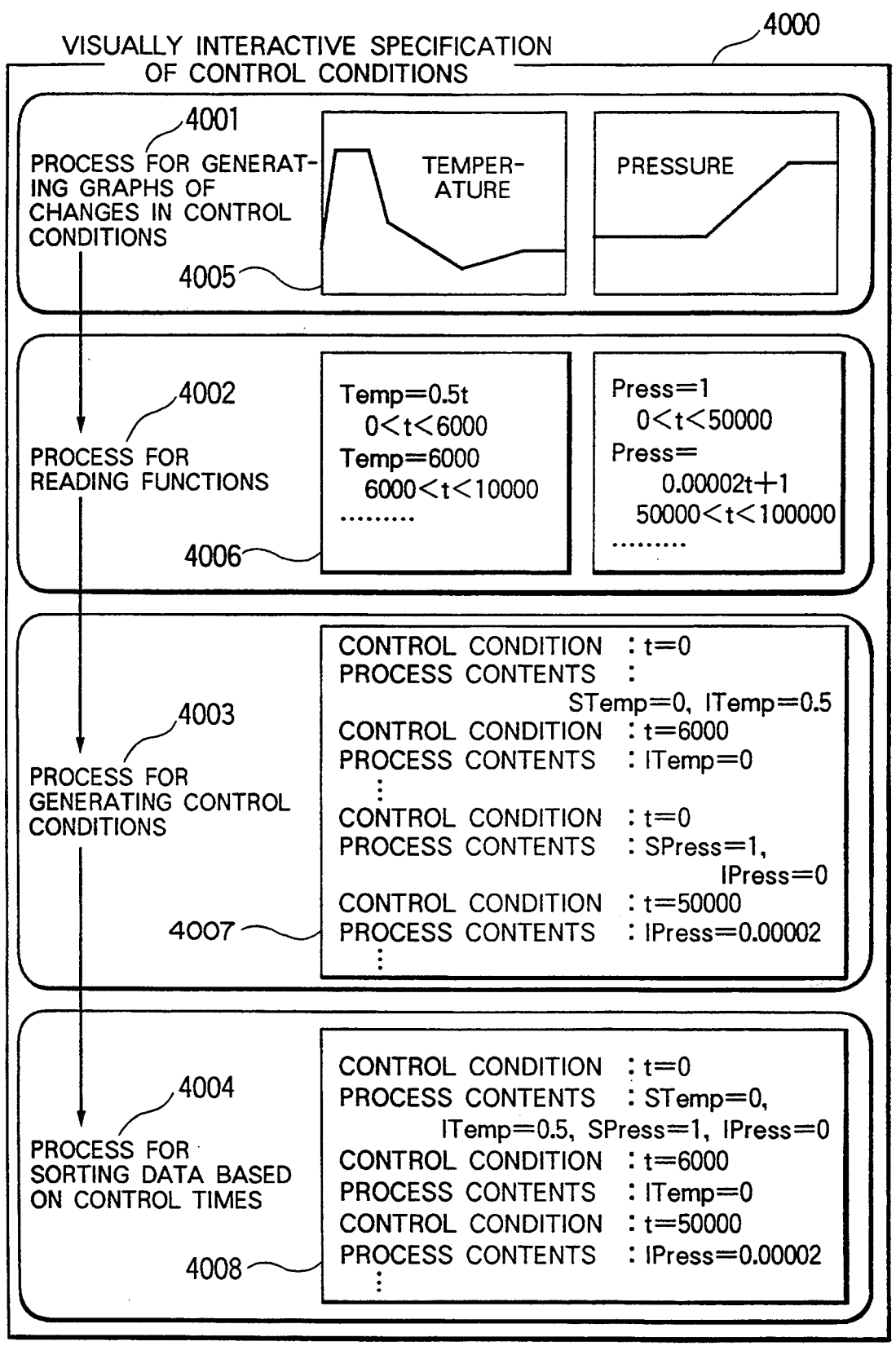
FIG. 40 is a diagram schematically showing a visually interactive specification of control conditions.

The visually interactive specification of control conditions can be carried out from a graphic terminal. FIG. 40 shows an outline of the specification. In this diagram, a visually interactive specification of control conditions 4000 is constituted with a generation process of graph of change in control conditions 4001, a process of reading functions 4002, a generation process of control conditions 4003, and a sorting process of control times 4004. In the generation process 4001, a state of changes in control conditions such as temperature and pressure 4005 is produced as an image on a screen of the graphic terminal while confirming the image on the screen. The process 4001 is carried out as many times as there are variables of necessary control conditions. Next, in the reading process 4002, the graph 4005 created by the process 4001 is received as an input, thereby obtaining the state of changes represented in the graph as a format or representation of functions 4006. Actually, the graph 4005 itself is not inputted, namely, the internal data kept to represent the graph 4005 is received as the input. Moreover, the process 4003 extracts the control conditions and the contents of process 4007 from the representation of functions 4006 thus created. Finally, the sorting process 4004 re-arranges the data items in an order of control times employed as control conditions, thereby attaining the definition of control conditions 4008.

Figure 41:
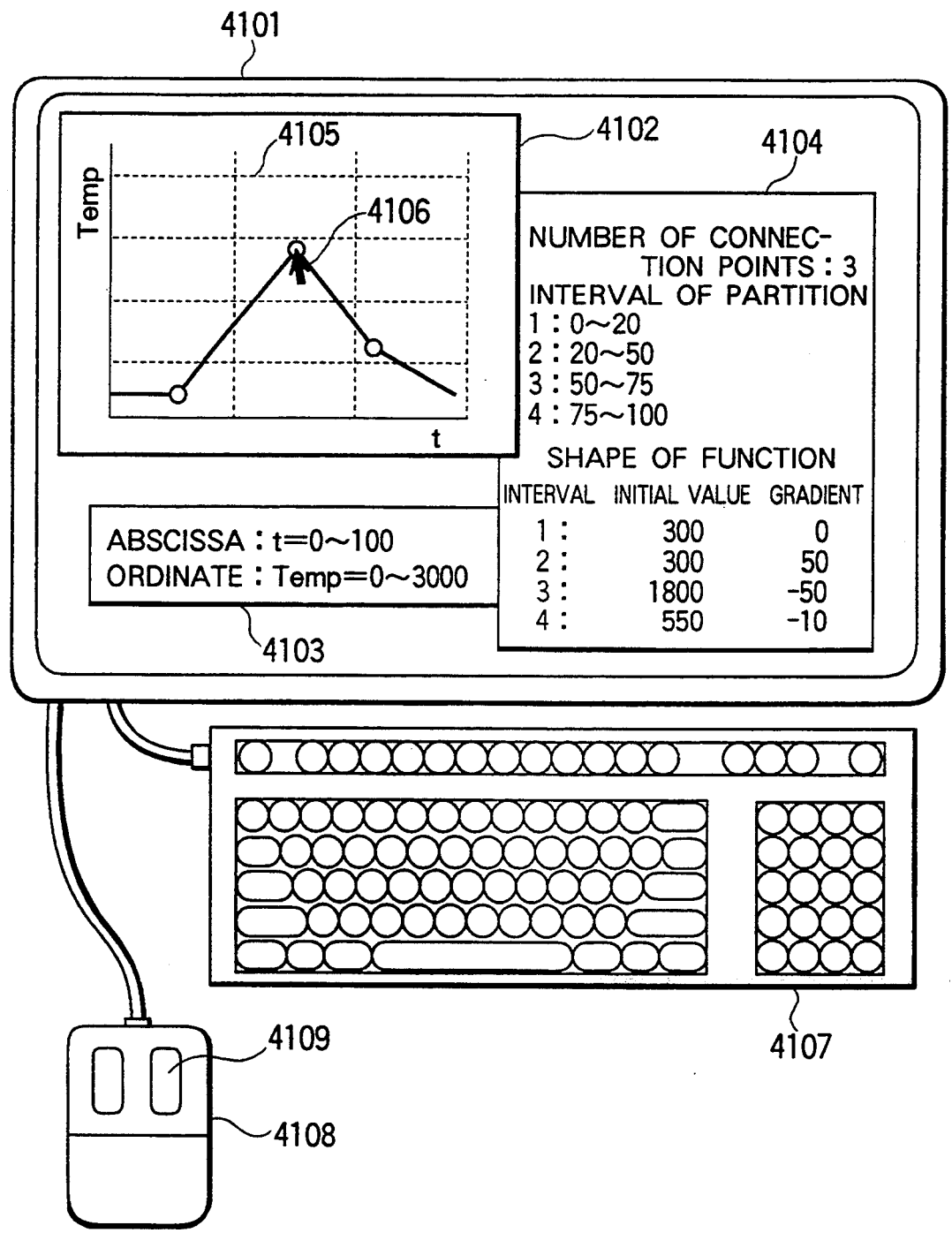
FIG. 41 is a diagram showing devices used in the visually interactive specification of control conditions and the contents displayed in windows presented on a display.

The specification 4000 is achieved from the graphic terminal (input/output device 534). FIG. 41 shows an output screen image in the operation for the specification. A plurality of windows are presented on a display 4101 of the terminal. A window 4102 for generating graph of changes in control conditions is an area to visually confirm the changes in control conditions so as to generate the contour of the changes. An input window of characters 4103 is an area to input various information items in the window 4102. A display window of analysis 4104 is an area to display a warning message immediately when a wrong operation is detected as a result of analysis of the graph of changes in the window 4102. With the provision of the window 4104, the state of changes in the variables of control conditions can be numerically confirmed. However, on the graph in the window 4102, grid-like frames are displayed in a superimposed manner in association with the scaling marks. Consequently, for a desired point, an approximated value can be readily attained. The operation of generating the graph of changes is carried out primarily with a mouse 4108. With a mouse pointer 4106 positioned over an object to be selected, when a mouse button 4109 is pressed, positional information of the selected object can be transferred to the program. Moreover, a keyboard 4107 is also used to set a name of an axis, a range, an interval of lines of grid or frame, and the like.

Subsequently, description will be given of the constituent portions (4001 to 4004) of the specification 4000.

(2-2) Generation process of graph of changes in control conditions 4001

Figure 42:
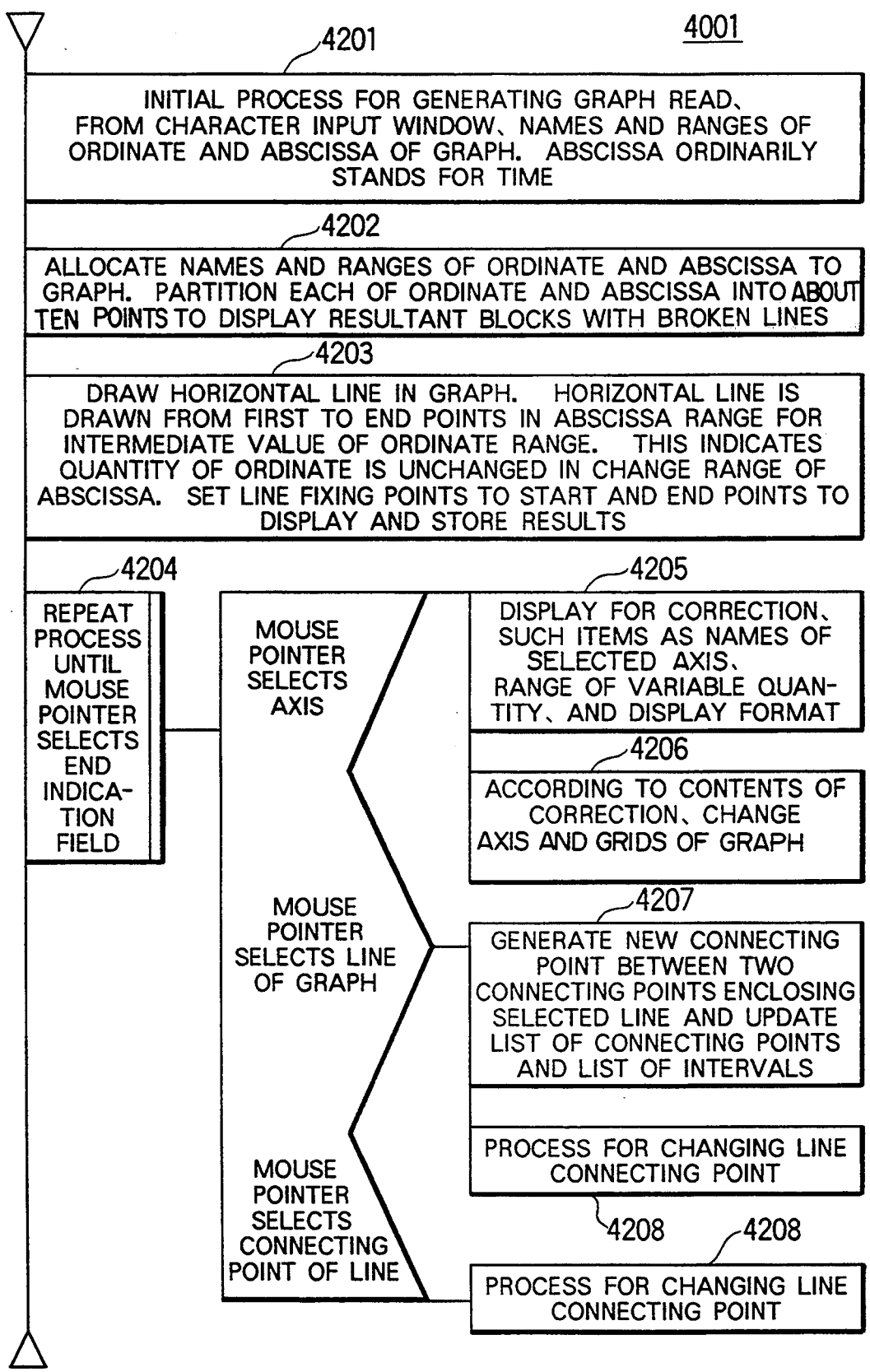
FIG. 42 is a flowchart showing a generation process of a variation graph of control conditions.
Figure 43:
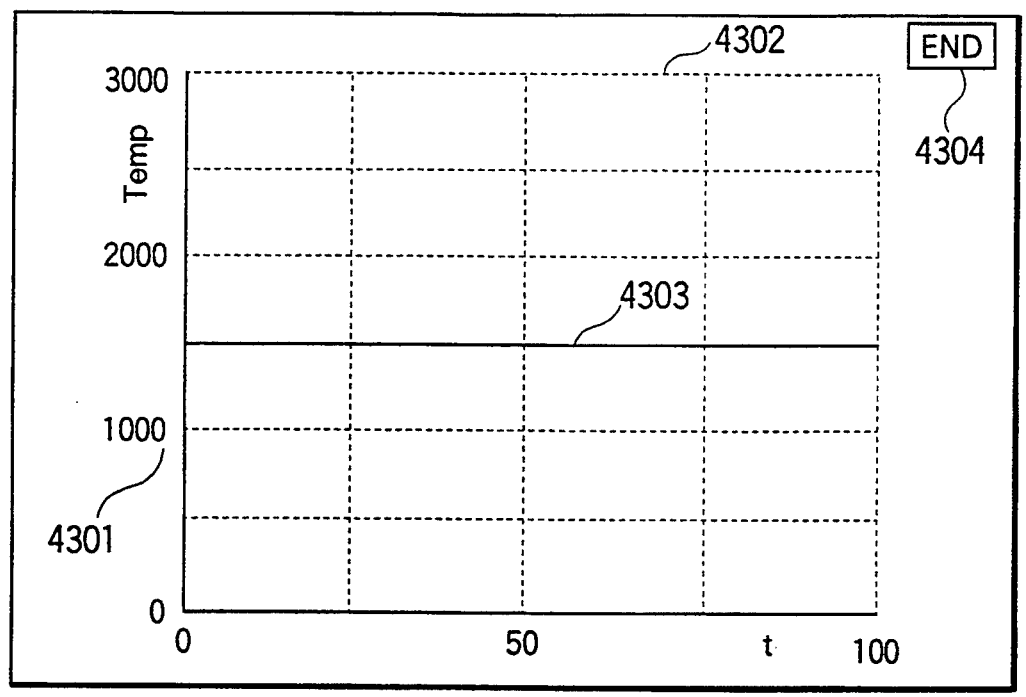
FIG. 43 is a diagram showing a window in an initial stage of generating the variation graph of control conditions.
Figure 44:
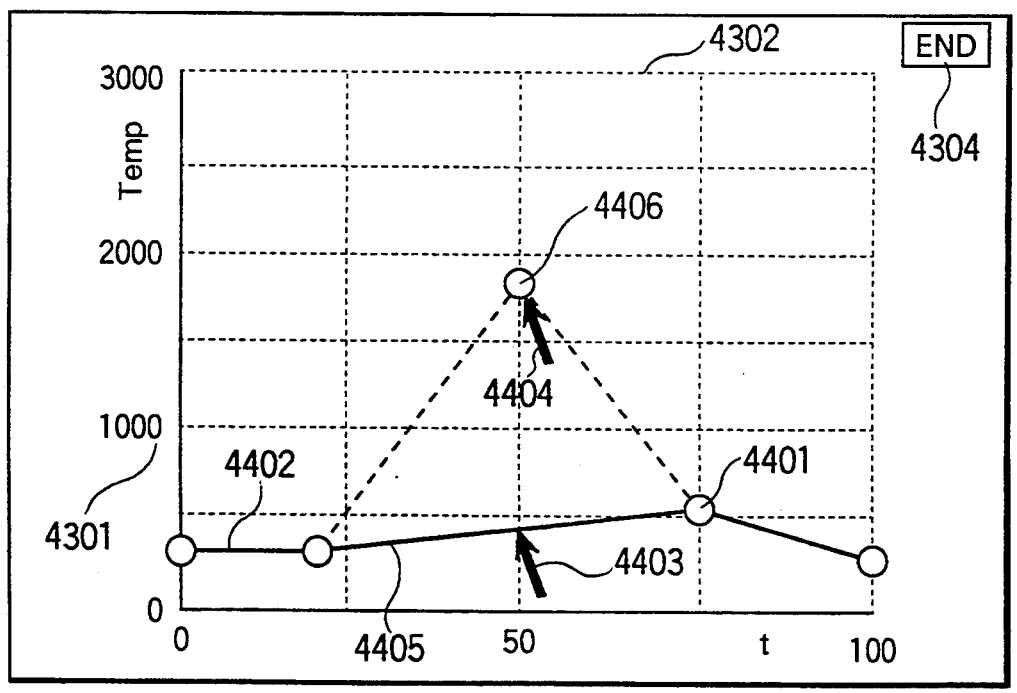
FIG. 44 is a diagram showing a window presented when a connecting point is changed in the generation process of the variation graph of control conditions.

FIG. 42 shows the process flow of the generation process of graph of changes in control conditions 4001. Changes of the screen image in association with the processes will be described by reference to FIGS. 41, 43, and 44. An initial process of graph generation 4201 requests the user to input from the window 4103 of FIG. 41 names of the ordinate and abscissa and a range of change of the graph. The process 4201 thereafter reads therein values inputted by the user. A process 4202 generates in the window 4102, according to the acquired values, a skeleton of graph 4301 to which the axis names and the range are assigned. To facilitate the user to read values of the graph, each axis is subdivided into about ten partitions to draw frames or blocks 4302 with broken lines in the graph. Next, a generation process of initial values for the graph 4203 displays a state of the graph where the value thereof is kept unchanged in the graph region. Namely, a horizontal line 4303 of FIG. 43 is presented. This line is created by drawing an intermediate value of the ordinate 4301 from a start point to an end point of the abscissa. This means that the control condition related to the ordinate is unchanged with respect to a change range of the abscissa. After the initial job is thus completed, a process 4204 repeatedly conducts the generation processes of graph 4205 to 4208 through an interactive operation until the end of operation, namely, an end filed 4304 is selected in the window.

In the generation process of graph 4001, the basic operation is accomplished with the mouse pointer 4106. The process is executed according to an object pointed by the mouse pointer 4106 in the graph. For selecting operations, the mouse pointer 4106 can point the axis 4301, a connecting point 4401 between lines of the graph, a line 4402, and an end indication field 4304 of the graph of FIG. 44. When either one of these selection items is pointed, a process is executed according to the selected item and then the system enters a state awaiting another indication of the mouse pointer 4106. When the mouse pointer 4106 selects the ordinate 4301, a process 4205 updates the names of axes, the range of variation quantity, the display format, etc. That is, the current value thereof are displayed in a new window to request modification of the values. Subsequently, a process 4206 changes the axes and frames of the graph depending on the contents thus corrected. If the mouse pointer 4106 selects a line in the graph, there are executed a process 4207 for disposing a new connecting point in the line, which has been a straight line, and an operation 4208 for bending the line by changing the position of the connecting point. For example, when the mouse pointer 4403 points the line 4405 in FIG. 44, a connecting point is generated such that while the mouse pointer 4404 is moving, a connecting point 4406 is created as a virtual position, thereby connecting these positions to each other with a broken line. When the mouse pointer 4404 selects a connecting point between lines, there is conducted an operation 4208 for changing the position of the connecting point. For a new connecting point thus produced, the position thereof is also changed in a manner similar to that used in the process 4208. As a result of execution of the processes above, there is generated the graph of changes in the control conditions.

a) Process after creation of new connecting point 4207

Figure 45:
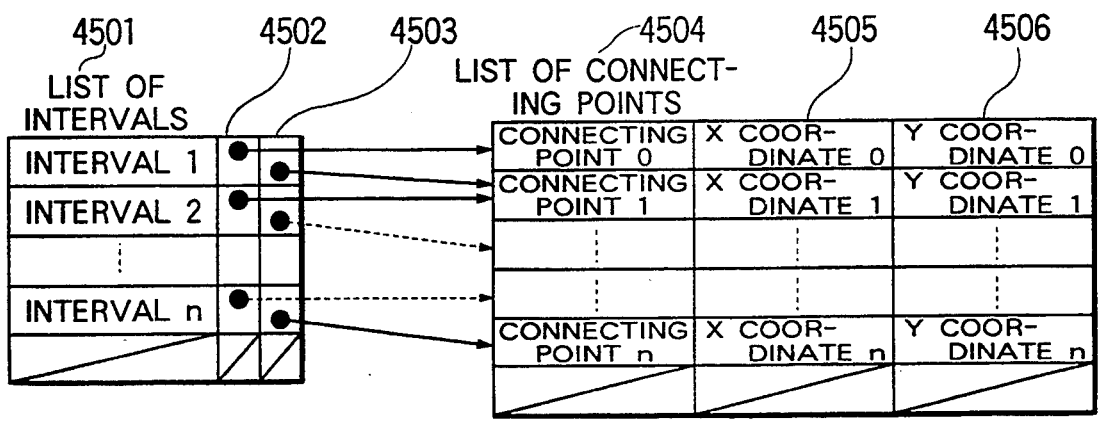
FIG. 45 is a diagram showing a list of intervals representing lines of intervals and a list of connecting points representing broken points of lines.
Figure 46:
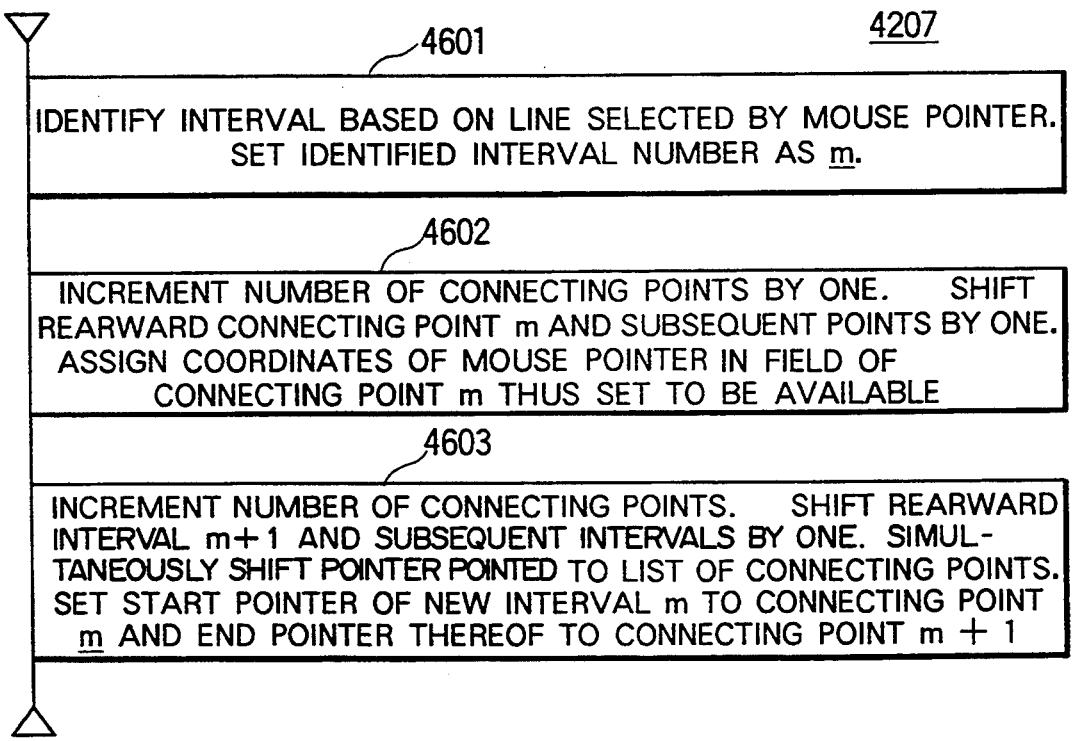
FIG. 46 is a flowchart showing a generation process of new connecting point in the generation process of the variation graph of control conditions.

Referring to FIGS. 45 and 46, description will be given of the process 4207 to be executed when a new connecting point is generated while a graph of changes in control conditions is being produced. Between a line selected by a mouse pointer and an interval of the list of intervals 4501, there exists a one-to-one correspondence. A process 4601 determines an interval m associated with the selected line. An update process of list of connecting points 4602 increments the number of connecting points by one and enlarges the area of the list of connecting points 4.504 pointed from the interval list 4501. Moreover, an area ranging from the connecting point m to the end position is shifted backward to create an empty field. In the field for the connecting point m, the x and y coordinates of the mouse pointer on the graph are recorded in the fields 4505 and 4506 for the x and y coordinates, respectively. Subsequently, a process 4603 updates the interval list 4501. Namely, the number of intervals is increased by one and the area of the list is expanded, thereby shifting an area ranging from the interval m+1 to the end position backward. In this operation, the pointers 4502 and 4503 respectively of the start and end points from the interval list 4501 to the list of connecting points 4504 are accordingly changed. For an empty field thus created for the connecting point m+1, the start pointer is set to point the connecting point m and the end pointer is set to point the connecting point m+1. As a result of execution of the processes above, there is completely executed the generation process of the new connecting point.

b) Process to be executed when connecting point is updated 4208

Figure 47:
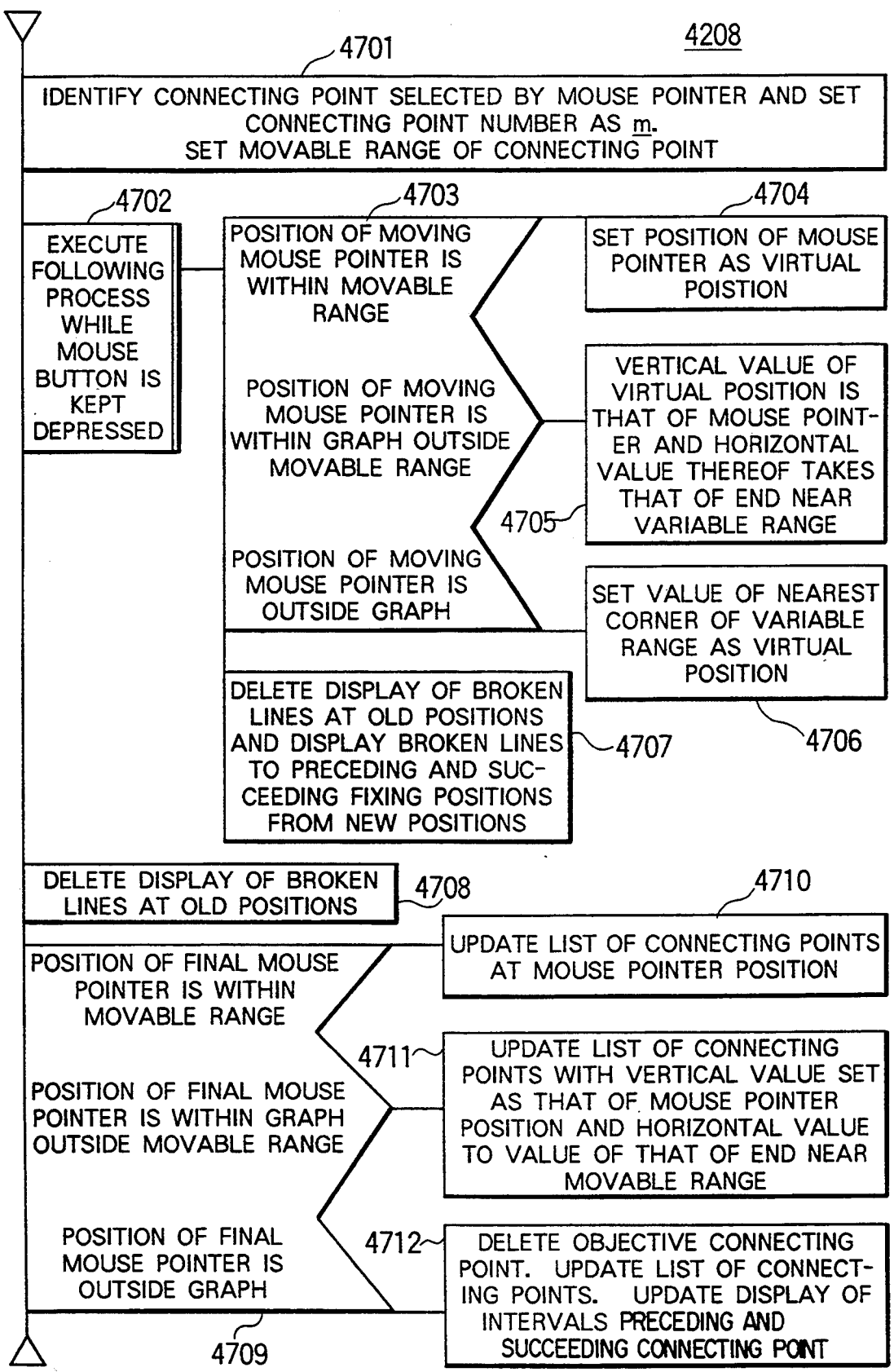
FIG. 47 is a flowchart showing an update process of positions of existing connecting points in the generation process of the variation graph of control conditions.
Figures 48, 49:
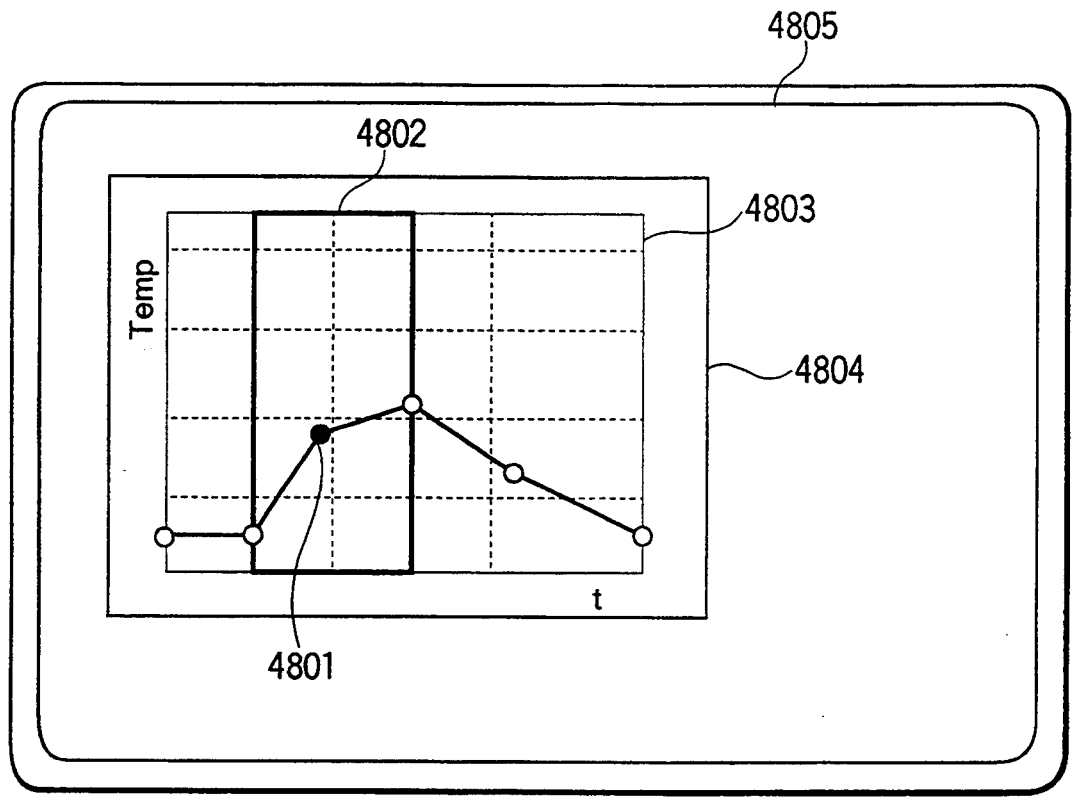
FIG. 48 is a diagram showing a state where the mouse pointer is located in a region in which the contents of process are different from those of the other processes in the process for correcting existing connecting points included in the generation process of the variation graph of control conditions.
FIG. 49 is a diagram showing an internal table of interval functions required for a process of reading functions from a variation graph.

Referring to FIGS. 45, 47, and 48, description will be given of the process 4208 to be achieved when a connecting point is updated during a creation of a graph of change in control conditions. A one-to-one correspondence exists between a connecting point selected by a mouse pointer and a connecting point in the list of connecting points 4504. A process 4701 determines the connecting point m thus selected. The position of the new connecting point is virtually updated while the mouse button 4109 is kept pressed when the point is selected by the mouse pointer. The new position of the connecting point is determined when the mouse button 4109 is released and then the connecting point is updated.

A process 4702 achieves the following processes 4703 to 4707 while the mouse button is kept pressed. A judge process for updating process 4703 is executed depending on the position of the mouse pointer in the state where the mouse button is kept pressed. When the position of the moving mouse pointer is within a movable range 4802 of FIG. 48, the process 4704 sets the position of the mouse pointer as the virtual position. In FIG. 48, the selected connecting point is indicated by a solid circle 4801. When the position of the moving mouse pointer is beyond a movable range 4802 of FIG. 48 and within a graph area 4803, the process 4705 adopts the Y coordinate value of the mouse pointer as the value of the virtual position in the vertical direction and the X coordinate value of a near end of the movable range 4802 as the value of the virtual position in the horizontal direction. When the position of the moving mouse pointer is beyond the graph area 4803, the process 4706 adopts the value of the nearest corner of the movable range 4802 as the value of the virtual position. After the virtual position is determined for each position of the mouse pointer, the process 4707 deletes, if broken lines are displayed at the old virtual position of the connecting point, the broken lines and then displays new broken lines from the new virtual position to the preceding and succeeding connecting points. The processes above are carried out while the mouse button is kept depressed.

After the depressed mouse button is released, the update operation of the position of connecting point is achieved. First, a process 4708 erases the broken lines presented at the old virtual position. Next, a judge process 4709 is effected to carry out its process according to the final position of the mouse pointer when the mouse button is released. When the final position is within the movable range 4802 of FIG. 48, a process 4710 updates the list of connecting points based on the coordinates of the mouse pointer in the graph. When the final position is beyond the movable range 4802 of FIG. 48 and within the graph area 4803, a process 4711 updates the value of the new connecting point in the vertical direction with the Y coordinate value of the final position of the mouse pointer and the value of the new connecting point in the horizontal direction with the X coordinate value of the near end of the movable range. When the final position is beyond the graph area 4803, it is assumed that the selected connecting point is to be deleted and hence a process 4712 is achieved to erase the selected connecting point. In relation thereto, there is also conducted a process to update the list of connecting points and to Update the interval presentation before and after the connecting point. When the selected connecting point is neither the first item nor the last item, the movable range of the connecting point is limited by the preceding and succeeding connecting points. However, when the selected connecting point is the first item or the last item, the movable range of the connecting point is limited to the ordinate or y-coordinate axis of the the graph. Namely, the value of X coordinate is kept unchanged. These two cases are discriminated from each other in the selection of a connecting point by the mouse pointer when the movable range of the connecting point is designated together with the number assigned to the connecting point. Moreover, when an attempt is made to delete the first or last connecting point, there is notified a message that the point cannot be deleted.

Description has been given of the generation process of graph of changes in control conditions 4001.

(2-3) Process for reading function 4002

Next, the process for reading function 4002 will be described.

Figure 50:
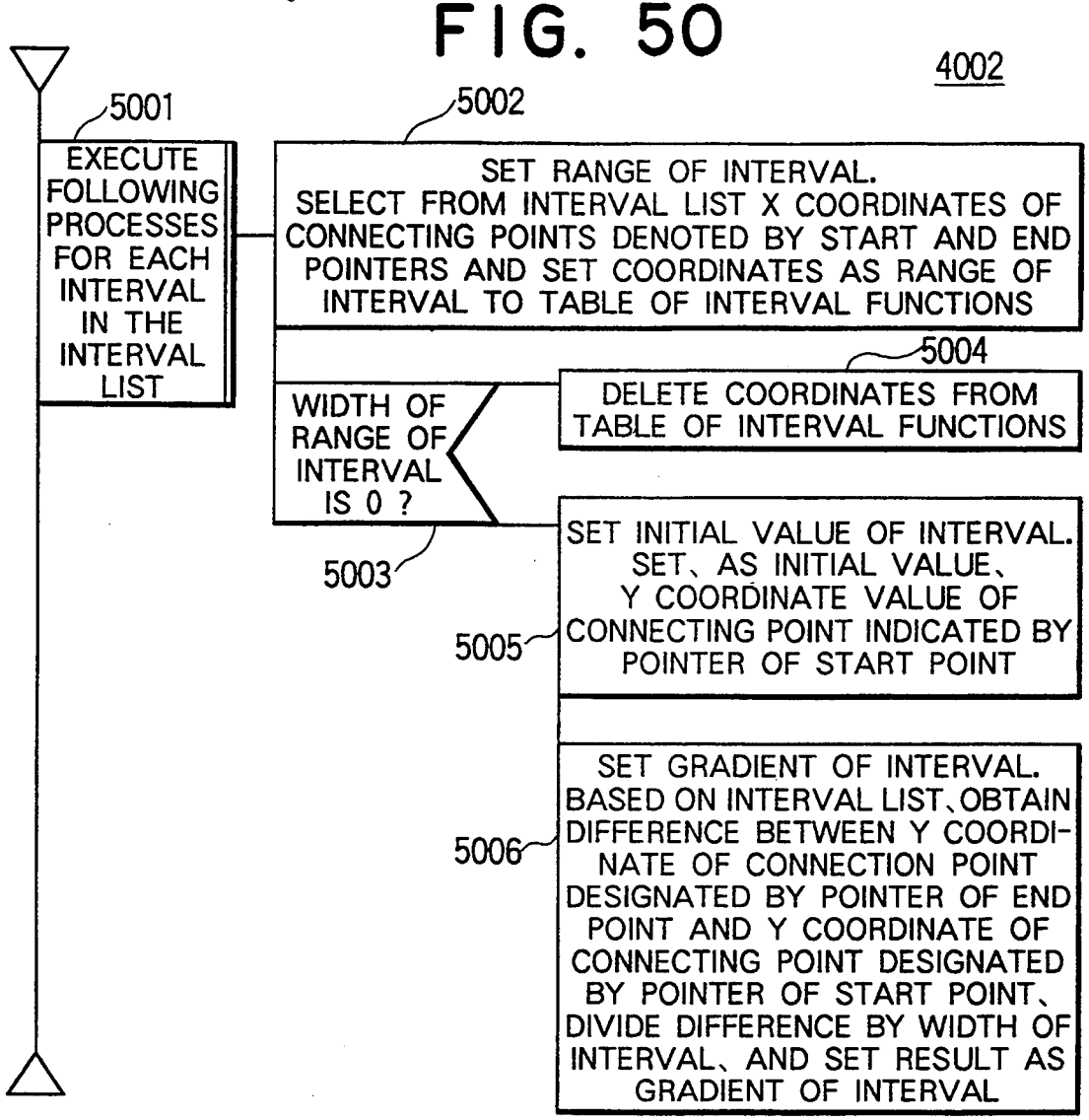
FIG. 50 is a flowchart showing a process for reading functions in the visually interactive specification of control conditions.

FIG. 49 shows the format of a function table of intervals 4901 loaded with values of functions of intervals. The function table for intervals 4901 includes, for each interval fields of a start position of range 4902, an end position of interval 4903, an initial value of interval 4904, and a gradient of interval 4905, respectively. The process of reading function 4002 generates the function table of intervals 4901 based on a list of intervals and a list of connecting points. FIG. 50 shows the process flow of the process of reading function 4002. A process 5001 conducts the following processes 5002 to 5006 for each interval in the list of intervals. A setting process of interval range 5002 assumes a range of interval to be determined by the x coordinates respectively of connecting points indicated by the pointers of the list of intervals respectively denoting the start and end points and stores the coordinate values respectively in a start point of range 4902 and an end point of range 4903 of the function table of intervals 4901.

The process 5003 checks a width of the range of interval to transfer control to an appropriate process depending on whether or not the value of width is 0. If this is the case, the process 5004 deletes the interval from the function table of intervals 4901. In the range where the width of range is 0, the values of graph need not be treated as function values. However, it is significant to present a graph of these values in this range. Namely, the graph indicates that the variable abruptly changes at the moment. If the width of range is other than 0, the process 5005 carries out a setting process of initial values for the interval. Namely, the values of y coordinates respectively of connecting points indicated by the pointers of the associated list of intervals respectively denoting the start and end points are set as the initial values for the interval. Next, the setting process of gradient of interval 5006 divides by the width of interval the difference between the y coordinate value of the connecting point indicated by the pointer of the end point of the associated list of interval and the y coordinate value of the connecting point indicated by the pointer of the start point of the list so as to obtain a gradient of interval, thereby storing the value in a gradient field of interval 4905. This completes the process of reading function 4002.

(2-4) Generation process of control conditions 4003

Figure 51:
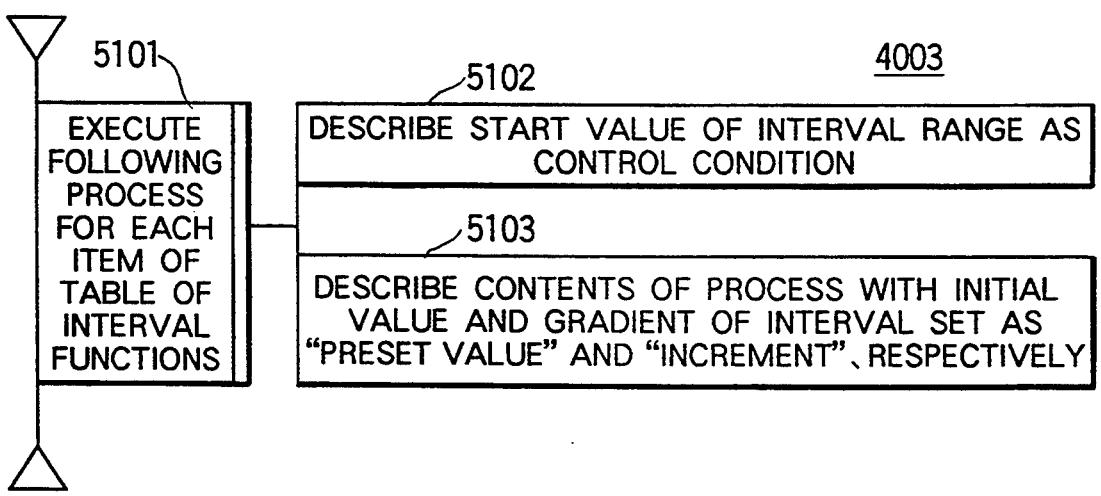
FIG. 51 is a flowchart showing a generation process of control conditions in the visually interactive specification of control conditions.

The generation process of control conditions 4003 will be described by referencing FIG. 51. A process 5101 carries out the following processes 5102 and 5103 for each interval in the function table of intervals 4901. A setting process of control conditions 5102 describes a start value of the range of interval as a control condition. A setting process of the contents of process 5103 sets the setting value as the initial value of interval to describe the contents of process with a gradient of interval as an increment.

(2-5) Sorting process of control times 4004

Finally, the sorting process 4004 sorts, in a sequence of control times, the control conditions created by the processes above in association with a plurality of environmental variables.

Description has been given of the respective constituent processes of the visually interactive specification of control conditions 4000.

(3) Specification of initial arrangement of particles

Figure 52:
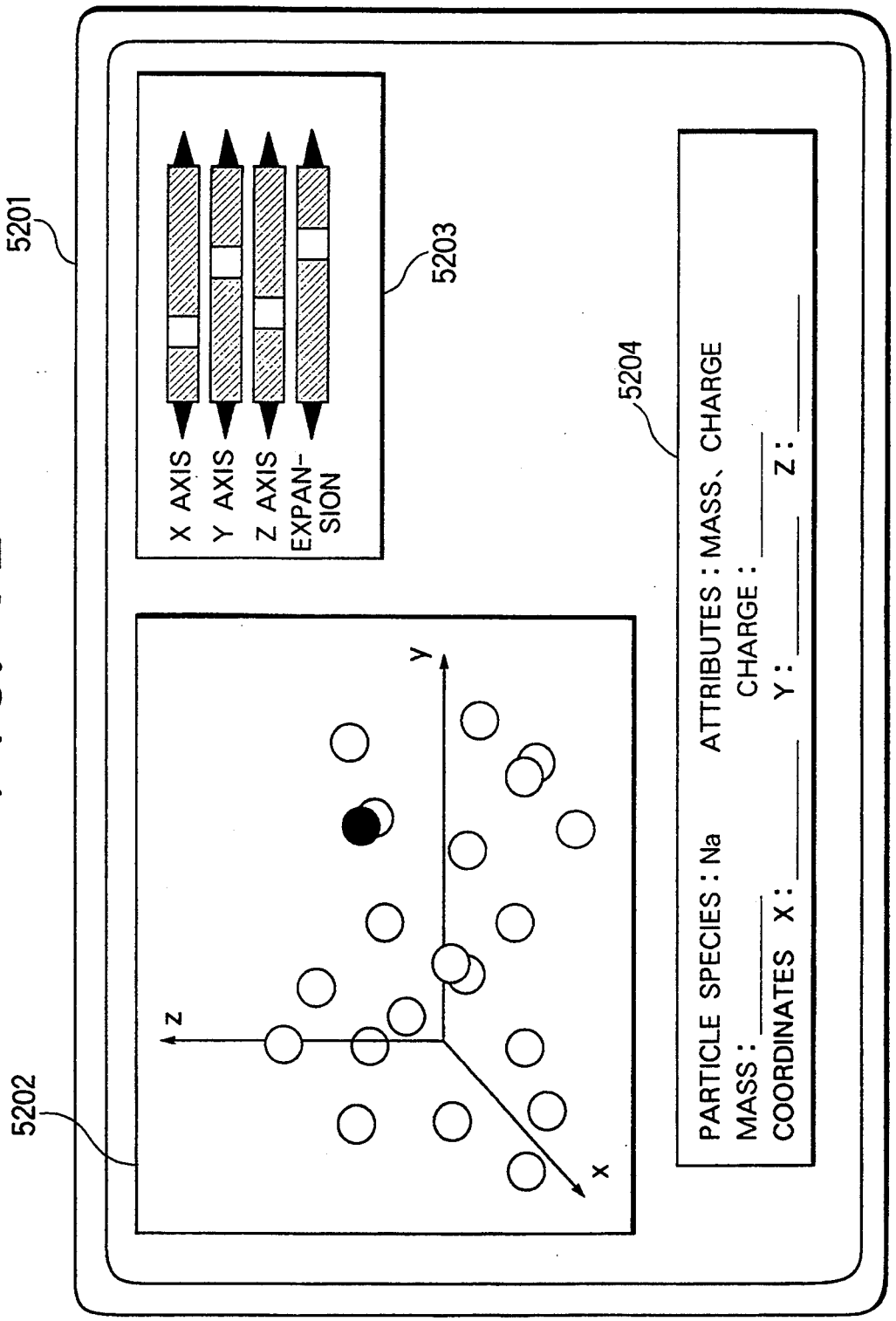
FIG. 52 is a diagram for explaining a method of setting particle arrangement from a graphic terminal.

As an item of the particle simulation information 1, the initial arrangement of particles is required to be specified in some cases. When the specification can be achieved according to a crystal structure or a random configuration, the initial arrangement of particles can be easily designated. However, these specifications cannot be used in some systems in which the simulation is to be carried out. For example, the arrangement of atoms on a surface or boundary of a crystal is different from that of atoms in the crystal and is quite complicated in structure. Consequently, the specifications above are not satisfactory to denote the initial arrangement of particles. As a method of enabling the specification of the particle arrangement, there can be considered a method of setting the arrangement of particles by use of a graphic terminal. Moreover, even when the crystal structure and the random arrangement are employed for the specification, when the terminal is used to visually confirm the state of arrangement on a screen, wrong operations can be remarkably minimized in the specification of input information. Referring now to FIG. 52, description will be given of a method of setting the arrangement of particles from a graphic terminal.

On a screen 5201 of the graphic terminal, there are displayed a window 5202 for presenting therein an arrangement of particles, a console 5203 for changing a point of view, and a window of character input 5204 for specifying numeric values such as coordinates of particles and angles therebetween and other parameters. In a case where the arrangement of particles is specified according to the crystal structure and/or the random arrangement, the window 5204 is employed to specify the arrangement method. Assuming particles to be small balls existing in a three-dimensional space, when the particles are displayed as a virtual three-dimensional image in the window 5202, the information supplier can visually recognize the relative positions of particles in the arrangement. Moreover, in the window, particles can be easily inputted, selected, or deleted by a mouse or the like. The console 5203 is control means for altering a point of view for an image presented in the window 5204. As can be seen from FIG. 52, the console 5203 can be displayed as a window on the screen of the graphic terminal. However, the operation above can also be achieved by keys of a keyboard, alternatively, there may be adopted a device with a control having a plurality of setting positions. Using the console 5203, the image can be rotated, magnified, or minimized so as to facilitate the user to recognize positions of particles. The window 5204 is disposed to input therefrom characters and/or numeric values for information items such as attributes and coordinates of inputted particles and relative positions thereof with respect to other particles. The arrangement of particles can be roughly established by the mouse. For specifying more concretely the arrangement, it is necessary to input numeric values. Depending on the respective cases of simulation, the number of particles to be treated is changed, namely, in a range from several particles to several tens of thousand of particles. However, in ordinary cases, when displaying small balls on the screen as above, at most about several tens of particles can be recognized for the arrangement thereof. Consequently, when more than several tens of particles are desired to be arranged, the defined region of space is subdivided into a plurality of blocks so that the arrangement of particles is accomplished for each block. Alternatively, the arrangement of particles is designated only for a block such that the obtained arrangement is repeatedly effected or the other blocks, thereby establishing the arrangement for all particles. In either case, there is required a function in which the defined region of space is subdivided into a plurality of blocks so that the arrangement of particles is accomplished for each block. The function can be implemented by combining with each other the various setting conditions in the shape of spatial region of the particle simulation information 1 shown in FIG. 1.

In this embodiment, the spatial region has three dimensions; however, for a one-dimensional or two-dimensional region, only the domain of behavior of particles is different from that of the three-dimensional region. Consequently, the automatic generation of programs can be carried out in the same manner as for the embodiment above.

In addition, the calculation programs for the particle simulation are not limited to FORTRAN programs. Namely, the automatic generation of programs is applicable to any programming language such as PL/1 or PASCAL having a level of description function similar to that of the FORTRAN.

In accordance with the present invention, the number of generating steps of programs controlling the particle behavior simulation can be considerably reduced as compared with the case where the programs are created in the FORTRAN or the like, which hence enables the simulation to be easily accomplished.

Moreover, according to the present invention, the steps of generating various control conditions for controlling the simulation can be remarkably minimized and the generated control conditions can be easily confirmed.

While particular embodiments of the invention have been shown and described, it will be obvious to those skilled in the art that various changes and modifications may be made without departing from the present invention in its broader aspects.

We claim:

1. A program generation method for particles simulation of generating particle simulation programs in a computer which has a memory and to which an input/output device is connected, comprising the following steps of:

(1) inputting particle simulation information from the input/output device to analyze a physical phenomenon as individual motion of a plurality of particles in a spatial region, reducing a volume of input particle simulation information to form reduced inputted information, and storing the reduced inputted information in the memory, said particle simulation information including,
a description of attributes of particles representing particle species and a number of particles as objects of the simulation,
a description of a shape of a spatial region representing a boundary condition in which a physical phenomenon is generated,
a description of control conditions of an environment of the simulation, and
equations of motion dominating behaviors of interactive particles in time and space;

(2) generating, according to the reduced inputted information stored in the memory, information describing specifications of the particle simulation programs according to each of said plurality of particles; and (3) creating, based on the information describing specifications of the particle simulation programs, the particle simulation programs and input data necessary therefor.

2. The program generation method of claim 1 wherein the step of reducing a volume of input particle simulation information includes the step of averaging the particle simulation information for the plurality of particles in the spatial region.

3. A method according to claim 1, wherein said step (2) includes a process for:
interpreting a description of a shape of a spatial region in which a physical phenomenon is generated, the description being included in the particle simulation information; and
generating an internal representation of domain including dimensions of the space, the shape of region, and boundary conditions.

4. A method according to claim 1, wherein said step (2) includes a process for:
interpreting a description of attributes of particles as objects of the simulation, the description being included in the particle simulation information; and
generating an internal representation of variables including numeric values associated with species of particles, the number of particles, and various initial setting information items.

5. A method according to claim 1, wherein said step (2) includes a process for:
extracting, from control conditions of an environment of the simulation, boundary conditions and processes associated therewith, changes in simulation conditions at predetermined times and processes associated therewith;
generating a table for storing therein correspondences between conditions and processes; and
creating an internal representation of auxiliary processes describing the contents of the extracted processes.

6. A method according to claim 1, wherein said step (2) includes a process for:
interpreting and discretizing the equations of motion of particles; and
creating an internal description of expressions including asymptotic equations in a tree graph format.

7. A method according to claim 1, wherein said step (2) includes:
(1) a process for:
interpreting a description of a shape of a spatial region in which a physical phenomenon is generated, the description being included in the particle simulation information; and
generating an internal representation of domain including dimensions of the space, the shape of region, and boundary conditions;
(2) a process for:
interpreting a description of attributes of particles as objects of the simulation, the description being included in the particle simulation information; and
generating an internal representation of variables including numeric values associated with species of particles, the number of particles, and various initial setting information items;
(3) a process for:

extracting, from control conditions of an environment of the simulation, boundary conditions and processes associated therewith, changes in simulation conditions at predetermined times and processes associated therewith;

generating a table for storing therein correspondences between the control conditions and processes; and creating an internal representation of auxiliary processes describing the contents of the extracted processes; and (4) a process for:

interpreting and discretizing the equations of motions of particles; and creating an internal description of expressions including asymptotic equations in a tree graph format.

8. A method according to claim 1, wherein the information generated by said step (2) to describe therein the specifications includes:

an internal representation of domain including dimensions of the space, the shape of region, and boundary conditions;

an internal representation of variables including numeric values associated with species of particles, the number of particles, and various initial setting information items;

a table for storing therein correspondences between the control conditions and processes; and an internal description of expressions specifying the equations of motion of particles.

9. A method according to claim 1, wherein said step (3) includes a process for generating a header program according to the internal representation of domain including dimensions of the space, the shape of region, and boundary conditions and the internal representation of variables including numeric values associated with species of particles, the number of particles, and various initial setting information items, the internal representations being included in the information generated to describe therein the specifications, the header program comprising specification statements of various variables including arrays.

10. A method according to claim 1, wherein said step (3) includes a process for generating a program, according to the internal representation of variables including numeric values associated with species of particles, the number of particles, and various initial setting information items, the internal representation being included in the information generated to describe therein the specifications, the program reading the input data including various initial values of the particle attributes necessary for the simulation and the data and for storing the data in a file.

11. A method according to claim 1, wherein said step (3) includes a process for generating a program, according to the table for storing therein correspondences between the control conditions and processes, the table being included in the information generated to describe therein the specifications, the program controlling a process procedure of the simulation.

12. A method according to claim 1, wherein said step (3) includes a process for generating a program, according to the internal representation of expressions specifying the equations of motion of particles, the internal representation being included in the information generated to describe therein the specifications, the program numerically integrating asymptotic equations associated with the equations of motion.

13. A method according to claim 1, wherein said step (3) includes a process for generating a program for auxiliary calculations, according to the internal representation of expressions specifying the equations of motion of particles, the internal representation being included in the information generated to describe therein the specifications, the program calculating various physical quantities necessary for the equations of motion.

14. A method according to claim 1, wherein said step (3) includes:

(1) a process for generating a header program according to the internal representation of domain including dimensions of the space, the shape of region, and boundary conditions and the internal representation of variables including numeric values associated with species of particles, the number of particles, and various initial setting information items, the internal representations being included in the information generated to describe therein the specifications, the header program comprising specification statements of various variables including arrays;

(2) a process for generating a program, according to the internal representation of variables including numeric values associated with species of particles, the number of particles, and various initial setting information items, the internal representation being included in the information generated to describe therein the specifications, the program reading the input data including various initial values of the particle attributes necessary for the simulation and the data and for storing the data in a file;

(3) a process for generating a program, according to the table for storing therein correspondences between the control conditions and processes, the table being included in the information generated to describe therein the specifications, the program controlling a process procedure of the simulation (4) a process for generating a program, according to the internal representation of expressions specifying the equations of motion of particles, the internal representation being included in the information generated to describe therein the specifications, the program numerically integrating asymptotic equations associated with the equations of motion; and (5) a process for generating a program for auxiliary calculations, according to the internal representation of expressions specifying the equations of motion of particles, the internal representation being included in the information generated to describe therein the specifications, the program calculating various physical quantities necessary for the equations of motion.

15. A method according to claim 1, wherein the particle simulation program generated by said step (3) includes:

a header program comprising specification statements of various variables including arrays;

a program for reading the input data including various initial values of particle attributes necessary for the simulation;

a program for controlling the process procedure of the simulation;

a program for numerically integrating asymptotic equations associated with the equations of motion of particles; and a program for auxiliary calculations for calculating various physical quantities necessary for the equations of motion of particles.

16. A method according to claim 1, wherein said step (1) includes, for specifying various setting items included in the information of the particle simulation, the following steps of:

displaying a list including the setting items on a screen of the input/output device; and effecting a selection of one of the items by an indicating apparatus associated with the input/output device.

17. A method according to claim 16, wherein the items other than the item thus selected are presented on the screen in a presentation manner different from that used for the selected item.

18. A method according to claim 1, wherein said step (1) includes, for inputting control conditions included in the information of the particle simulation, the following steps of:

inputting data associated with a predetermined physical quantity from the input/output device and thereby displaying on the screen of the input/output device a graph indicating changes in the control conditions;

reading a change in the physical quantity from the changes presented in the displayed graph;

generating a description of control conditions of the physical quantity;

sorting the contents of the description of control conditions according to a sequence of time; and outputting the sorted control conditions as the particle simulation information to the memory.

19. A method according to claim 1, wherein said step (1) includes, for inputting initial arrangement of each particle included in the information of the particle simulation, the following steps of:

inputting coordinates values of said initial arrangement from the input/output device and thereby displaying on the screen of the input/output device a mark indicating presence of each particle at a position corresponding to the coordinates values reading said coordinates values;

generating a description of said initial arrangement of each particle; and outputting the described initial arrangement as the particle simulation information to the memory.

20. A program generation method for particles simulation of generating particle simulation programs in a computer which has a memory and to which an input/output device is connected, comprising the following steps of:

(1) inputting particle simulation information from the input/output device to analyze a physical phenomenon as motion of a plurality of particles in a spatial region, reducing a volume of input particle simulation information to form reduced inputted information, and storing the reduced inputted information in the memory, wherein the particle simulation information includes, a description of attributes of particles as objects of the simulation, a description of a shape of a spatial region in which a physical phenomenon is generated, a description of control conditions of an environment of the simulation, and equations of motion dominating behaviors of particles in time and space;

(2) generating, according to the reduced inputted information stored in the memory, information describing specifications of the particle simulation programs, said step (2) including:

(a) a process for:

interpreting the description of a shape of a spatial region in which a physical phenomenon is generated, the description being included in the particle simulation information: and generating an internal representation of domain including dimensions of the space, the shape of region, and boundary conditions (b) a process for:

interpreting the description of attributes of particles as objects of the simulation, the description being included in the particle simulation information: and generating an internal representation of variables including numeric values associated with species of particles, the number of particles, and various initial setting information items;

(c) a process for:

extracting, from control conditions of an environment of the simulation, boundary conditions and processes associated therewith, changes in simulation conditions at predetermined times and processes associated therewith;

generating a table for storing therein correspondences between conditions and processes; and creating an internal representation of auxiliary processes describing the contents of the extracted processes; and (d) a process for:

interpreting and discretizing the equations of motion of particles; and creating an internal description of expressions including asymptotic equations in a tree graph format; and (3) creating, based on the information describing specifications of the particle simulation programs, the particle simulation programs and input data necessary therefor.

21. The program generation method of claim 2 wherein the step of reducing a volume of input particle simulation information includes the step of averaging the particle simulation information for the plurality of particles in the spatial region.

* * * * *

UNITED STATES PATENT AND TRADEMARK OFFICE
CERTIFICATE OF CORRECTION

PATENT NO. : 5,438,526
DATED     : August 1, 1995
INVENTOR(S) : Satoshi Itoh, Sigeo Ihara It is certified that error appears in the above-indentified patent and that said Letters Patent is hereby corrected as shown below:

Claim 21, column 46, line 57, delete "2" and substitute therefore --20--.

Signed and Sealed this

Twenty-sixth Day of September, 1995

Attest:

BRUCE LEHMAN

*Attesting Officer*          *Commissioner of Patents and Trademarks*